United States Patent
Sakamoto

(10) Patent No.: US 7,245,396 B2
(45) Date of Patent: Jul. 17, 2007

(54) IMAGE DATA CODING APPARATUS, IMAGE DATA DECODING APPARATUS, IMAGE DATA CODING METHOD AND IMAGE DATA DECODING METHOD

(75) Inventor: Yoichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 10/310,812

(22) Filed: Dec. 6, 2002

(65) Prior Publication Data

US 2003/0107753 A1 Jun. 12, 2003

(30) Foreign Application Priority Data

| Dec. 6, 2001 | (JP) | ............................. 2001/373269 |
| Dec. 7, 2001 | (JP) | ............................. 2001/374340 |
| Feb. 15, 2002 | (JP) | ............................. 2002/038132 |
| Feb. 22, 2002 | (JP) | ............................. 2002/046434 |

(51) Int. Cl.
*G06K 1/00* (2006.01)

(52) U.S. Cl. ............. 358/1.9; 358/426.01; 358/426.04; 358/3.13; 358/3.06; 382/163; 382/232

(58) Field of Classification Search ................ 358/1.9, 358/426.04, 3.02, 3.07; 382/232, 239
See application file for complete search history.

(56) References Cited

U.S. PATENT DOCUMENTS

| 4,901,363 A | * | 2/1990 | Toyokawa .................. 382/239 |
| 5,450,562 A | | 9/1995 | Rosenberg et al. ......... 395/446 |
| 5,465,173 A | * | 11/1995 | Ishikawa et al. ............ 358/534 |
| 5,635,932 A | | 6/1997 | Shinagawa et al. .......... 341/51 |
| 5,748,122 A | | 5/1998 | Shinagawa et al. .......... 341/67 |
| 5,787,192 A | * | 7/1998 | Takaichi et al. ............ 382/166 |
| 5,883,975 A | | 3/1999 | Narita et al. ................ 382/232 |
| 5,915,042 A | * | 6/1999 | Matsushiro ................. 382/232 |
| 6,075,619 A | | 6/2000 | Iizuka ........................ 358/432 |
| 6,195,128 B1 | | 2/2001 | Streater ...................... 348/415 |
| 6,785,424 B1 | | 8/2004 | Sakamoto ................... 382/244 |
| 7,164,493 B1 | | 1/2007 | Matsumoto et al. ......... 358/1.9 |

FOREIGN PATENT DOCUMENTS

| EP | 0 613 290 A1 | 8/1994 |
| EP | 0 952 553 A2 | 10/1999 |

(Continued)

OTHER PUBLICATIONS

Patent Abstracts of Japan, vol. 009, No. 115 (E-315), May 18, 1985 & JP 60 005671A (Canon KK), Jan. 12, 1985.

(Continued)

*Primary Examiner*—Twyler Lamb
*Assistant Examiner*—Jacky X. Zheng
(74) *Attorney, Agent, or Firm*—Fitzpatrick, Cella, Harper & Scinto

(57) ABSTRACT

This invention has as its object to efficiently encode an image. To this end, for example, an image undergoes a color reduction process using a dither matrix with a predetermined size. A print control command is output. A compression parameter designation command that designates an up copy vertical offset value (a value according to the matrix size), a near left copy horizontal offset value (a value according to the matrix size), and a far left copy horizontal offset value (a value according to the period of background patterns), which are used in encoding, is output. Image data is encoded according to an encoding sequence.

20 Claims, 39 Drawing Sheets

FOREIGN PATENT DOCUMENTS

| | | |
|---|---|---|
| EP | 952553 A2 * | 10/1999 |
| JP | 6-242924 | 9/1994 |
| JP | 08-018981 | 1/1996 |
| JP | 08-116263 | 5/1996 |
| JP | 08-130652 | 5/1996 |
| JP | 08-223428 | 8/1996 |
| JP | 09-200542 | 7/1997 |
| JP | 10-042144 | 2/1998 |
| JP | 2000-076424 | 3/2000 |
| JP | 2000-76424 | 3/2000 |
| JP | 2000-148973 | 5/2000 |
| JP | 2001-053620 | 2/2001 |
| JP | 2001-128005 | 5/2001 |

* cited by examiner

FIG. 3

| COMMAND | COMMAND CODE | MEANING |
|---|---|---|
| RAW | 0 <data8> | 1-BYTE RAW DATA <data8> |
| COPY UP | 10 <count> | UP COPY OF <count> BYTES |
| COPY NEAR LEFT | 110 <count> | NEAR LEFT COPY OF <count> BYTES |
| COPY FAR LEFT | 1110 <count> | FAR LEFT COPY OF <count> BYTES |
| COUNT HIGH | 11110 <count> | DESIGNATE UPPER COUNT |
| EOB | 11111 | END OF CODE BLOCK |

FIG. 4

| COMMAND | COMMAND CODE | MEANING |
|---|---|---|
| COUNT 0 | 111111 | COUNT=0 |
| COUNT 1 | 0 | COUNT=1 |
| COUNT 2-3 | 10 <data1> | COUNT=2+<data1> |
| COUNT 4-7 | 110 <data2> | COUNT=4+<data2> |
| COUNT 8-15 | 1110 <data3> | COUNT=8+<data3> |
| COUNT 16-31 | 11110 <data4> | COUNT=16+<data4> |
| COUNT 32-63 | 111110 <data5> | COUNT=32+<data5> |

FIG. 5

| CODE | MEANING |
|---|---|
| 0 00000000 | 1-BYTE RAW DATA 0 |
| 1100 | NEAR LEFT COPY OF 1 BYTE |
| 10101 | UP COPY OF 3 BYTES |
| 11110 100 | ADD 2*64 TO COUNT OF NEXT COMMAND |
| 1110 111111 | NEAR LEFT COPY OF 0 BYTE |
| 11111 | END OF CODE SEQUENCE |
| 0000000 | INSIGNIFICANT (BYTE BOUNDARY ALIGNMENT) |

FIG. 10

The Team

∇ List CEO and key management by name

∇ Include previous accomplishments to show these are people with a record of success ∇ Summarize number of years of experience in this field

FIG. 13

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| ... | ... | ... | ... | ... | ... | ... | ... | ... | ... |

FIG. 14

|  | COLUMN 0 | COLUMN 1 | COLUMN 2 | COLUMN 3 | COLUMN 4 | COLUMN 5 | COLUMN 6 | COLUMN 7 | COLUMN 8 | COLUMN 9 |
|---|---|---|---|---|---|---|---|---|---|---|
| ROW 0 | 00 | 01 | 02 | 03 | 04 | 05 | 06 | 07 | 08 | 09 |
| ROW 1 | 10 | 11 | 12 | 13 | 14 | 15 | 16 | 17 | 18 | 19 |
| ROW 2 | 20 | 21 | 22 | 23 | 24 | 25 | 26 | 27 | 28 | 29 |

FIG. 20

| COMMAND | COMMAND CODE | MEANING |
|---|---|---|
| COPY UP | 1 <NUMBER OF BYTES> | COPY DATA WITH LENGTH INDICATED BY <NUMBER OF BYTES> FROM UPPER POSITION |
| CACHE | 01 <3-BIT DATA> | 1-BYTE DATA STORED AT POSITION OF CACHE BUFFER INDICATED BY <3-BIT DATA> |
| RAW | 001 <8-BIT DATA> | 1-BYTE RAW DATA HAVING VALUE <8-BIT DATA> |
| COPY LEFT | 0001 <NUMBER OF BYTES> | COPY DATA WITH LENGTH INDICATED BY <NUMBER OF BYTES> FROM LEFT POSITION |
| EOB | 0000 | END OF COMMAND BLOCK |

FIG. 21

| COMMAND | COMMAND CODE | MEANING |
|---|---|---|
| 1 | 1 | 1 BYTE |
| 2-3 | 01 <1-BIT DATA> | 2+<1-BIT DATA> BYTES |
| 4-7 | 001 <2-BIT DATA> | 4+<2-BIT DATA> BYTES |
| 8-15 | 0001 <3-BIT DATA> | 8+<3-BIT DATA> BYTES |
| 16-31 | 00001 <4-BIT DATA> | 16+<4-BIT DATA> BYTES |
| 32-63 | 000001 <5-BIT DATA> | 32+<5-BIT DATA> BYTES |
| 64-127 | 0000001 <6-BIT DATA> | 64+<6-BIT DATA> BYTES |
| 128-255 | 0000000 <7-BIT DATA> | 128+<7-BIT DATA> BYTES |

FIG. 22

IMAGE DATA

| 00 | 01 | 02 | 03 | 04 | 05 | 06 | 07 | 08 | 06 |
|---|---|---|---|---|---|---|---|---|---|

| CODE | MEANING OF CODE | CACHE BUFFER | | | | | | | |
|---|---|---|---|---|---|---|---|---|---|
| | | 0 | 1 | 2 | 3 | 4 | 5 | 6 | 7 |
| 001 00000000 | RAW 00 | 00 | | | | | | | |
| 001 00000001 | RAW 01 | 01 | 00 | | | | | | |
| 001 00000010 | RAW 02 | 02 | 01 | 00 | | | | | |
| 001 00000011 | RAW 03 | 03 | 02 | 01 | 00 | | | | |
| 001 00000100 | RAW 04 | 04 | 03 | 02 | 01 | 00 | | | |
| 001 00000101 | RAW 05 | 05 | 04 | 03 | 02 | 01 | 00 | | |
| 001 00000110 | RAW 06 | 06 | 05 | 04 | 03 | 02 | 01 | 00 | |
| 001 00000111 | RAW 07 | 07 | 06 | 05 | 04 | 03 | 02 | 01 | 00 |
| 001 00001000 | RAW 08 | 08 | 07 | 06 | 05 | 04 | 03 | 02 | 01 |
| 01 010 | CACHE 2 | 06 | 08 | 07 | 05 | 04 | 03 | 02 | 01 |

FIG. 23

IMAGE DATA

| 01 | 23 | 45 | 67 | 89 | AB | 00 | 00 | 00 | 00 |
|----|----|----|----|----|----|----|----|----|----|
| ** | ** | ** | ** | ** | ** | ** | ** | ** | ** |
| ** | ** | ** | ** | ** | ** | ** | ** | ** | ** |
| ** | ** | ** | ** | ** | ** | ** | ** | ** | ** |
| 01 | 23 | 45 | 67 | 89 | AB | 89 | AB | 89 | AB |

| CODE | MEANING OF CODE |
|------|-----------------|
| 1 001 10 | COPY UP 6 |
| 0001 001 00 | COPY LEFT 4 |

FIG. 32

| COMMAND | COMMAND CODE | MEANING |
|---|---|---|
| COPY UP 1 | 1 <NUMBER OF BYTES> | COPY DATA WITH LENGTH INDICATED BY <NUMBER OF BYTES> FROM UPPER REFERENCE POSITION OF HIGH PRIORITY |
| COPY UP 2 | 011 <NUMBER OF BYTES> | COPY DATA WITH LENGTH INDICATED BY <NUMBER OF BYTES> FROM UPPER REFERENCE POSITION OF LOW PRIORITY, AND REPLACE UPPER REFERENCE POSITION OF HIGH PRIORITY BY THAT OF LOW PRIORITY |
| RAW | 001 <8-BIT DATA> | 1-BYTE RAW DATA HAVING VALUE <8-BIT DATA> |
| COPY LEFT 1 | 010 <NUMBER OF BYTES> | COPY DATA WITH LENGTH INDICATED BY <NUMBER OF BYTES> FROM LEFT REFERENCE POSITION OF HIGH PRIORITY |
| COPY LEFT 2 | 0001 <NUMBER OF BYTES> | COPY DATA WITH LENGTH INDICATED BY <NUMBER OF BYTES> FROM LEFT REFERENCE POSITION OF LOW PRIORITY, AND REPLACE LEFT REFERENCE POSITION OF HIGH PRIORITY BY THAT OF LOW PRIORITY |
| EOB | 0000 | END OF COMMAND BLOCK |

FIG. 33A

IMAGE DATA

| ** | ** | ** | ** | ** | ** | ** | ** | ** | ** |
|----|----|----|----|----|----|----|----|----|----|
| ** | ** | ** | ** | ** | ** | ** | ** | ** | ** |
| 12 | 34 | 56 | 78 | 9A | BC | DE | 00 | 00 | 00 |
| ** | ** | ** | ** | ** | ** | ** | ** | ** | ** |
| 00 | 00 | 12 | 34 | 56 | 78 | 00 | BC | DE | 00 |

FIG. 33B

| CODE | MEANING OF CODE |
|------|-----------------|
| 001 00000000 | RAW 00 |
| 010 1 | COPY LEFT1 1 |
| 011 001 00 | COPY UP2 4 |
| 001 00000000 | RAW 00 |
| 1 01 1 | COPY UP1 3 |

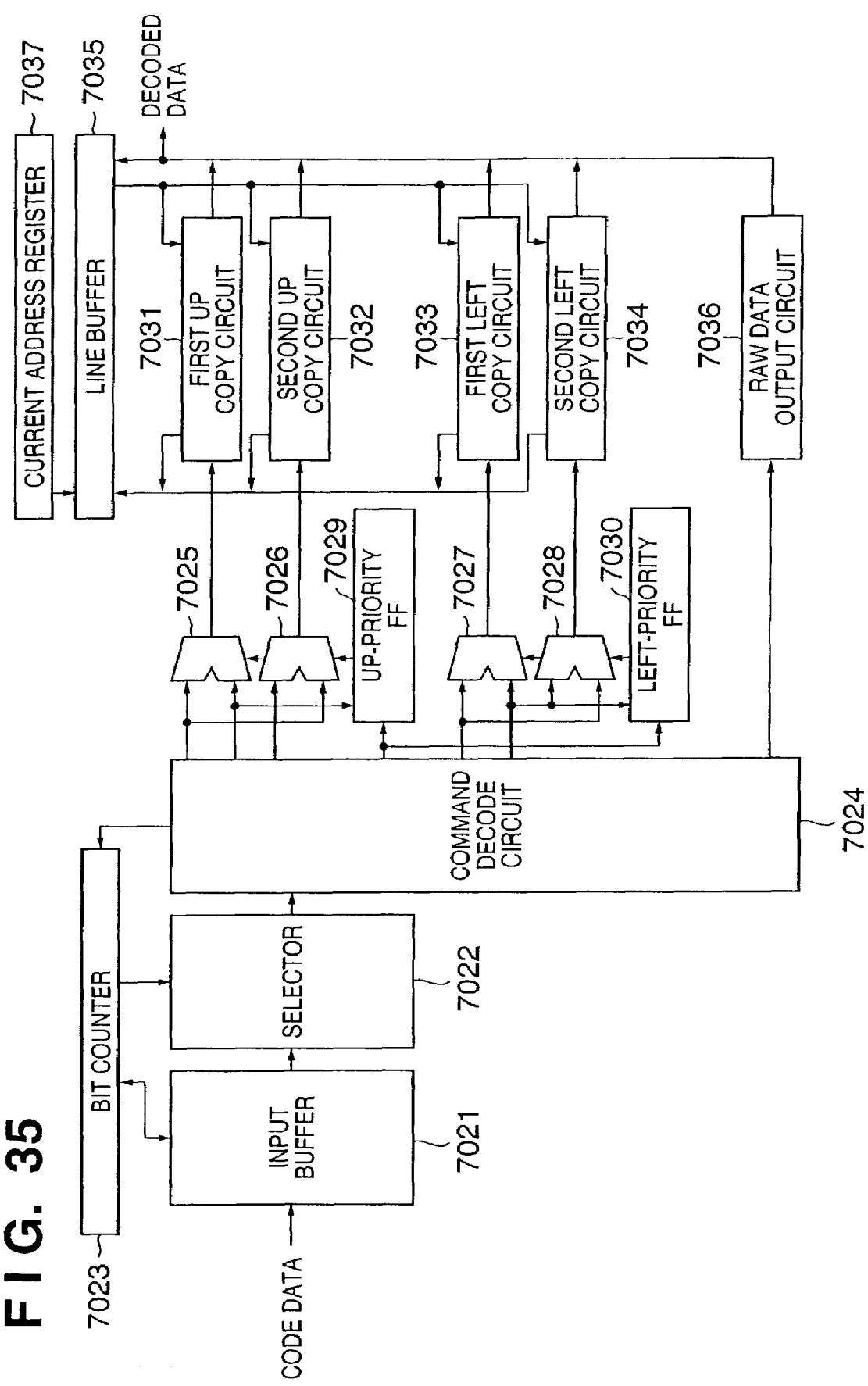

IMAGE DATA CODING APPARATUS, IMAGE DATA DECODING APPARATUS, IMAGE DATA CODING METHOD AND IMAGE DATA DECODING METHOD

FIELD OF THE INVENTION

The present invention relates to an image processing apparatus and method for encoding an image or decoding an encoded image, a program, and a storage medium.

BACKGROUND OF THE INVENTION

Upon rasterizing print data output from an application program which arranges and outputs identical background patterns called a wallpaper or texture and printing the image data, when this image data is compressed to reduce its data size, it is easy to compress the entire image data if the background pattern itself can be compressed well. However, the background pattern itself cannot often be compressed well, and it is not easy in such case to compress the entire image data well.

FIG. 10 shows an example of such print data, in which the background is formed by arranging identical patterns, as shown in FIG. 11.

As conventional compression techniques, an encoding method such as runlength or delta-law coding which refers to neighboring pixels using strong tendency that a pixel value has the same value as neighboring pixels, and compresses these pixels if they have identical values is known.

Also, an encoding method such as LZ77 coding or LZ78 coding that refers to pixels within a broad range to detect a pixel sequence having identical values, and compresses data by utilizing such pixel sequence is available. According to these methods, since pixels which are located at considerably distant positions and have identical values can be detected and used in compression, the aforementioned wallpaper can be compressed well.

Also, an encoding method such as JPEG coding, which can compress a background pattern itself well, is known.

Japanese Patent Application No. 2000-76424 discloses a compression method by detecting the period of a texture.

However, according to the runlength or delta-law coding, when the aforementioned wallpaper or the like is compressed, since its repetition period assumes a value as large as, e.g., 1024 pixels, the wallpaper or the like cannot be compressed well if only neighboring pixels are referred to.

According to LZ77 or LZ78 coding, since pixels within a broad range must be referred to upon encoding, the computation volume is large, and the time required to encode is long. According to these methods, since pixels within a broad range must be referred to upon decoding, a large-size buffer memory is required, and such methods cause an increase in cost, when a decoding function is provided to a printer.

According to JPEG, since the computation volume upon encoding is large, the time required to encode is long. Also, according to this method, the computation volume upon decoding is also large, and this method causes an increase in cost when a decoding function is provided to a printer.

According to Japanese Patent Application No. 2000-76424, since a huge volume of computations are required using background pattern data since it is based on Fourier analysis or autocorrelation function, it is impossible to achieve high-speed encoding.

The present invention has been made in consideration of the aforementioned problems, and has as its object to compress the entire image at a high speed and high compression ratio upon encoding an image having periodicity, especially, image data formed by arranging identical background patterns such as a wallpaper or the like.

It is another object of the present invention to reduce the circuit scale of a decoding circuit that decodes codes obtained by encoding an image formed by arranging identical background patterns such as a wallpaper or the like, and to implement low-cost decoding without requiring any large-size buffer memory.

In a method of compressing data, when data of interest matches a previous data sequence, the runlength of the same data is encoded; otherwise, the data itself is encoded.

For example, in LZ77 compression, when data of interest matches a data sequence at an arbitrary position within a moving window of a predetermined size, the position of that data sequence and the runlength of the same data are encoded; otherwise, the data itself is encoded.

On the other hand, upon compressing image data, the following method is known. That is, when data of interest matches data at one or a plurality of predetermined positions, e.g., a data sequence at an upper or left position of the data to be encoded, the runlength of the same data is encoded; otherwise, the data itself is encoded.

On the other hand, a method disclosed in Japanese Patent Laid-Open No. 6-242924 is known. In this method, data which appears latest is stored in a cache buffer, and if a cache hit has occurred, an index where the data that matches is stored is encoded, thus encoding data to a shorter code than that obtained by encoding data itself.

However, in the above method, when the frequency of occurrence of matching of data sequences is low, many codes are obtained by encoding data themselves, and the compression ratio drops considerably.

On the other hand, in the method disclosed in Japanese Patent Laid-Open No. 6-242924, even when data of interest matches a previous data sequence, that redundancy cannot be used in compression, and it is difficult to obtain a high compression ratio.

The present invention has been made in consideration of the aforementioned problems, and has as its object to obtain a high compression ratio by utilizing redundancy if data of interest matches a previous data sequence, and can minimize any compression ratio drop even when the frequency of occurrence of matching of data sequences is low.

Upon rasterizing print data output from an application program which arranges and outputs identical background patterns called a wallpaper or texture and printing the image data, when this image data is compressed to reduce its data size, it is easy to compress the entire image data if the background pattern itself can be compressed well.

However, the background pattern itself cannot often be compressed well, and it is not easy in such case to compress the entire image data well. FIG. 10 shows an example of such print data. According to the prior art, image data of a text part can be compressed well, but image data of a background pattern cannot be compressed well since it has an irregular pattern and has low correlation with neighboring image data. Since the background pattern normally has a broad area, and one page has a large proportion of the background pattern, if the background pattern cannot be compressed well, the entire page cannot be compressed well, either.

The present invention has been made in consideration of the aforementioned problems, and has as its object to provide an image processing method that includes an encoding method which can compress image data having a background pattern well, even when the background pattern has low correlation with neighboring pixel data, and a decoding method which decodes codes obtained by that encoding method.

Conventionally, upon compressing image data, by utilizing the tendency that pixels having identical pixel values successively appear in the horizontal and vertical directions, it is a common practice to encode data with reference to a pixel at a left or upper neighboring position having high correlation with the position of interest.

On the other hand, when image data to be compressed has undergone a color reduction process using a dither matrix, since neighboring pixels undergo different arithmetic operations in the color reduction process, a pixel of interest has higher correlation with pixels separated by the period of the dither matrix used in the color reduction process than neighboring pixels. Therefore, in such case, if the period of the dither matrix used in the color reduction process is known, encoding is done with reference to data at a left or upper position separated by the period of the dither matrix from the position of interest.

However, according to the above method, if the period of image data is different from that of the dither matrix, since the correlation between the position of interest and reference position is not so high, efficient compression is disturbed. For example, such problem is often posed when image data to be compressed has undergone the color reduction process after resolution conversion of an original image having a different resolution.

The present invention has been made in consideration of the aforementioned problems, and has as its object to efficiently encode an image using especially a short code.

SUMMARY OF THE INVENTION

In order to achieve the object of the present invention, for example an image processing apparatus for encoding an image, comprises:

color reduction means for applying a color reduction process to the image using a matrix having a predetermined size;

period detection means for detecting a period of patterns of the image; and encoding means for encoding the image that has undergone the color reduction process using the period and/or a relative positional relationship of pixels according to the size of the matrix.

In order to achieve the object of the present invention, for example an image processing apparatus for decoding an encoded image, comprises:

storage means for storing decoded pixel sequences for a predetermined number of lines;

decode means for decoding commands contained in encoded data; and decoding means for reading a pixel sequence from the storage means in accordance with the command decoded by the decode means, for storing the read pixel sequence in the storage means, for sequentially outputting the read pixel sequence to a predetermined buffer, and for, when the command decoded by the decode means is a command that pertains to a line direction of the image, changing a read position from the storage means in accordance with a period of patterns of the image.

In order to achieve the object of the present invention, for example an image processing method for encoding an image, comprises:

the color reduction step of applying a color reduction process to the image using a matrix having a predetermined size;

the period detection step of detecting a period of patterns of the image; and the encoding step of encoding the image that has undergone the color reduction process using the period and/or a relative positional relationship of pixels according to the size of the matrix.

In order to achieve the object of the present invention, for example an image processing method for decoding an encoded image, decoded pixel sequences for a predetermined number of lines being stored in predetermined storage means, the method comprises:

the decode step of decoding commands contained in encoded data; and the decoding step of reading a pixel sequence from the storage means in accordance with the command decoded in the decode step, of storing the read pixel sequence in the storage means, of sequentially outputting the read pixel sequence to a predetermined buffer, and of changing, when the command decoded in the decode step is a command that pertains to a line direction of the image, a read position from the storage means in accordance with a period of patterns of the image.

In order to achieve the object of the present invention, for example an image processing apparatus for compressing an image, comprises:

color conversion means for generating image data for respective colors by executing a color conversion process of the image using a dither matrix; and command output means for generating encoded data of the image data for respective colors by comparing a pixel data sequence to be compressed with a pixel data sequence which has a predetermined positional relationship with the pixel data sequence to be compressed, and outputting a command indicating the comparison contents together with a command indicating a length of an identical pixel data sequence.

In order to achieve the object of the present invention, for example an image processing apparatus for compressing an image, comprises:

color conversion means for generating image data for respective colors by executing a color conversion process of the image using a dither matrix;

encoding means for encoding the image data for respective colors by compression; and output means for outputting encoded data obtained by the encoding means, the encoding means comprises:

first command output means for obtaining a length of an identical pixel sequence by comparing a pixel data sequence of a column to be compressed with a pixel data sequence of a column which has a predetermined positional relationship with the column to be compressed, and outputting a command indicating the length together with a command indicating the comparison contents as the identical pixel data sequence;

second command output means for, when the length is zero, obtaining a length of an identical pixel data sequence by comparing the pixel data sequence of the column to be compressed with a pixel data sequence which has a predetermined positional relationship in that column, and outputting a command indicating the length together with a command indicating the comparison contents as the identical pixel data sequence;

storage means for, when both the lengths obtained by the first and second command output means are zero, storing some or all of the pixel data sequence of the column to be compressed;

third command output means for, when both the lengths obtained by the first and second command output means are zero, comparing pixel data to be compressed with the pixel data sequence stored in the storage means, and outputting a command indicating the comparison contents together with a command indicating a position of identical pixel data in the storage means as the pixel data to be compressed; and fourth command output means for, when both the lengths obtained by the first and second command output means are zero, and when it is determined as a result of comparison by the third command output means that the pixel data to be compressed does not match any pixel data in the storage means, outputting a command indicating the pixel data to be compressed, and the encoding means generating encoded data that contains some or all of commands output from the first to fourth command output means.

In order to achieve the object of the present invention, for example an image processing apparatus for decoding encoded data, comprises:

first storage means for storing decoded pixel data sequences;

second storage means for storing pixel data sequences obtained by shifting the decoded pixel data sequences by the predetermined number of pixels;

third storage means for storing a raw pixel data sequence contained in the encoded data; and reconstruction means for specifying contents of various commands that indicate results of comparison between a pixel data sequence in a column to be compressed, and a pixel data sequence in a column having a predetermined positional relationship with that column, which comparison is made upon generating the encoded data, and reconstructing an image using pixel data stored in the first, second, or third storage means in accordance with the specified contents.

In order to achieve the object of the present invention, for example an image processing method for compressing an image, comprises:

the color conversion step of generating image data for respective colors by executing a color conversion process of the image using a dither matrix; and the command output step of generating encoded data of the image data for respective colors by comparing a pixel data sequence to be compressed with a pixel data sequence which has a predetermined positional relationship with the pixel data sequence to be compressed, and outputting a command indicating the comparison contents together with a command indicating a length of an identical pixel data sequence.

In order to achieve the object of the present invention, for example an image processing apparatus for compressing an image, comprises:

the color conversion step of generating image data for respective colors by executing a color conversion process of the image using a dither matrix;

the encoding step of encoding the image data for respective colors by compression; and the output step of outputting encoded data obtained in the encoding step, the encoding step comprises:

the first command output step of obtaining a length of an identical pixel sequence by comparing a pixel data sequence of a column to be compressed with a pixel data sequence of a column which has a predetermined positional relationship with the column to be compressed, and outputting a command indicating the length together with a command indicating the comparison contents as the identical pixel data sequence;

the second command output step of obtaining, when the length is zero, a length of an identical pixel data sequence by comparing the pixel data sequence of the column to be compressed with a pixel data sequence which has a predetermined positional relationship in that column, and outputting a command indicating the length together with a command indicating the comparison contents as the identical pixel data sequence;

the storage step of storing, when both the lengths obtained in the first and second command output steps are zero, some or all of the pixel data sequence of the column to be compressed in predetermined storage means;

the third command output step of comparing, when both the lengths obtained in the first and second command output steps are zero, pixel data to be compressed with the pixel data sequence stored in the storage step, and outputting a command indicating the comparison contents together with a command indicating a storage position of identical pixel data in the storage step as the pixel data to be compressed; and the fourth command output step of outputting, when both the lengths obtained by the first and second command output steps are zero, and when it is determined as a result of comparison in the third command output step that the pixel data to be compressed does not match any pixel data in the storage step, a command indicating the pixel data to be compressed, and the encoding step including the step of generating encoded data that contains some or all of commands output from the first to fourth command output steps.

In order to achieve the object of the present invention, for example an image processing method to be executed by an image processing apparatus which decodes encoded data, and comprises first storage means for storing decoded pixel data sequences, second storage means for storing pixel data sequences obtained by shifting the decoded pixel data sequences by the predetermined number of pixels, and third storage means for storing a raw pixel data sequence contained in the encoded data, comprises the step of:

specifying contents of various commands that indicate results of comparison between a pixel data sequence in a column to be compressed, and a pixel data sequence in a column having a predetermined positional relationship with that column, which comparison is made upon generating the encoded data, and reconstructing an image using pixel data stored in the first, second, or third storage means in accordance with the specified contents.

In order to achieve the object of the present invention, for example an image processing apparatus for encoding image data for a plurality of pages, comprises:

a first memory for storing image data of a page to be encoded;

encoding means for encoding the image data stored in the first memory; and a second memory for storing image data of an immediately preceding page, wherein the encoding means encodes with reference to the image data of the immediately preceding page stored in the second memory.

In order to achieve the object of the present invention, for example an image processing apparatus for decoding codes obtained by encoding image data for a plurality of pages, comprises:

decoding means for decoding the codes;

a first memory for storing image data decoded by the decoding means;

re-encoding means for encoding the image data stored in the first memory;

a second memory for storing codes encoded by the re-encoding means; and re-decoding means for decoding the codes stored in the second memory, wherein when the decoding means decodes a code that refers to image data of an immediately preceding page, the decoding means decodes with reference to image data decoded by the re-decoding means, and the re-encoding means encodes with reference to only image data of a page to be encoded.

In order to achieve the object of the present invention, for example an image processing method to be executed by an image processing apparatus, which comprises a first memory for storing image data of a page to be encoded, and a second memory for storing image data of an immediately preceding page, and encodes image data for a plurality of pages, comprises:

the encoding step of encoding the image data stored in the first memory, wherein the encoding step includes the step of encoding with reference to the image data of the immediately preceding page stored in the second memory.

In order to achieve the object of the present invention, for example an image processing method to be executed by an image processing apparatus which comprises first and second memories, and decodes codes obtained by encoding image data for a plurality of pages, comprises:

the decoding step of decoding the codes;

the first storage step of storing image data decoded in the decoding step in the first memory;

the re-encoding step of encoding the image data stored in the first memory;

the second storage step of storing codes encoded in the re-encoding step in the second memory; and the re-decoding step of decoding the codes stored in the second memory, wherein when a code that refers to image data of an immediately preceding page is decoded in the decoding step, decoding is made in the decoding step with reference to image data decoded in the re-decoding step, and encoding is made in the re-encoding step with reference to only image data of a page to be encoded.

In order to achieve the object of the present invention, for example an image processing apparatus for encoding an image, comprises:

encoding means for comparing a data sequence that follows data of interest with a data sequence that follows reference data, and encoding a data sequence of an arbitrary length of identical data which follow the data of interest, to a code command according to a positional relationship between the data of interest and the reference data; and replacement means for, when the data of interest and the reference data have a specific positional relationship, replacing a code command corresponding to the specific positional relationship by a code command having a shorter code length after encoding by the encoding means.

In order to achieve the object of the present invention, for example an image processing apparatus for decoding an image on the basis of encoded data consisting of code commands, comprises:

storage means for storing data of the decoded image;

a plurality of decoding means for reading out data stored at positions corresponding to the code commands in the storage means, and externally outputting the readout data as decoded data corresponding to the code commands; and holding means for holding a value which changes in accordance with code commands to be decoded, wherein the decoding means, corresponding to the value held by the holding means, of the plurality of decoding means executes a decoding process.

In order to achieve the object of the present invention, for example an image processing apparatus for encoding an image, comprises:

the encoding step of comparing a data sequence that follows data of interest with a data sequence that follows reference data, and encoding a data sequence of an arbitrary length of identical data which follow the data of interest, to a code command according to a positional relationship between the data of interest and the reference data; and the replacement step of replacing, when the data of interest and the reference data have a specific positional relationship, a code command corresponding to the specific positional relationship by a code command having a shorter code length after encoding in the encoding step.

In order to achieve the object of the present invention, for example an image processing method for decoding an image on the basis of encoded data consisting of code commands, comprises:

the storage step of storing data of the decoded image in predetermined storage means;

a plurality of the decoding steps of reading out data stored at positions corresponding to the code commands in the storage means, and externally outputting the readout data as decoded data corresponding to the code commands; and the holding step of holding a value which changes in accordance with code commands to be decoded in predetermined holding means, wherein a decoding process is done in the decoding step, corresponding to the value held by the holding means, of the plurality of the decoding steps.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of codes contained in encoded data generated by a printer driver 4 shown in FIG. 1;

FIG. 4 is a table showing an example of count codes;

FIG. 5 is a table for explaining examples of use of respective codes shown in FIGS. 3 and 4;

FIG. 10 shows an example of print data;

FIG. 13 shows the format of image data before encoding or after decoding;

FIG. 14 is a view for explaining how to store the image data shown in FIG. 13 at respective addresses of a line buffer 31;

FIG. 20 is a table for explaining an example of codes which are contained in encoded data generated by a printer driver 4 in the third embodiment of the present invention;

FIG. 21 is a table showing an example of codes (<number of bytes>) which indicate lengths that follow a COPY UP command and COPY LEFT command;

FIG. 22 is a view for explaining image data, and a method of storing this image data in a cache buffer by a RAW command and CACHE command;

FIG. 23 is a view for explaining image data, and a method of encoding this image data to a COPY UP command and COPY LEFT command;

FIG. 32 shows an example of an encoding table generated by a printer driver 4 in the sixth embodiment of the present invention;

FIG. 33A shows image data to be encoded;

FIG. 33B shows image data to be encoded;

FIG. 35 is a block diagram showing the basic arrangement of a decoding circuit 513 shown in FIG. 19 in the sixth embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 17:
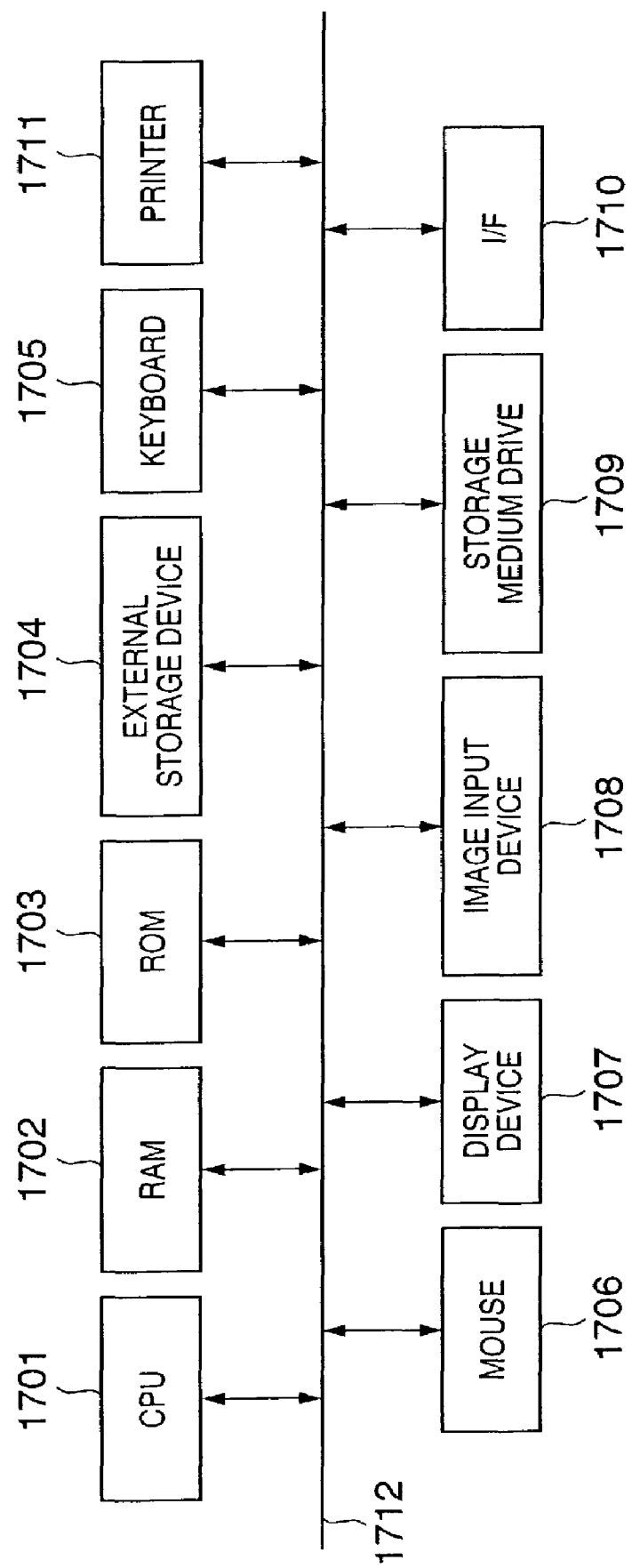
FIG. 17 is a block diagram showing the basic arrangement of an image processing apparatus in an embodiment of the present invention.

FIG. 17 shows the basic arrangement of an image processing apparatus of this embodiment. This embodiment uses a general personal computer or workstation as the image processing apparatus.

Reference numeral 1701 denotes a CPU which controls the overall apparatus using programs and data stored in a RAM 1702 and ROM 1703, and also executes an image compression process to be described later. Reference numeral 1702 denotes a RAM which has an area for temporarily storing programs, data, and the like loaded from an external storage device 1704 or storage medium drive 1709, and also has a work area used by the CPU 1701 upon executing various processes. Reference numeral 1703 denotes a ROM for storing control programs (e.g., a boot program) of the overall apparatus and control data (e.g., setup data of this apparatus). Reference numeral 1704 denotes an external storage device such as a hard disk or the like, which saves programs, data, and the like installed from the storage medium drive 1709. When data to be stored exceeds the work area of the RAM 1702, the external storage device 1704 can provide a deficient area as a file. Reference numerals 1705 and 1706 respectively denote a keyboard and mouse, which are used as pointing devices and can input various instructions to the apparatus. Reference numeral 1707 denotes a display device which comprises a CRT, liquid crystal display, or the like, and can display images and text. Reference numeral 1708 denotes an image input device, which comprises a digital camera, scanner, or the like, and can input an image as digital data to the RAM 1702 or external storage device 1704 via an image sensing operation, scan operation, or the like.

Reference numeral 1709 denotes a storage medium drive, which loads programs, data, and the like from a storage medium such as a CD-ROM, DVD-ROM, or the like, and outputs the loaded programs and data to the RAM 1702, external storage device 1704, and the like. Reference numeral 1710 denotes an I/F (interface), which serves as an I/F upon exchanging data with an external device. For example, the I/F 1710 receives an image which is to undergo a compression process from an external device via the Internet, LAN, or the like, and sends a compressed image to the external device. Reference numeral 1711 denotes a printer, which serves as an image decompression device that decompresses the compressed image, and prints it on a recording medium such as a paper sheet and the like. Reference numeral 1712 denotes a bus which interconnects the aforementioned units.

Figure 1:
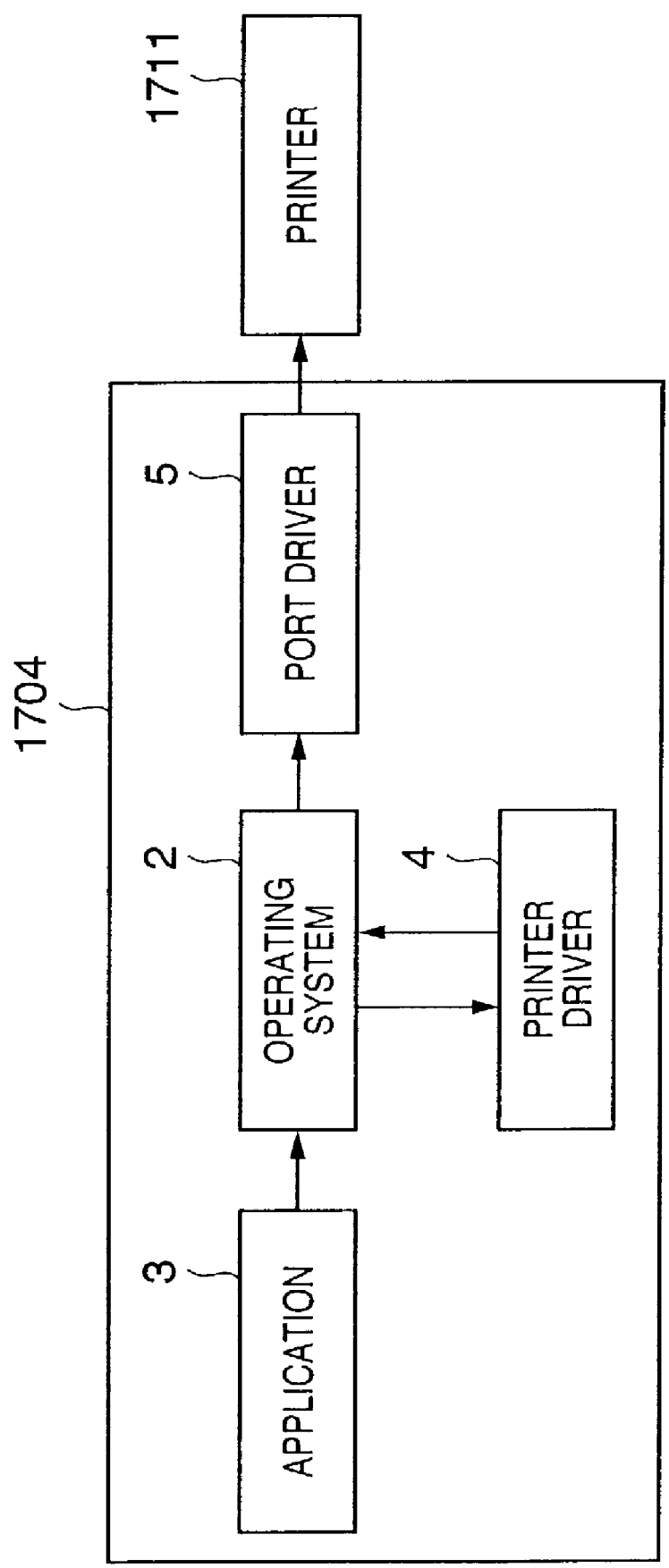
FIG. 1 is a schematic block diagram showing the relationship between a software group used upon printing an image, and a printer.

FIG. 1 shows the relationship between a software group used upon printing an image, and the printer. The external storage device 1704 stores an operating system (to be abbreviated as OS hereinafter) 2, application 3, printer driver 4, and port driver 6.

The OS 2 manages the respective units shown in FIG. 1 (except for the printer 1711), and software such as the application 3, printer driver 4, port driver 5, and the like. The application 3 is application software such as a word processor or the like, and executes a creation process, print process, and the like of documents in accordance with the contents that the operator instructs using the keyboard 1705 and mouse 1706. Reference numeral 4 denotes a printer driver, which receives a print instruction issued by the application 3 via the OS 2, and converts the print instruction into a printer command that the printer 1711 can interpret. Reference numeral 5 denotes a port driver which receives the printer command converted by the printer driver 4 via the OS 2, and transmits it to the printer 1711 via a parallel port (not shown). The printer 1711 prints according to the printer command received from the port driver 5.

Figure 2:
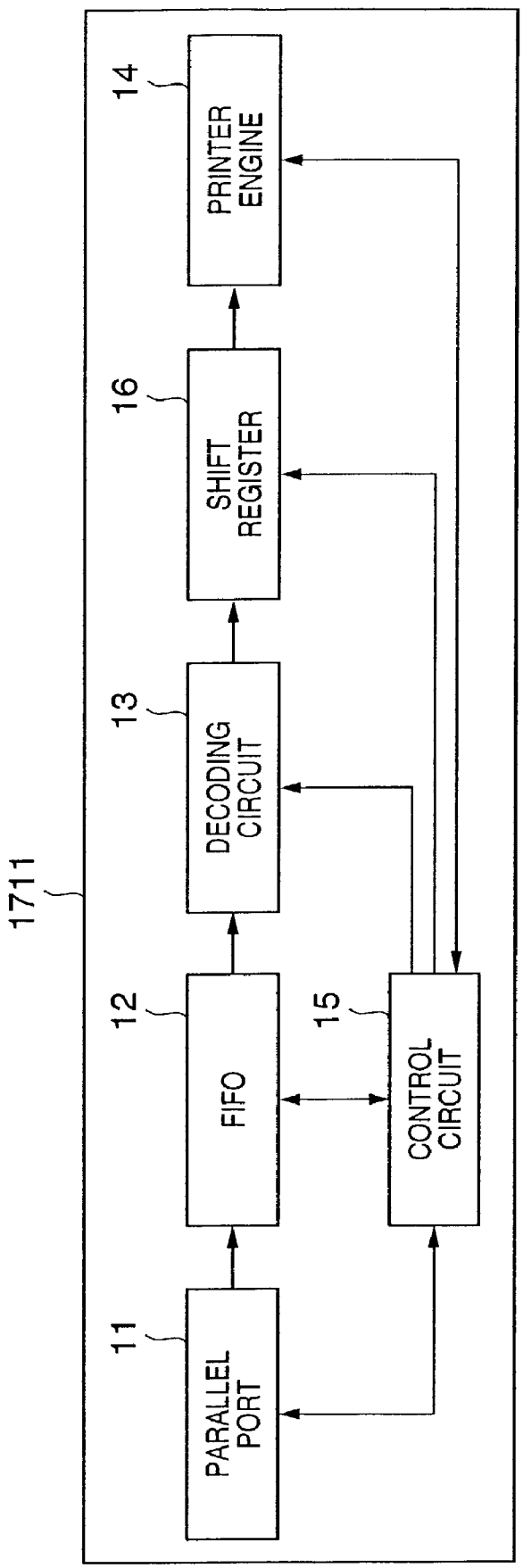
FIG. 2 is a block diagram showing the basic arrangement of a printer 1711.

FIG. 2 is a block diagram showing the basic arrangement of the printer 1711. In FIG. 2, reference numeral 11 denotes a parallel port for receiving the printer command output from the port driver 5. Reference numeral 12 denotes a FIFO (First In, First Out) memory, which stores encoded data (to be described in detail later) contained in the printer command received by the parallel port 11, and outputs the stored data to a decoding circuit 13 in a FIFO order. The decoding circuit 13 decodes the encoded data stored in the FIFO memory 12, and outputs decoded image data to a shift register 16. A printer engine 14 is a laser beam printer engine, and prints in accordance with image data output from the decoding circuit 13 in response to an instruction from a control circuit 15. Reference numeral 15 denotes a control circuit, which comprises, e.g., a 1-chip CPU, and controls the parallel port 11, FIFO memory 12, decoding circuit 13, and printer engine 14. Reference numeral 16 denotes a shift register, which segments byte data decoded by the decoding circuit 13 into a plurality of pixels, and sequentially outputs respective pixels to the printer engine 14.

The operations of the respective units shown in FIGS. 1 and 2 in a print process will be described below.

When the operator operates the application 3 using the keyboard 1705 and mouse 1706 to generate print data, and inputs a print instruction of the generated print data, the application 3 passes the print instruction to the printer driver 4 via the OS 2. The printer driver 4 generates image data to be printed on the basis of the print instruction issued by the application 3, and then binarizes this image data by a dither process using a dither matrix. In this case, the printer driver 4 generates encoded data from the binarized image data on the basis of an encoding sequence to be described later, and outputs the encoded data together with a print control command which designates the paper size, the line length and the number of lines of image data (bitmap data), a compression parameter command that designates compression parameters, and a page end command indicating the end of a page. The port driver 5 transmits the set of commands and the encoded data generated by the printer driver 4 to the printer 1711.

The control circuit 15 receives the printer command via the parallel port 11. The control circuit 15 holds the print control command and compression parameter designation command of the received printer command for the purpose of print control. The encoded data in the received printer command is stored in the FIFO memory 12. After that, when the control circuit 15 detects completion of reception of the printer command which forms one page upon reception of, e.g., the page end command, it instructs the printer engine 14 to start the print process. Upon instruction of start of the print process, the printer engine 14 requests the shift register 16 to output image data. The shift register 16 reads out decoded data from the decoding circuit 13, and stores the readout decoded data in advance. Upon receiving the output request from the printer engine 14, the shift register 16 outputs the stored decoded data to the printer engine 14, and requests the decoding circuit 13 to output subsequent decoded data when a free buffer is formed in the shift register 16. In this way, the encoded data is sequentially decoded and output as image data (decoded data), and the print process is complete upon completion of output of all image data for one page. When the application 3 issues an image output instruction of a background pattern, the printer driver 4 detects it in a sequence to be described later, and obtains the period of background patterns. Upon detection of a background pattern, the printer driver 4 encodes the image data using the period of background patterns in accordance with a sequence to be described later.

Codes to be generated by the printer driver 4 shown in FIG. 1 will be described below with reference to tables shown in FIGS. 3 and 4.

FIG. 3 is a table for explaining an example of codes contained in encoded data, which is generated by the printer driver 4 shown in FIG. 1. A code to be explained in this embodiment designates one of four different manipulations, i.e., an up copy manipulation that copies a data sequence in a line a predetermined number of lines above the current line, a near left copy manipulation that copies a data sequence a predetermined number of bytes on the left side of the current position in a single line, a far left copy manipulation that copies a data sequence a predetermined number of bytes on the left side of the current position in a single line, and a raw data manipulation that directly designates data. Note that predetermined positions to be referred to by the upper and near left copy manipulations are values according to the period of the dither matrix, and a predetermined position to be referred to by the far left copy manipulation is a value according to the period of background patterns.

As shown in FIG. 3, when a code (command code) starts with "0", it indicates a RAW command, and directly designates subsequent 8-bit data (<data8>) as raw data. When a code starts with "10", it indicates a COPY UP command, and makes an up copy manipulation for the number of bytes indicated by a subsequent count code (<count>). When a code starts with "110", it indicated a COPY NEAR LEFT command, and makes a near left copy manipulation for the number of bytes indicated by a subsequent count code (<count>). When a code starts with "1110", it indicates a COPY FAR LEFT command, and makes a far left copy manipulation for the number of bytes indicated by a subsequent count code (<count>). When a code starts with "11110", it indicates a COUNT HIGH command, and adds 64 multiples of a number indicated by a subsequent count code (<count>) to the count code of one of the following COPY UP, COPY NEAR LEFT, and COPY FAR LEFT commands. When a code starts with "11111", it indicates an EOB command, and indicates the end of a code sequence.

FIG. 4 is a table showing an example of the aforementioned count codes. As shown in FIG. 4, when bits of a command code are "111111", this code indicates a COUNT0 code, and means that the count is zero. When bits of a command code starts with "0", this code indicates a COUNT1 code, and means that the count is 1. When bits of a command code starts with "10", this code indicates a COUNT2-3 code, and when the subsequent 1-bit data (<data1>) is 0, a command code "010" is formed and means 2 bytes. On the other hand, when the subsequent 1-bit data is 1, a command code "011" is formed, and means 3 bytes. That is, when the bit sequence of the command code starts with "01", it means a 2- or 3-byte length.

When bits of a command code start with "110", this code indicates a COUNT4-7 code. Since 2-bit data follows this code, this code means a length ranging from 4 bytes to 7 bytes. When bits of a command code start with "1110", this code indicates a COUNT8-15 code. Since 2-bit data follows this code, this code means a length ranging from 8 bytes to 15 bytes. When bits of a command code start with "11110", this code indicates a COUNT16-31 code. Since 2-bit data follows this code, this code means a length ranging from 16 bytes to 31 bytes. When bits of a command code start with "111110", this code indicates a COUNT32-63 code. Since 2-bit data follows this code, this code means a length ranging from 32 bytes to 63 bytes.

Examples of use of the codes shown in FIGS. 3 and 4 will be described below with reference to FIG. 5. Note that code sequences shown in FIG. 5 are interpreted in turn from the above in the order codes are described.

Referring to FIG. 5, a code sequence "0 00000000" is interpreted as follows. That is, since the head code "0" indicates a RAW command, subsequent 8-bit data "00000000" is directly designated as raw data. Then, a code sequence "110 0" is interpreted as follows. Since the head code "110" is a COPY NEAR LEFT command, and the subsequent code "0" is a COUNT1 code, this sequence indicates a near left copy manipulation of 1 byte. A code sequence "10 10 1" is interpreted as follows. Since the head code "10" is a COPY UP command, and the subsequent code "10" is a COUNT2-3 code, this sequence indicates an up copy manipulation of a value obtained by adding 2 to the subsequent 1-bit code "1", i.e., 3 bytes. A code sequence "11110 10 0" is interpreted as follows. That is, since "11110" is a COUNT HIGH command, and subsequent "10" is a COUNT2-3 code, this sequence indicates to add to the count of the following command, 64 multiples of the sum of the subsequent 1-bit code "0" and 2, i.e., 128.

A code sequence "1110 111111" is interpreted as follows. That is, since "1110" is a COPY FAR LEFT command, and subsequent "111111" is a COUNT0 code, this sequence indicates a far left manipulation of 0 bytes. In this case, since the COUNT HIGH 2 command leads the code, 128 is added to the current command, and this sequence indicates a far left manipulation of 128 bytes. Also, a code "111111" is an EOB command, and indicates the end of the code sequence. The subsequent code "0000000" is stuffing bits required to adjust the byte boundary, and does not have any special meaning. Note that upon selecting the up copy position, near left copy position, and far left copy position in the encoding process to the aforementioned codes (image data commands), caution must be exercised to keep the following attentions in mind to improve the compression ratio.

For example, when an 8-bit grayscale original image undergoes a color reduction process to obtain a 1-bit binary image or a grayscale image of 4 bits or less, it is a common practice to attain color reduction by making arithmetic processes using different threshold values for respective pixels in the dither matrix used. In this case, since neighboring pixels undergo arithmetic operations using different threshold values, even when they have identical pixel values in an original images, pixel values after color reduction are often different. Hence, since neighboring pixels have low correlation, it is difficult to improve the compression ratio by referring to neighboring pixels.

Since the dithermatrix is applied periodically, i.e., a threshold value applied to a pixel of interest is equal to that of a slightly distant pixel (normally, a pixel separated by the period of the dither matrix) in place of neighboring pixels, the pixel of interest has high correlation with such pixel. Hence, by referring to a slightly distant pixel according to the period of the dither matrix in place of neighboring pixels, the compression ratio can be improved.

As for the upper position, the number of lines equal to the period of the dither matrix can be directly applied. However, as for the near and far left positions, since encoding is done for respective bytes, if a pixel is less than 8 bits, further caution must be exercised. For example, when a pixel is 1 bit, and the basic period of the dither matrix is 12 pixels, the period to be applied is 1.5 bytes. However, since encoding is done for each byte, a period in which an identical threshold value is applied for respective bytes is 3 bytes, and this period must be applied to the near left position. The same applies to the far left position. For example, when a pixel is 1 bit, the period of a background pattern is 1024 pixels, i.e., 128 bytes, and the basic period of the dither matrix is 12 pixels, since different threshold values are applied to positions for respective unit periods of the background patterns, pixels at these positions have low correlation, and it is difficult to improve the compression ratio. In this case, a position separated by 384 bytes as a least common multiple of 128 bytes and 3 bytes must be determined as the far left position.

Figure 6:
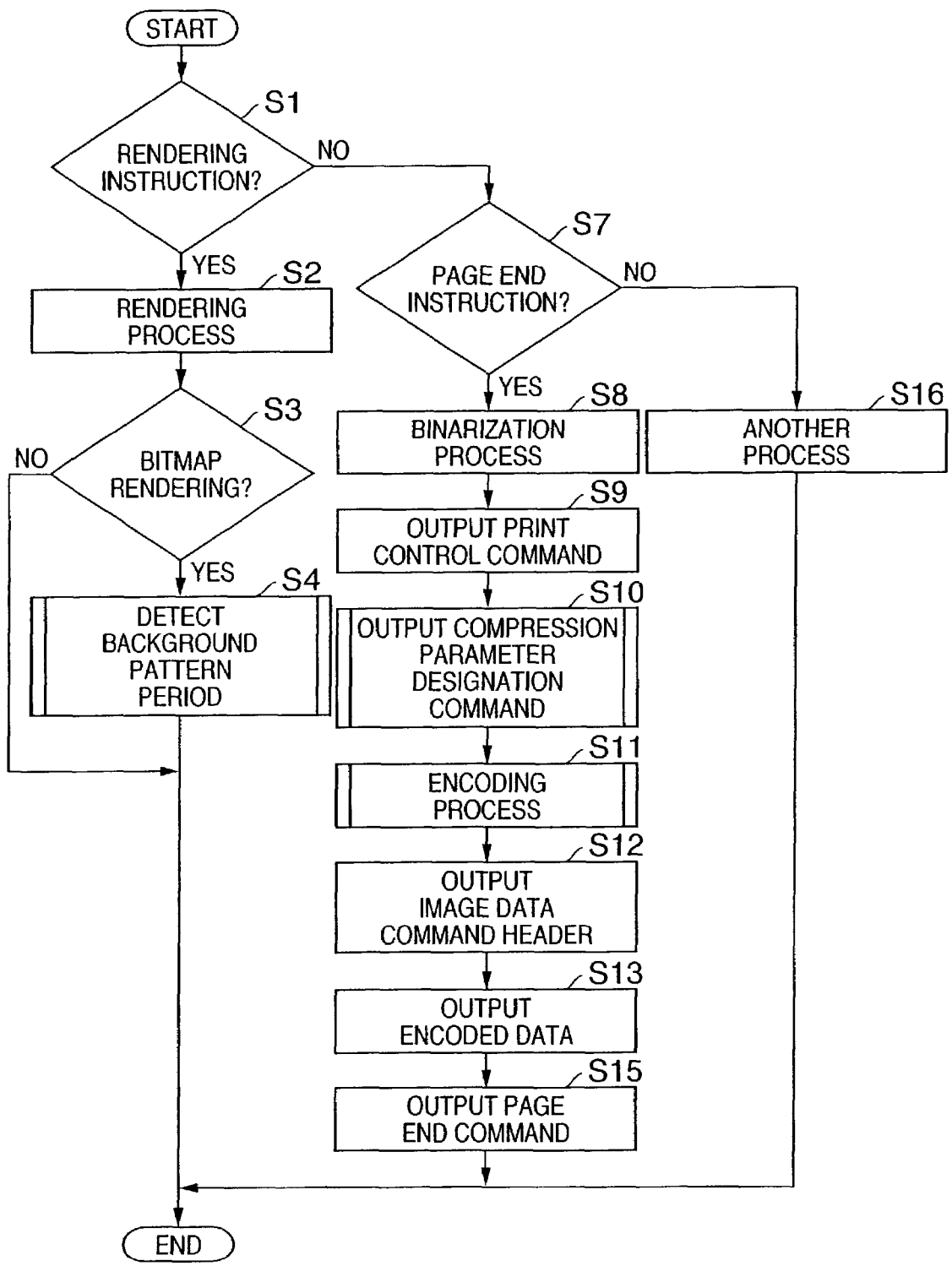
FIG. 6 is a flow chart of a main process to be executed by the printer driver 4.

Details of the process of the printer driver 4 will be described below with reference to the flow chart shown in FIG. 6. FIG. 6 is a flow chart of the main process to be executed by the printer driver 4. When the OS 2 calls the printer driver 4, it is checked in step S1 if the type of call is a rendering instruction. If the type of call is a rendering instruction, the flow advances to step S2 to execute a rendering process. More specifically, in the rendering process, text data, graphic data, bitmap data, or the like, which is designated from the application 3 via the OS 2, is converted into an 8-bit grayscale image, and the converted image is stored in the RAM 1702 or external storage device 1704.

It is checked in step S3 if the type of call is a bitmap rendering instruction. If the type of call is not a bitmap rendering instruction, the process ends. On the other hand, if the type of call is a bitmap rendering instruction, a background pattern period detection process (to be described later) is executed in step S4, and the process ends.

On the other hand, if it is determined in step S1 that the type of call is not a rendering instruction, the flow advances to step S7 to check if the type of call is a page end instruction. If the type of call is a page end instruction, the flow advances to step S8 to execute a binarization process. More specifically, the 8-bit grayscale image stored in the RAM 1702 or external storage device 1704 in step S2 is converted into a 1-bit monochrome image using a dither matrix.

In step S9, a print control command, i.e., a command that designates conditions required for the print process such as a paper size, paper cassette, resolution, the number of gray levels, the number of bytes per line, the number of lines per page, and the like, is output. In step S10, a compression parameter designation command, which designates an up copy vertical offset value used to designate the position of a copy source, i.e., the number of lines above the position of interest in the up copy manipulation, a near left copy horizontal offset value used to designate the position of a copy source, i.e., the number of bytes on the left side of the position of interest in the near left copy manipulation, and a far left copy horizontal offset value used to designate the position of a copy source, i.e., the number of bytes on the left side of the position of interest in the far left copy manipulation, is output.

Note that optimal values of the up copy vertical offset value and near left copy horizontal offset value are calculated theoretically or experimentally in accordance with the dither matrix used in step S8, and the calculated values are used. As the far left copy horizontal offset value, a value according to the background pattern period obtained in step S4 is used.

In step S11, image data is encoded in accordance with an encoding sequence to be described later. At this time, encoding is done using the up copy vertical offset value, and the near and far left copy horizontal offset values designated by the compression parameter designation command output in step S10. In step S12, an image data command header which designates the size and the number of lines of the image data encoded in step S11 is output. In step S13, the image data encoded in step S11 is output. In step S15, a command that designates the end of a page (page end command) is output, thus ending the process.

On the other hand, if it is determined in step S7 that the type of call is not a page end instruction, the flow advances to step S16 to execute another process according to the type of call, e.g., a process corresponding to a page start instruction, printer performance inquiry instruction, or the like, thus ending the process.

Figure 7:
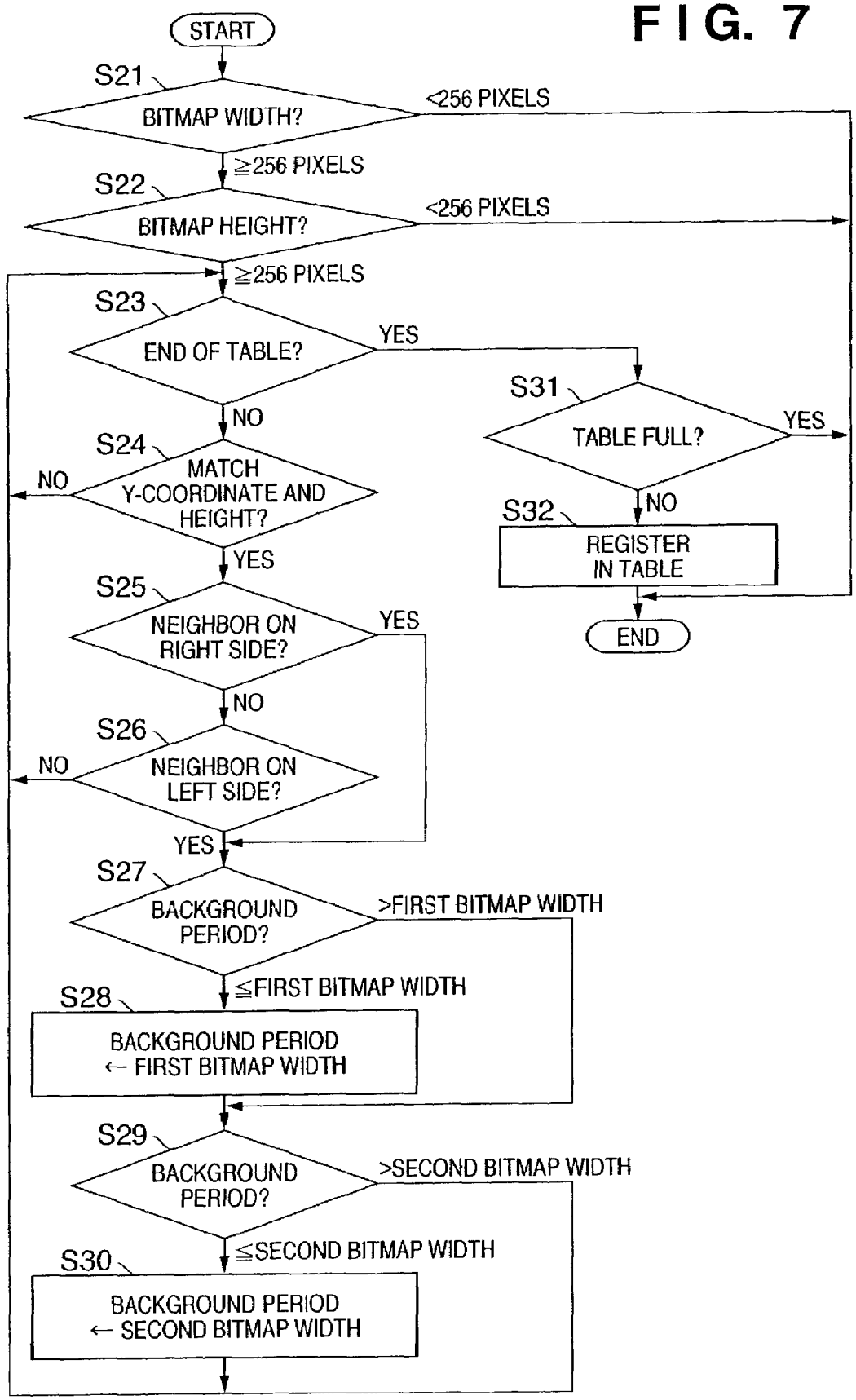
FIG. 7 is a flow chart showing details of the process in step S4.

Details of the process in step S4 will be described below with reference to FIG. 7. FIG. 7 is a flow chart showing details of the background pattern period detection process in step S4.

Figure 18:
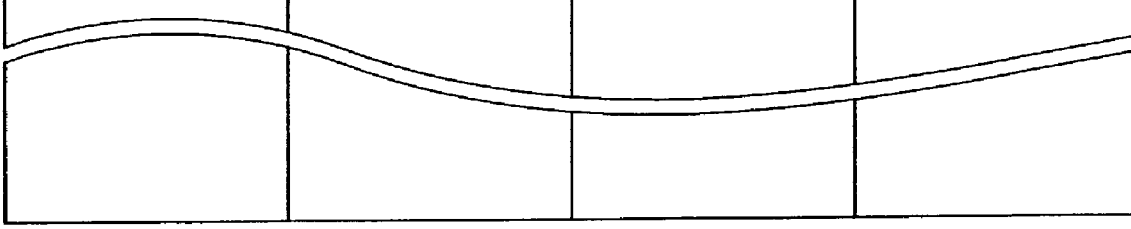
FIG. 18 shows an example of the configuration of a bitmap management table.

Upon receiving the bitmap rendering instruction, it is checked in step S21 if the width of this bitmap (to be referred to as a first bitmap hereinafter) is 256 pixels or more. If the bitmap width is not 256 pixels or more, the process ends. This is because the background pattern normally has a width and height as large as, e.g., 1024 pixels. Also, if the process is executed for a bitmap with a small width or height, the size of a table that manages bitmaps (to be referred to as a bitmap management table hereinafter) increases, and a long processing time is required to search the bitmap management table. Therefore, the background pattern period detection process for a bitmap with a small width or height is inhibited. Note that the bitmap management table is a fixed-size table used to manage bitmaps contained within one page, and stores information pertaining to only bitmaps which satisfy conditions to be described later in this embodiment. More specifically, as shown in, e.g., FIG. 18, the table manages the x- and y-coordinates of the upper left corner, width, and height of each bitmap. FIG. 18 shows an example of the configuration of the bitmap management table. The bitmap management table is cleared every time the process for a new page starts.

Referring back to FIG. 7, if the width of the bitmap is 256 pixels or more, the flow advances to step S22 to check if the height of the bitmap is 256 pixels or more. If the height of the bitmap is not 256 pixels or more, the process ends.

If the height of the bitmap is 256 pixels or more, the flow advances to step S23 to check if a search of the bitmap management table is complete. If the search is not complete, the flow advances to step S24 to search for a bitmap, which has the y-coordinate of the upper left corner and height that match those of the first bitmap, with reference to the y-coordinates of the upper left corners and heights of bitmaps stored in the bitmap management table. If no hit occurs, the flow returns to step S23 to repeat the search until the end of the bitmap management table is reached. On the other hand, if a hit occurs (the y-coordinate of the upper left corner and height of a second bitmap), the flow advances to step S25 to check if the first bitmap neighbors the right side of the second bitmap. More specifically, if the x-coordinate of the upper left corner of the second bitmap+the width of the second bitmap=the x-coordinate of the upper left corner of the first bitmap with reference to the bitmap management table, it is determined that the first bitmap neighbors the right side of the second bitmap. If the first bitmap neighbors the right side of the second bitmap, the flow jumps to step S27.

On the other hand, if the first bitmap does not neighbor the right side of the second bitmap, the flow advances to step S26 to check if the first bitmap neighbors the left side of the second bitmap. More specifically, if the x-coordinate of the upper left corner of the second bit map=the x-coordinate of the upper left corner of the first bitmap+the width of the first bitmap, it is determined that the first bitmap neighbors the left side of the second bitmap. If the first bitmap neighbors the left side of the second bitmap, the flow advances to step S27; otherwise, the flow returns to step S23.

In step S27, the width of the first bitmap is compared with a background period obtained by a process to be described later. Note that the background period is reset every time a process for a new page starts. If the background period is larger than the width of the first bitmap, the flow jumps to step S29. On the other hand, if the background period is equal to or smaller than the width of the first bitmap, the flow advances to step S28. The width of the first bitmap is substituted in the background period in step S28, and the flow then advances to step S29.

In step S29, the width of the second bitmap is compared with the background period. If the background period is larger than the width of the second bitmap, the flow jumps to step S31. On the other hand, if the background period is equal to or smaller than the width of the second bitmap, the flow advances to step S30. In step S30, the width of the second bitmap is substituted in the background period, and the flow jumps to step S31. In this manner, a maximum value of the background period used so far, and the widths of the two, right and left neighboring bitmaps is newly substituted in the background period. The reason why the maximum value is used is to eliminate the influence of the width smaller than the period, which occurs when the background bitmap is clipped at the left or right end of a paper sheet.

It is checked in step S31 if the bitmap management table is full. If the bitmap management table is full, since there is no room for storing (registering) information pertaining to a new bitmap, the process ends. On the other hand, if the bitmap management table is not full, the x- and y-coordinates of the upper left corner, width, and height of the first bitmap are stored in the bitmap management table, thus ending the process.

Upon completion of the process for one page, the maximum value of the widths of neighboring bitmaps in this page is stored in the background period. If no neighboring bitmaps are found in this page, zero is stored in the background period.

Figure 8:
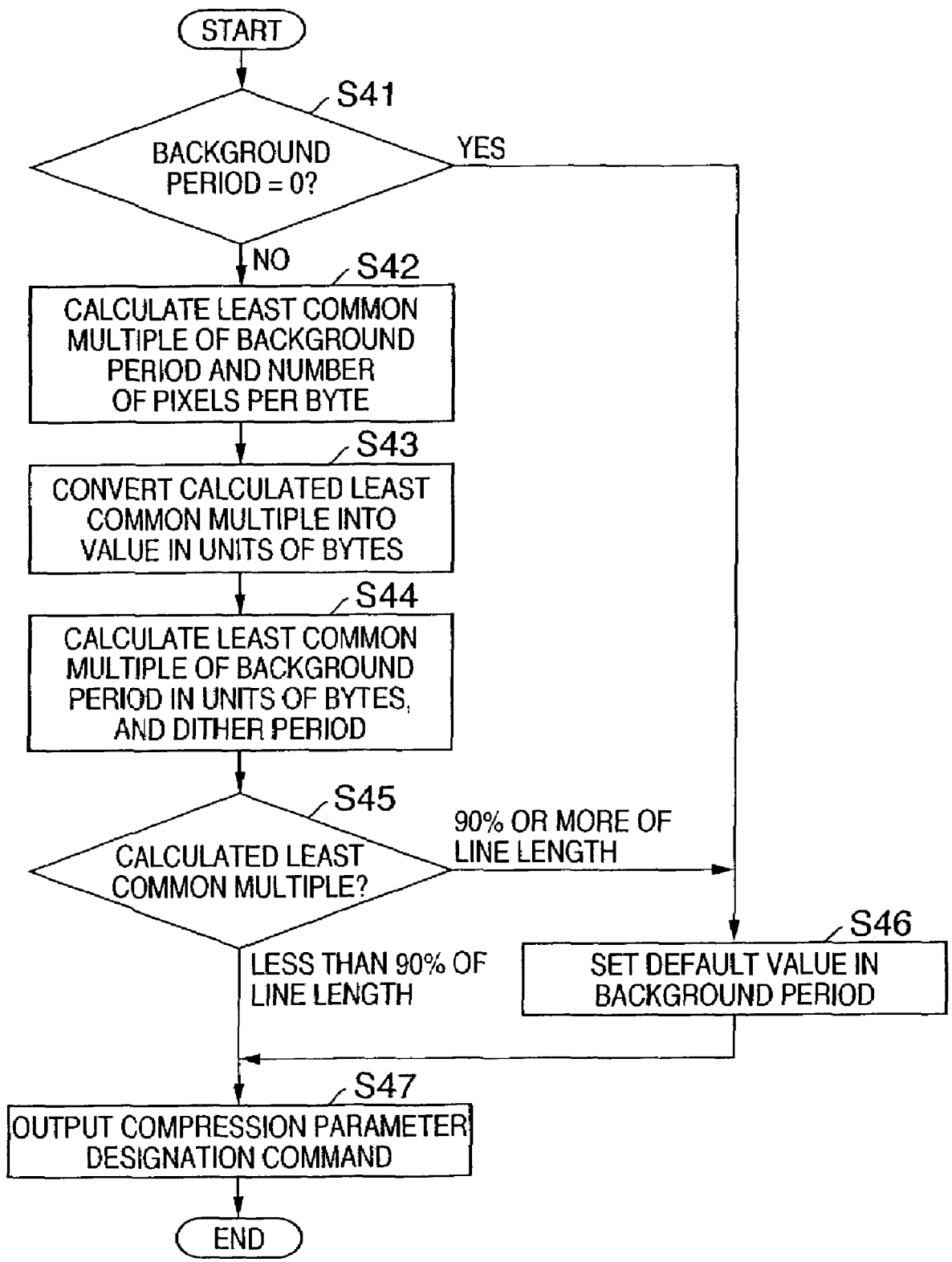
FIG. 8 is a flow chart showing details of the process in step S10;.

Details of the process in step S10 in FIG. 6 will be described below with reference to FIG. 8. FIG. 8 is a flow chart showing details of the process in step S10. It is checked in step S41 if the background period obtained in step S4 is zero. If the background period is not zero, i.e., if the period of background patterns is detected, the flow advances to step S42 to calculate a least common multiple of the background period and the number of pixels per byte. For example, if the background period is 1024 pixels, and one pixel is defined by 1 bit (the number of pixels per byte is 8), their least common multiple is 1024. On the other hand, if the background period is 511 pixels, and one pixel is defined by 4 bits (the number of pixels per byte is 2), their least common multiple is 1022. This process is done to convert the period for respective pixels into a period for respective bytes since encoding is done for respective bytes.

In step S43, the least common multiple calculated in step S42 is converted into that for respective bytes. More specifically, the least common multiple is divided by the number of pixels per byte. In step S44, a least common multiple of the background period for respective bytes calculated in step S43 and the dither period is calculated. For example, if the background period is 128 bytes, and the dither period is 2 bytes, their least common multiple is 128 bytes. On the other hand, if the background period is 511 bytes, and the dither period is 3 bytes, their least common multiple is 1533 bytes. That is, if the background period is not an integer multiple of the dither period, different pixel values are generated since points separated by the background period undergo different dither processes. Hence, the above process is done, so as to refer to points which are to undergo identical dither processes.

It is checked in step S45 if the least common multiple calculated in step S44 is less than 90% of the line length. If the least common multiple is less than 90% of the line length, the flow advances to step S47, and the up copy and near left copy positions according to the period of the dither matrix used in the binarization process in step S8, and the least common multiple (far left copy position) calculated in step S44 are output as a command for designating compression parameters (compression parameter designation command), thus ending the process.

On the other hand, if it is determined in step S41 that the background period is zero, and if it is determined in step S45 that the least common multiple calculated in step S44 is 90% or more of the line length, the flow advances to step S46 to set a default value in the background period. In these cases, since the background period cannot be detected, or since the background period is excessively large and does not contribute to improvement of the compression ratio, the default value is set instead. The default value is set in advance to be different from the near left copy position. For example, if the dither period is 16 pixels, and the number of pixels per byte is 8, the near left copy position is separated 2 bytes on the left side of the position of interest. In this case, the default value of the background period is set to be 1 byte. Although the point of interest normally has high correlation with a point separated by the dither period, as described above, when print data is expressed by black and white, two values like normal text or a table, the same result as that without any dither process is obtained. Also, since the point of interest has high correlation with neighboring points irrespective of the dither period, a position separated by 1 byte has higher correlation than a position separated by 2 bytes in such case, and can contribute to improvement of the compression ratio.

In step S47, the up copy and near left copy positions according to the period of the dither matrix used in the binarization process in step S8, and the default background period (far left copy position) set in step S46 are output as a command for designating compression parameters (compression parameter designation command), thus ending the process.

Figure 9A:
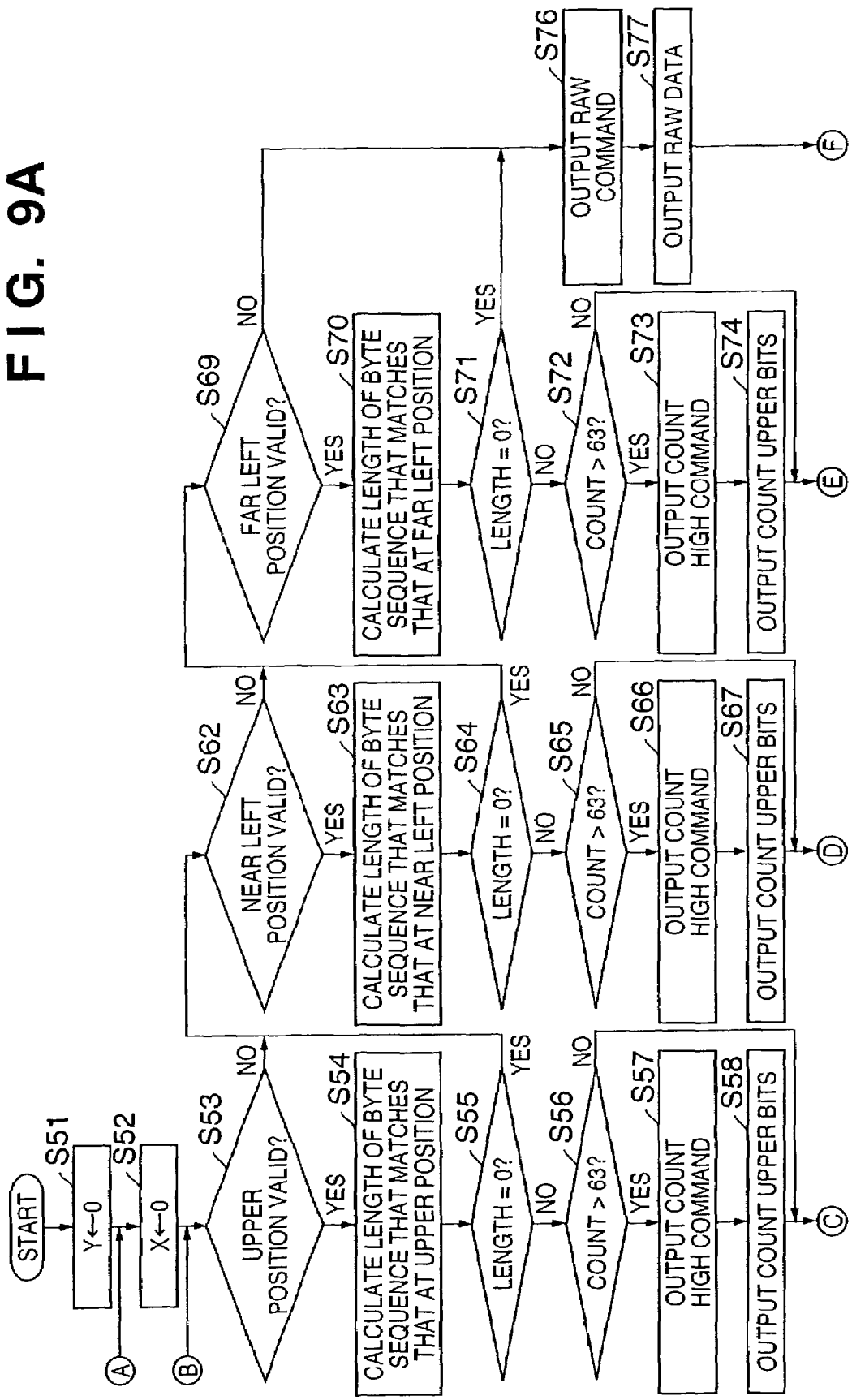
FIG. 9A is a flow chart showing details of the process in step S11.
Figure 9B:
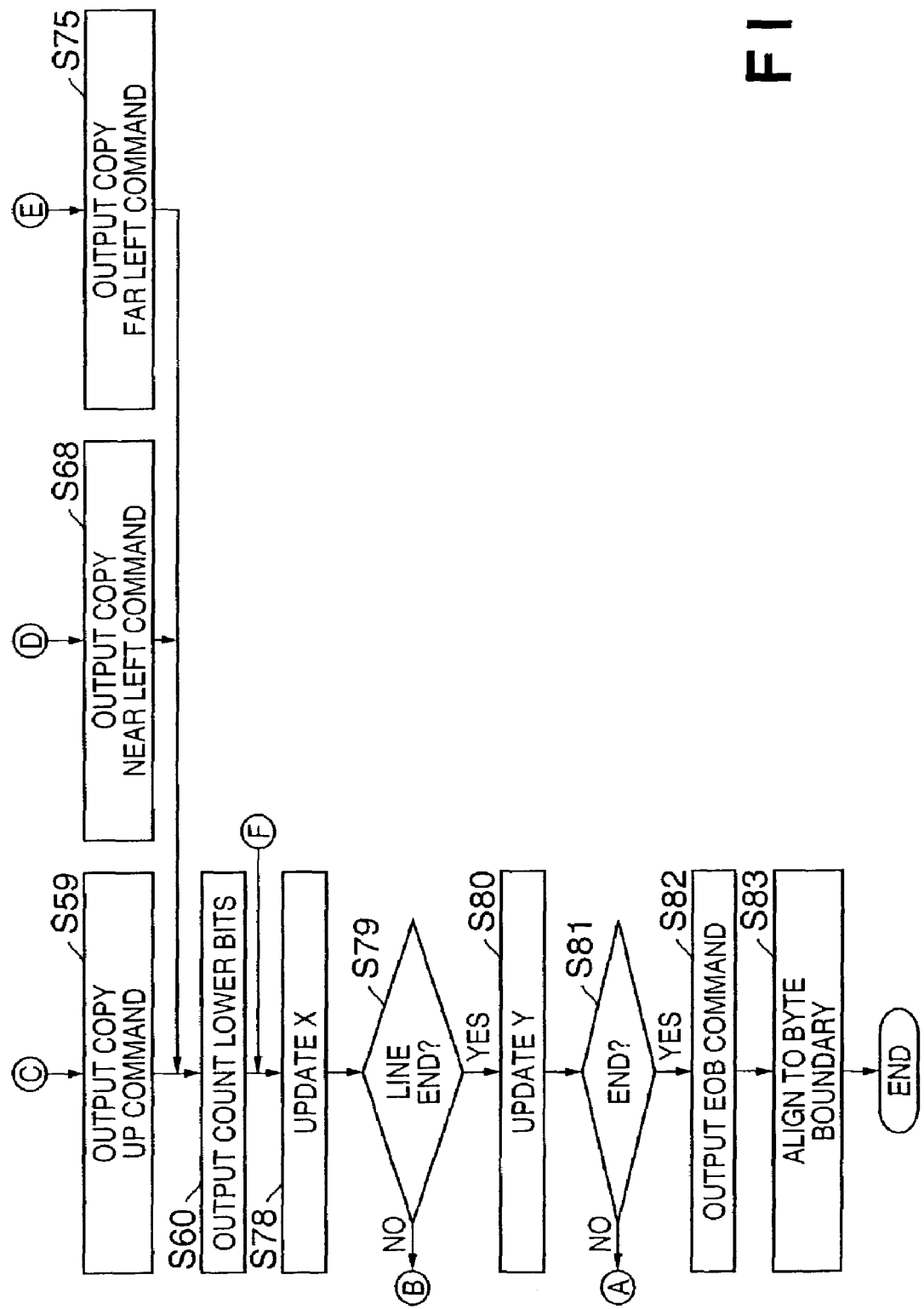
FIG. 9B is a flow chart showing details of the process in step S11.
Figure 11:
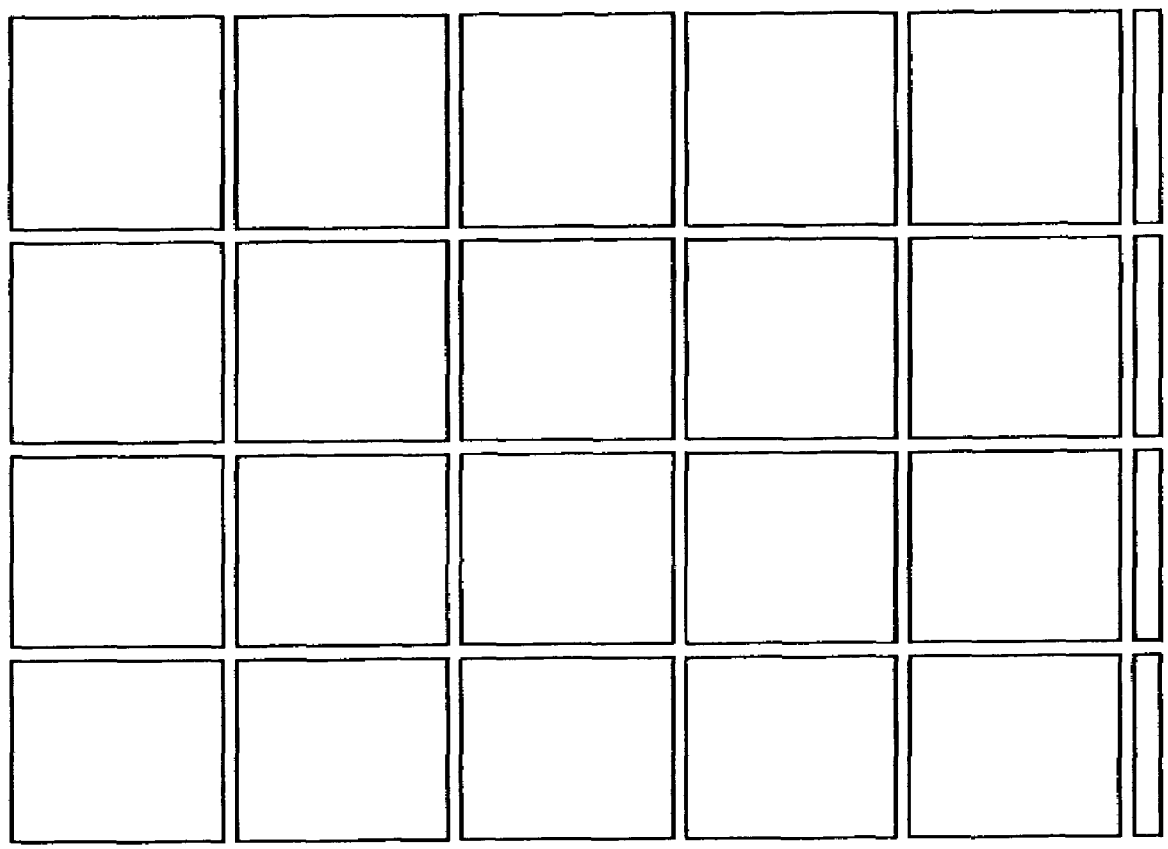
FIG. 11 shows respective patterns which form the print data shown in FIG. 10.

Details of the encoding process in step S11 in FIG. 6 will be described below with reference to FIG. 9A and FIG. 9B. FIG. 9A and FIG. 9B is a flow chart showing details of the encoding process in step S11.

In step S51, a line number Y is reset to zero. In step S52, a byte offset X from the line head is reset to zero.

It is checked in step S53 if an upper position falls within a valid image region. More specifically, it is checked if the number (Z) of lines indicating the up copy position, which is output in step S47 in FIG. 8, is larger than the line number Y. If the number Z of lines indicating the up copy position is equal to or smaller than the line number Y, since the upper position falls within a valid image region (a region present within a bitmap to be encoded), the length of identical bytes between a byte sequence which starts from the current position (X, Y) and a byte sequence which starts from the upper position (X, Y–Z) is calculated in step S54. In this case, if these two byte sequences are equal to each other up to the line end, the process in step S54 is aborted at the line end. On the other hand, if the length exceeds 4095 bytes as a maximum value of a count code, the process in step S54 is aborted at 4095 bytes.

It is checked in step S55 if the length obtained in step S54 is zero. If the length obtained in step S54 is not zero, the flow advances to step S56 to check if the length (count) obtained in step S54 is larger than 63. If the length obtained in step S54 is larger than 63, the flow advances to step S57 to output a COUNT HIGH command to the RAM 1702 or external storage device 1704. In step S58, the quotient (upper bits of the count) obtained by dividing the length obtained in step S54 by 64 is output to the RAM 1702 or external storage device 1704, and the flow advances to step S59. On the other hand, if the length obtained in step S54 is equal to or smaller than 63, the flow jumps to step S59.

In step S59, a COPY UP command is output to the RAM 1702 or external storage device 1704. In step S60, the remainder (lower bits of the count) obtained upon dividing the length obtained in step S54 by 64 is output to the RAM 1702 or external storage device 1704.

On the other hand, if it is determined in step S53 that the number of lines indicating the up copy position is larger than the line number Y, and if it is determined in step S55 that the calculated length is zero, the flow advances to step S62 to check if the near left position falls within a valid image region. More specifically, it is checked if the number (W) of bytes indicating the near left position, which is output in step S47, is larger than the byte offset X from the line head. If the number W of bytes indicating the near left position is equal to or smaller than the byte offset X from the line head, since the near left position falls within the valid image region, the flow advances to step S63 to obtain the length of identical bytes between a byte sequence what starts from the current position (X, Y) and a byte sequence that starts from the near left position (X–W, Y). In this case, if these two byte sequences are equal to each other up to the line end, the process in step S63 is aborted at the line end. On the other hand, if the length exceeds 4095 bytes as a maximum value of a count code, the process in step S63 is aborted at 4095 bytes.

It is checked in step S64 if the length obtained in step S63 is zero. If the length obtained in step S63 is not zero, the flow advances to step S65 to check if the length obtained in step S63 is larger than 63. If the length obtained in step S63 is larger than 63, the flow advances to step S66 to output a COUNT HIGH command to the RAM 1702 or external storage device 1704. In step S67, the upper bits of the count, i.e., the quotient obtained by dividing the length obtained in step S63 by 64, is output to the RAM 1702 or external storage device 1704, and the flow advances to step S68. On the other hand, if it is determined in step S65 that the length obtained in step S63 is equal to or smaller than 63, the flow jumps to step S68.

In step S68, a COPY NEAR LEFT command is output to the RAM 1702 or external storage device 1704. In step S60, the lower bits of the count, i.e., the remainder obtained upon dividing the length obtained in step S63 by 64, is output to the RAM 1702 or external storage device 1704.

On the other hand, if it is determined in step S62 that the number W of bytes indicating the near left position is larger than the byte offset X from the line head, and if it is determined in step S64 that the length is zero, the flow advances to step S69 to check if the far left position falls within a valid image region. More specifically, the number (R) of bytes indicating the far left copy position, which is output in step S47 in FIG. 8, is larger than the byte offset X from the line head. If the number R of bytes indicating the far left copy position is equal to or smaller than the byte offset X from the line head, since the far left position falls within the valid image region, the flow advances to step S70 to obtain the length (count) of identical bytes between a byte sequence that starts from the current position (X, Y) and a byte sequence that starts from the far left position (X−R, Y). In this case, if these two byte sequences are equal to each other up to the line end, the process in step S70 is aborted at the line end. On the other hand, if the length exceeds 4095 bytes as a maximum value of a count code, the process in step S70 is aborted at 4095 bytes. It is then checked in step S71 if the length obtained in step S70 is zero. If the length obtained in step S70 is not zero, the flow advances to step S72 to check if the length obtained in step S70 is larger than 63. If the length obtained in step S70 is larger than 63, the flow advances to step S73 to output a COUNT HIGH command to the RAM 1702 or external storage device 1704. In step S74, the upper bits of the count, i.e., the quotient obtained by dividing the length obtained in step S70 by 64, is output to the RAM 1702 or external storage device 1704, and the flow advances to step S75. On the other hand, if it is determined in step S72 that the length obtained in step S70 is equal to or smaller than 63, the flow jumps to step S75.

In step S75, a COPY FAR LEFT command is output to the RAM 1702 or external storage device 1704. In step S60, the lower bits of the count, i.e., the remainder obtained upon dividing the length obtained in step S70 by 64, is output to the RAM 1702 or external storage device 1704.

On the other hand, if it is determined in step S69 that the number R of bytes indicating the far left copy position is larger than the byte offset X from the line head, and if it is determined in step S71 that the obtained length is zero, the flow advances to step S76 to output a RAW command to the RAM 1702 or external storage device 1704, and then data (for one byte) at the current position (X, Y) to the RAM 1702 or external storage device 1704.

Upon completion of the aforementioned process, the flow advances to step S78 to add the number of processed bytes to X. It is then checked in step S79 if X has reached the line end, i.e., if X is equal to the number of bytes per line. If X is smaller than the number of bytes per line, the flow returns to step S53 to repeat the aforementioned process. On the other hand, if X is equal to the number of bytes per line, the flow advances to step S80 to add 1 to the line number Y, and it is then checked in step S81 if the process for the image is complete, i.e., if Y is equal to the number of lines of the image. If Y is smaller than the number of lines of the image, the flow returns to step S52 to repeat the aforementioned process. On the other hand, if Y is equal to the number of lines of the image, the flow advances to step S82 to output an EOB command to the RAM 1702 or external storage device 1704. In step S83, bits "0" which are required to reach the byte boundary (e.g., to make the length of the bit sequence output to the RAM 1702 or external storage device 1704 in the above encoding process be an integer multiple of 8) are output to a buffer, thus ending the process.

Figure 12:
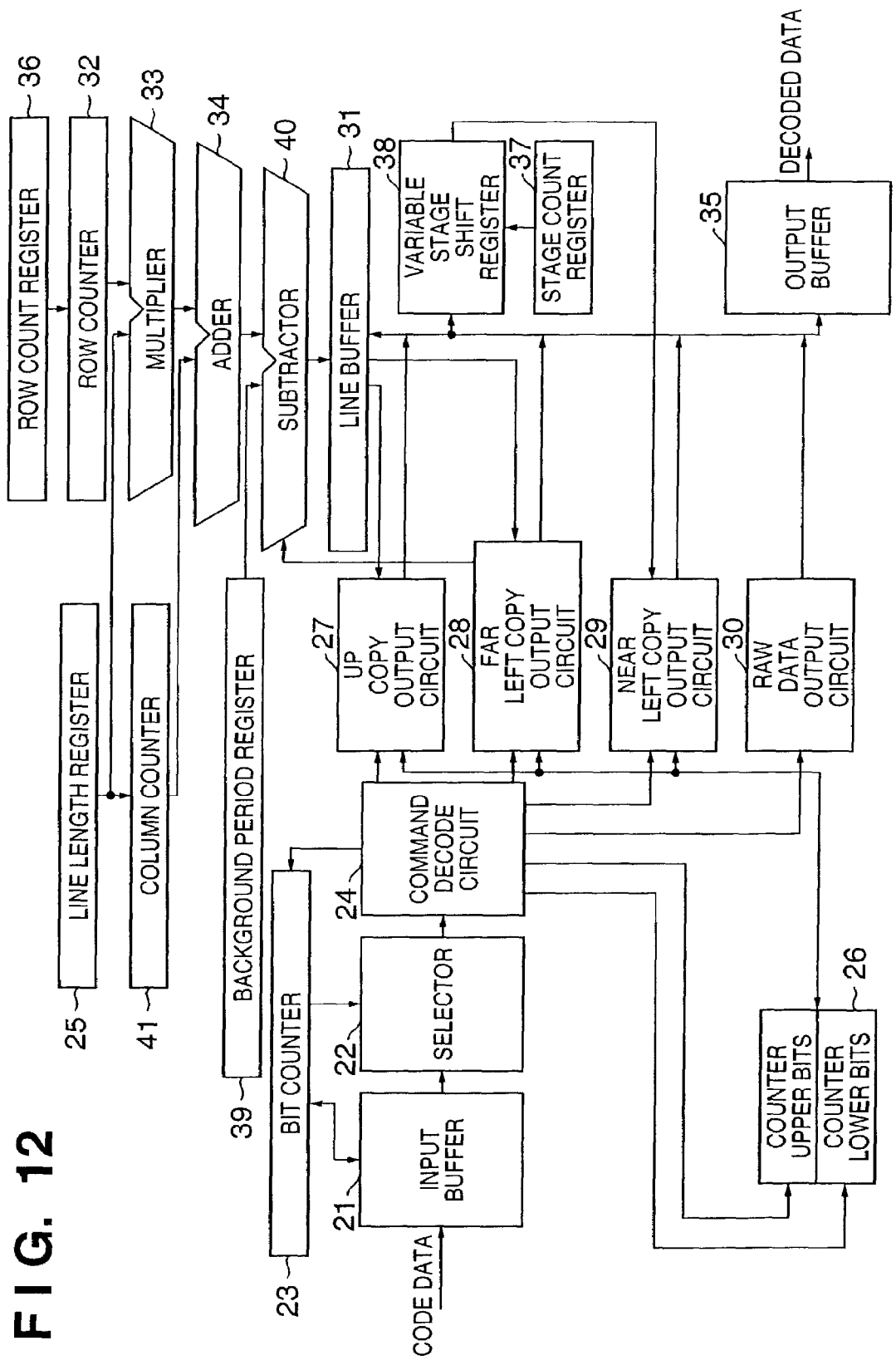
FIG. 12 is a block diagram showing the detailed arrangement of a decoding circuit 13.

The arrangement of the decoding circuit 13 shown in FIG. 2 will be described in detail below with reference to FIG. 12. FIG. 12 is a block diagram showing the detailed arrangement of the decoding circuit 13.

Referring to FIG. 12, an input buffer 21 stores code data read out from the FIFO memory 12. The input buffer 21 can store at least data for four bytes, and reads out and stores data from the FIFO memory 12, when the buffer has a free space and data to be read out is stored in the FIFO memory 12. The input buffer 21 discards processed data, which becomes unnecessary, when the number of processed bits, which is held by a bit counter 23, exceeds 8.

A selector 22 includes, e.g., 11 sets of 8-input selectors, and selects code data stored in the input buffer 21 in accordance with the number of processed bits indicated by the bit counter 23, thus aligning the start position of a command, which is required for a command decode circuit 24 upon processing. This process is required since there are eight start positions, i.e., the input buffer 21 holds data for respective bytes, while a command is variable-length data for respective bits.

The bit counter 23 stores the number of processed bits of code data stored in the input buffer 21. The bit counter 23 updates the stored value by adding the number of bits of a command output from the command decode circuit 24. The bit counter 23 subtracts the number of discarded bits when the input buffer discards processed data. When the command decode circuit 24 decodes an EOB command, the bit counter 23 receives an EOB signal from the command decode circuit 24, and executes a byte boundary alignment process. More specifically, if the lower 3 bits of the bit counter are all "0"s, the counter 23 does nothing; otherwise, the counter 23 adds 8 and clears the lower 3 bits.

The command decode circuit 24 comprises, e.g., a read-only memory or wired logic, decodes code data, which is aligned by the selector 22 and is stored in the input buffer 21, and outputs various signals mentioned above or to be described later to a counter 26, an up copy output circuit 27, a far left copy output circuit 28, a near left copy output circuit 29, a raw data output circuit 30, and the bit counter 23 in accordance with the decoded command.

A line length register 25 holds the number of bytes per line, which is output in advance from the control circuit 15.

The counter 26 holds the number of processed bytes of a COPY UP, COPY NEAR LEFT, or COPY FAR LEFT command, and its contents are decremented every time 1-byte data is output. In the counter 26, the upper 6 bits and lower 6 bits can be independently set. When the command decode circuit 24 decodes a COUNT HIGH command, the counter 26 stores, in the upper bits, the sum of the numbers of processed bytes, which are output from the command decode circuit 24. When the command decode circuit 24 decodes a COPY UP, COPY NEAR LEFT, or COPY FAR LEFT command, the counter 26 stores, in the lower bits, the number of processed bytes output from the command decode circuit 24.

The up copy output circuit 27 reads and outputs data at the up copy position, which is output from a line buffer 31, in accordance with the number of processed bytes held by the counter 26. The far left copy output circuit 28 reads and outputs data at the far left copy position, which is output from the line buffer 31, in accordance with the number of processed bytes held by the counter 26. The near left copy output circuit 29 reads and outputs data at the near left copy position, which is output from a variable stage shift register 38, in accordance with the number of processed bytes held by the counter 26. The raw data output circuit 30 outputs 1-byte raw data output from the command decode circuit 24.

A column counter 41 holds the current column address of the line buffer 31, and obtains a count value by adding the size of written data as needed every time data is written in the line buffer 31. When this count value has reached the number of bytes per line, which is held by the line length register 25, the count value is reset to zero.

The line buffer 31 holds decoded data for a plurality of lines, and inputs or outputs the decoded data in accordance with an address output from a subtractor 40.

A row counter 32 holds the current row address of the line buffer 31, and counts up every time the aforementioned count value is reset to zero. When the count result has reached the number of rows held by a row count register 36, it is reset to zero. The count of the row counter 32 is also reset to zero when the number of rows is output to the row count register 36.

A multiplier 33 calculates the product of the current row address held by the row counter 32 and the number of bytes per line, which is held by the line length register 25, so as to output the start address of the current row of the line buffer 31. An adder 34 calculates the sum of the start address of the current row output from the multiplier 33, and the current column address held by the column counter 41, so as to output the current address of the line buffer 31. A background period register 39 holds the number of bytes of the background period, which is output in advance from the control circuit 15.

When the subtractor 40 receives a signal, which instructs to read data at the far left copy position, from the far left copy output circuit, it subtracts the number of bytes of the background period held by the background period register 39 from the current address output from the adder 34; when the subtractor 40 does not receive any signal which instructs to read data at the far left copy position, it directly outputs the current address output from the adder 34.

An output buffer 35 stores output decoded data every time decoded data is output from the up copy output circuit 27, far left copy output circuit 28, near left copy output circuit 29, or raw data output circuit 30. The output buffer 35 outputs the stored decoded data upon receiving an image data output request from the shift register 16.

The row count register 36 holds the number of lines (up copy vertical offset value), which is output in advance from the control circuit 15.

A stage count register 37 holds a byte offset value indicating the near left position, which is output in advance from the control circuit 15. The variable stage shift register 38 comprises shift registers and a selector, forms shift registers corresponding to the number of stages equal to the byte offset value, which is held by the stage count register 37 and indicates the near left position, and outputs data obtained by delaying the output decoded data by the number of times one smaller than the value designated by the byte offset value, which is held by the stage count register 37 and indicates the near left position.

When the command decode circuit 24 decodes a COPY UP command, it decodes a count that follows the command, stores the decoded count in the lower bits of the counter 26, and outputs a signal that instructs to read data at the up copy position to the up copy output circuit 27. When a COUNT HIGH command does not come before the COPY UP command, the upper bits of the counter 26 store zero; when a COUNT HIGH command comes before the COPY UP command, the upper bits store the upper count indicated by the COUNT HIGH command. The up copy output circuit 27 reads out data, which is stored at addresses output from the adder 34 and subtractor 40 (in other words, the current position) in the line buffer 31, outputs the readout data to the line buffer 31 (since identical data is overwritten, this process may be skipped), and outputs it to the output buffer 35. On the other hand, the readout decoded data is input to the variable stage shift register 38 (from the head position). The data which have been already stored in the variable stage register 38 are shifted stage by stage, and 1 byte at the near left copy position, which corresponds to a position next to the current position, is output from the final stage of the variable stage shift register 38. The column counter 41 counts up, and the counter 26 counts down. In this manner, the decoded data are output until the counter 26 reaches zero.

When the command decode circuit 24 decodes a COPY FAR LEFT command, it decodes a count that follows the command, stores the decoded count in the lower bits of the counter 26, and outputs a signal that instructs to read data at the far left copy position to the far left copy output circuit 28. When a COUNT HIGH command does not come before the COPY FAR LEFT command, the upper bits of the counter 26 store zero; when a COUNT HIGH command comes before the COPY FAR LEFT command, the upper bits store the upper count indicated by the COUNT HIGH command. In order to temporarily output a signal which instructs to read data at the far left position, the far left copy output circuit reads decoded data, which is stored at an address obtained by subtracting the value of the background period held by the background period register from the output (current address) from the adder 34, i.e., the far left position in the line buffer 31, writes that data at the current position of the line buffer 31, and also outputs that data to the output buffer 35. Also, the readout decoded data is input to the variable stage shift register 38. The data already stored in the variable stage register 38 are shifted stage by stage, and 1 byte at the near left copy position, which corresponds to a position next to the current position, is output from the final stage of the variable stage shift register 38. The column counter 41 counts up, and the counter 26 counts down. In this manner, the decoded data are output until the counter 26 reaches zero.

When the command decode circuit 24 decodes a COPY NEAR LEFT command, it decodes a count that follows the command, stores the decoded count in the lower bits of the counter 26, and outputs a signal that instructs to read data at the near left copy position to the near left copy output circuit 29. When a COUNT HIGH command does not come before the COPY NEAR LEFT command, the upper bits of the counter 26 store zero; when a COUNT HIGH command comes before the COPY NEAR LEFT command, the upper bits store the upper count indicated by the COUNT HIGH command. The near left copy output circuit 29 outputs the 1-byte decoded data at the near left copy position, which is output from the variable stage shift register 38, to the output buffer 35, and writes it at the current position of the line buffer 31. Also, the readout decoded data is input to the variable stage shift register 38. The data already stored in the variable stage register 38 are shifted stage by stage, and 1 byte at the near left copy position, which corresponds to a position next to the current position, is output from the final stage of the variable stage shift register 38. The column counter 41 counts up, and the counter 26 counts down. In this manner, the decoded data are output until the counter 26 reaches zero.

When the command decode circuit 24 decodes a RAW command, it outputs 1-byte raw data (decoded data) that follows the command to the raw data output circuit 30. The raw data output circuit 30 outputs this decoded data to the output buffer 35, and also writes it at the current position of the line buffer 31. Also, this decoded data is input to the variable stage shift register 38. The data already stored in the variable stage register 38 are shifted stage by stage, and 1 byte at the near left copy position, which corresponds to a position next to the current position, is output from the final stage of the variable stage shift register 38.

When the command decode circuit 24 decodes a COUNT HIGH command, it decodes a count that follows the command, and stores the decoded count in the upper bits of the counter 26.

The data input/output operation of the line buffer 31 will be described below with reference to FIGS. 13 and 14. FIG. 13 shows the format of image data before encoding or after decoding, and shows an example wherein the length of one line is 10 bytes. As shown in FIG. 13, bytes (image data) line up in the order of 00, 01, . . . , 09 from the left of the first line, and bytes line up in the order of 10, 11, . . . , 19 from the left of the next line. The same applies to the subsequent lines.

FIG. 14 is a view for explaining how to store the image data shown in FIG. 13 at respective addresses of the line buffer 31, and shows an example wherein the length of one line is 10 bytes, and the number of lines indicating the up copy position is 3.

Initially, if both the row counter 32 and column counter 41 are zero, the first data is input/output to/from row address 0 and column address 0. Note that data output from the line buffer 31 is indefinite until image data for the first three lines are written.

When data is read out from row address 0 and column address 0 of the line buffer 31, and byte 00 shown in FIG. 13 is written at these addresses, the column counter 41 counts up and holds 1. When data is read out from row address 0 and column address 1, and byte 01 are written at these addresses, the column counter 41 counts up and holds 2. In this manner, after 10 bytes are written, since the column counter 41 holds 10, which are equal to the number of bytes per line held by the line length register 25, the column counter 41 holds zero, and the row counter 32 counts up and holds 1. When data is read out from row address 1 and column address 0 of the line buffer 31, and byte 10 is written at these addresses, the column counter 41 counts up and holds 1. In this manner, after data for 20 bytes are written, the column counter 41 holds zero, and the row counter 32 counts up and holds 3, which becomes equal to the number of lines held by the row count register 36. Then, the row counter 32 holds zero.

Since both the row counter 32 and column counter 41 are zero, first written byte 00 is read out, and byte 30 is then written. In this way, after data on three lines are read out, data on the current line are overwritten, and the line buffer 31 serves as a so-called ring memory.

The operation timings of the line buffer 31 and variable stage shift register 38 will be described below with reference to FIG. 15.

Figure 15:
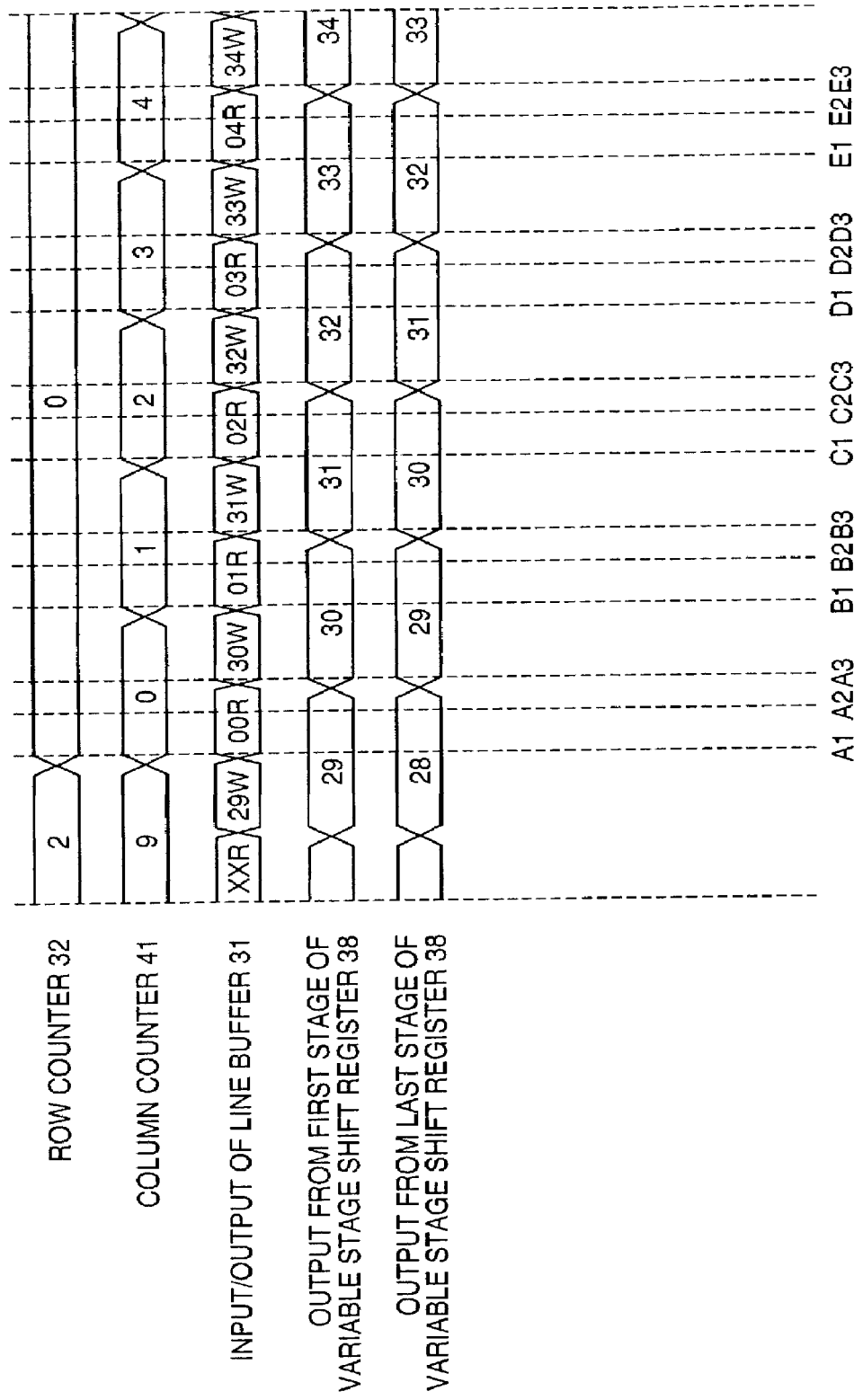
FIG. 15 is a chart for explaining the processing timings of the image data shown in FIG. 13.

FIG. 15 is a chart for explaining the processing timings of the image data shown in FIG. 13, and shows an example wherein the length of one line is 10 bytes, the number of lines that indicates the up copy position is 3, and the byte offset value indicating the near left copy position is 2 bytes.

In FIG. 15, A1 indicates the timing just upon completion of the process for the first three lines. As described above, since both the row counter 32 and column counter 41 are reset to zero, byte 00 shown in FIG. 14 are read out from the line buffer 31. When the up copy output circuit 27 is operating at timing A1, if data read out from the line buffer 31 is settled at timing A2, byte 00 is input to the up copy output circuit 27. The up copy output circuit 27 outputs decoded data until timing A3. At timing A3, the output decoded data is stored as byte 30 in the line buffer 31. At this time, a clock is input to the variable stage shift register 38, data already held in the variable stage shift register 38 are shifted stage by stage, and the first shift register stage holds the output decoded data, i.e., data byte 30. Since the variable stage shift register 38 forms a shift register, the number of stages of which is one smaller than the byte offset value, which is held by the stage count register 37 and indicates the near left position, the final stage of the variable stage sift register 38 outputs data 1 byte delayed from its first stage, i.e., byte 29. In this manner, every time decoded data is output, it is stored in the line buffer 31, and data already held in the variable shift register 38 are shifted stage by stage.

When the near left copy output circuit 29 is operating at timing C1, a data byte at the near left position, which is output from the final stage of the variable stage shift register 38, i.e., data byte 30, is input to the near left copy output circuit 29. The up copy output circuit 27 outputs decoded data until timing A3. At timing C3, the output decoded data is stored as data byte 32 in the line buffer 31, and the same operation as in the above description is then repeated.

The same applies to a case wherein the far left copy output circuit 28 or raw data output circuit 30 outputs data.

Figure 16:
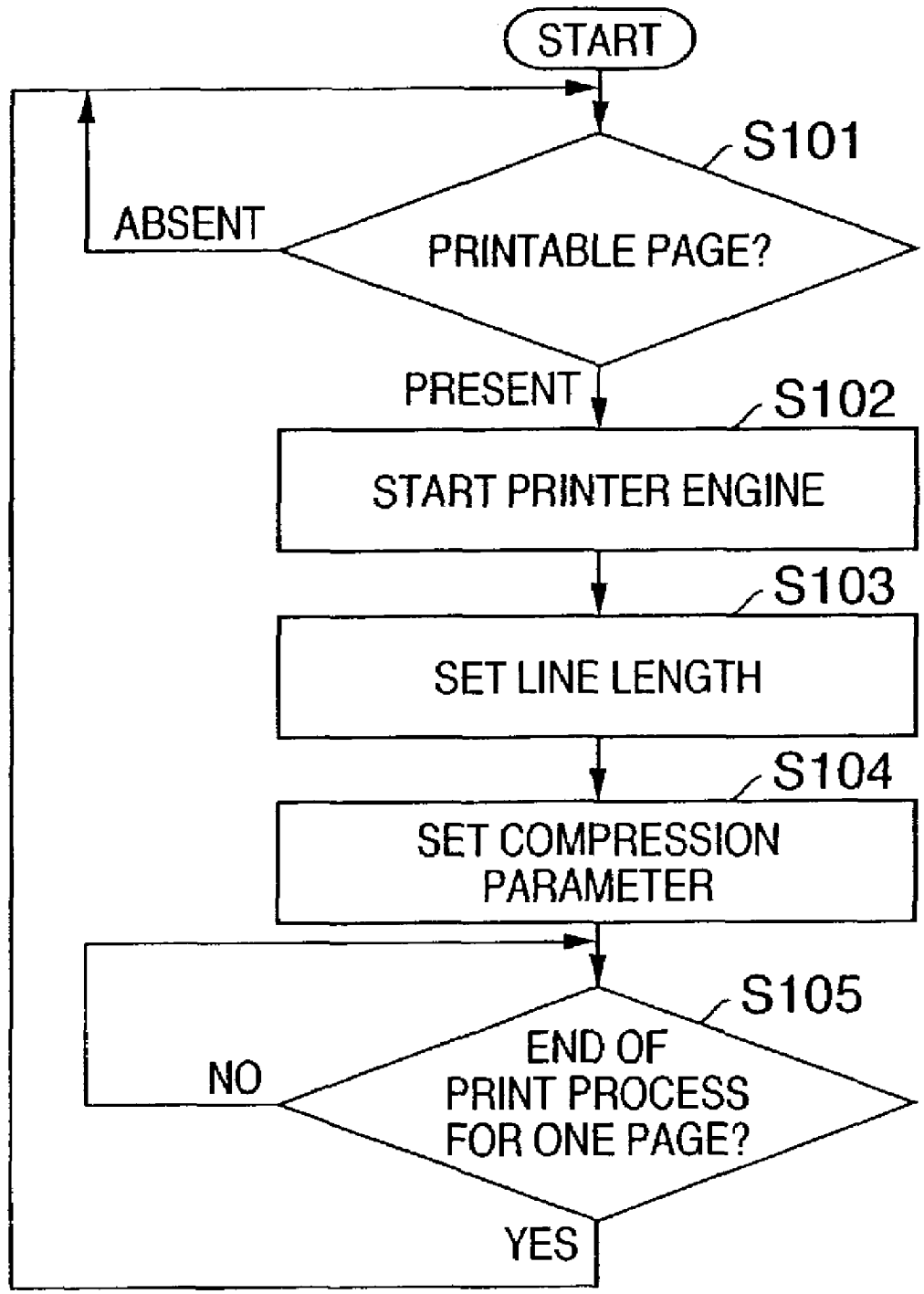
FIG. 16 is a flow chart showing a print control processing sequence to be executed by a control circuit 15.

The print control sequence executed by the control circuit 15 will be described below with reference to FIG. 16. FIG. 16 is a flow chart showing the print control sequence to be executed by the control circuit 15, and this control runs parallel to other processes (not shown) such as reception of data and the like.

When the print control sequence is launched, it is checked in step S101 if a printable page is present, i.e., if a new page command has been received and a page to be printed remains. If no printable page is present, the control waits in step S101 until a new page command is received and a printable page is prepared.

If a printable page is present, the flow advances to step S102 to instruct the printer engine 14 to start the print process. In step S103, the number of bytes per line, which is designated by a print condition designation command of that page, is set in the line length register 25. In step S104, the number of lines that indicates the up copy position, the byte offset value indicating the near left copy position, and the byte offset value indicating the far left copy position, which are designated by a compression parameter designation command of that page, are respectively set in the row count register 36, stage count register 37, and background period register 39. In step S105, the control waits until the print process for one page is completed. Upon starting the print process, the decoding circuit 13 decodes data on the basis of the values set in the aforementioned registers. Upon completion of the print process for one page, the flow returns to step S101 to wait for the next printable page.

In this manner, since decoding is done using compression parameters used in encoding, correct decoded data can always be obtained.

As described above, according to this embodiment, since the period of background patterns is detected, and encoding is done with reference to positions according to the detected period, the background patterns can be compressed efficiently. Also, since encoding is done with reference to the positions according to the detected period and a few limited positions, high-speed compression can be achieved. Upon detecting the period of background patterns, since the period is detected based on only the sizes and positions of background patterns without using data themselves of the background patterns, it can be detected quickly. Furthermore, since the detected period of background patterns is corrected in accordance with the number of pixels per byte and the dither period, even an image that has undergone a dither process can be efficiently compressed. When the period of background patterns cannot be detected, since encoding is done using default reference positions, compression can be done more efficiently than in a case wherein such countermeasure is not taken.

Second Embodiment

In the above embodiment, when the current position is near the left edge of the image, and the near left copy position falls outside the left end of the image, that position is not referred to. Alternatively, other methods may be used. For example, when the near left copy position falls outside the left end of the image, the near left copy position near the right end of the previous line may be referred to, or a fixed value (0) may be referred to.

In the above embodiment, encoding and decoding are done using 1-byte image data as a minimum unit. In place of this unit, other units, for example, 1 pixel, 2 bytes, and the like may be used.

In the above embodiment, a monochrome image is processed. Alternatively, a color image may be processed.

In the above embodiment, one pixel is defined by 1 bit. Alternatively, one pixel may be defined by other values such as 2 bits, 4 bits, or 8 bits.

In the above embodiment, decoding is implemented by hardware but may be implemented by software.

In the above embodiment, a dither process is executed. Alternatively, another matrix process may be done in place of a dither process, or a dither process may be omitted.

In the above embodiment, compression is done by exploiting the horizontal periodicity of background patterns. Alternatively, compression may be done using vertical periodicity or both the horizontal and vertical periodicities.

In the above embodiment, when different periods are detected, a maximum value is used as the period. Alternatively, a value with highest frequency of occurrence of the different periods may be used as the period.

In the above embodiment, the encoding processing unit is one page, but the present invention may be applied to encoding for Nin1 (N=2, 4, . . . ) images. In this case, encoding is done every N pages.

Third Embodiment

Since the basic arrangement of an image processing apparatus in this embodiment is the same as that of the first embodiment shown in FIG. 17, a description thereof will be omitted.

Also, since the diagram that shows the relationship between a software group used upon printing an image, and a printer is the same as that in the first embodiment shown in FIG. 1, a description thereof will be omitted.

Figure 19:
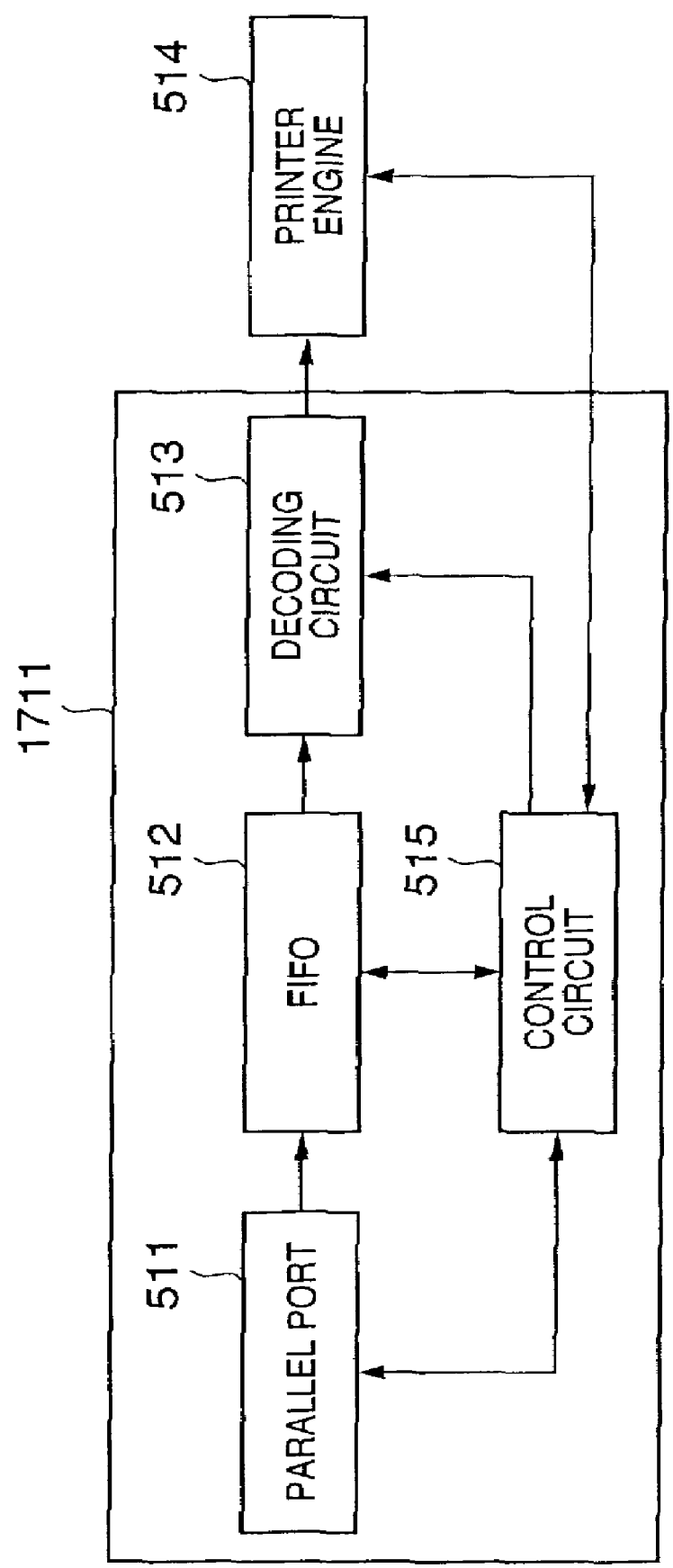
FIG. 19 is a block diagram showing the basic arrangement of a printer 1711 in the third embodiment of the present invention.

FIG. 19 is a block diagram showing the basic arrangement of the printer 1711 in this embodiment. In FIG. 19, reference numeral 511 denotes a parallel port for receiving the printer command output from the port driver 5. Reference numeral 512 denotes a FIFO (First In, First Out) memory, which stores encoded data (to be described in detail later) contained in the printer command received by the parallel port 511, and outputs the stored data to a decoding circuit 513 in a FIFO order. The decoding circuit 513 decodes the encoded data stored in the FIFO memory 512, and outputs decoded image data to a printer engine 514. The printer engine 514 is a laser beam printer engine, and prints in accordance with image data output from the decoding circuit 513 in response to an instruction from a control circuit 515. Image data are frame-sequentially output for each of colors of cyan, magenta, yellow, and black. Reference numeral 515 denotes a control circuit, which comprises, e.g., a 1-chip CPU, and controls the parallel port 511, FIFO memory 512, decoding circuit 513, and printer engine 514.

The operations of the respective units shown in FIGS. 1 and 19 in a print process will be described below.

Since a process for transmitting a print command set including a print control command and encoded data to the printer 1711 is the same as that in the first embodiment, a description thereof will be omitted.

The control circuit 515 receives the printer command via the parallel port 511. The control circuit 515 holds the print control command of the received printer command for the purpose of print control. The encoded data in the received printer command is stored in the FIFO memory 512. After that, when the control circuit 515 detects completion of reception of the printer command which forms one page upon reception of, e.g., the page end command, it instructs the printer engine 514 to start the print process. Upon instruction of start of the print process, the printer engine 514 feeds a paper sheet from a paper cassette (not shown), and requests the decoding circuit 513 to output image data, when the paper sheet has reached a predetermined position. The decoding circuit 513 reads out encoded data from the FIFO memory 512 and decodes it to hold decoded image data in its internal buffer in advance. Upon receiving the image data output request from the printer engine 514, the decoding circuit 513 outputs image data held in the internal buffer. When a free space is formed in the internal buffer, the decoding circuit 513 reads out subsequent encoded data from the FIFO memory 512, decodes it, and holds the decoded data in the internal buffer. In this way, the encoded data is sequentially decoded and output as image data (decoded data), and the print process is complete upon output of all image data for one page.

Codes generated by the printer driver 4 in this embodiment will be described below with reference to tables shown in FIGS. 20 and 21.

FIG. 20 is a table for explaining an example of codes, which are contained in encoded data generated by the printer driver 4 in this embodiment. Each code to be explained in this embodiment has a variable length for respective bits, and is expressed by a bit sequence ranging from, e.g., 2 bits to 18 bits. Respective codes can be identified when they are checked in turn from the head, like in Huffman codes.

As shown in FIG. 20, when the bit sequence of a code starts with "1", it indicates a COPY UP command. This command instructs to copy a byte sequence having a length indicated by <number of bytes> from a position, which is located predetermined lines above the current position.

When the bit sequence of a code starts with "01", it indicates a CACHE command. This command designates 1-byte data at a position indicated by <3-bit data> in a cache buffer (which is assured in the CPU 1701 in this embodiment, but the present invention is not limited to this and the cache buffer may be assured outside the CPU 1701).

When the bit sequence of a code starts with "0001", it indicates a COPY LEFT command. This command instructs to copy a byte sequence having a length indicated by <number of bytes> from a position, which is separated a predetermined number of bytes on the left side of the current position.

When the bit sequence of a code starts with "0000", it indicates an EOB command, which instructs to end encoded data.

FIG. 21 is a table showing an example of codes (<number of bytes>) which indicate lengths that follow a COPY UP command and COPY LEFT command. As shown in FIG. 21, when the bit sequence of a code is "1", it indicates a 1-byte length.

When the bit sequence of a code starts with "01", 1-bit data (assumes 0 or 1) follows, and if that 1-bit data is zero, a command code "010" is formed and means 2 bytes. On the other hand, if the subsequent 1-bit data is 1, a command code "011" is formed and means 3 bytes. That is, when the bit sequence of a code starts with "01", the code means a 2- or 3-byte length.

When the bit sequence of a code starts with "001", since 2-bit data follows, the code means a length ranging from 4 to 7 bytes. When the bit sequence of a code starts with "0001", since 3-bit data follows, the code means a length ranging from 8 to 15 bytes. When the bit sequence of a code starts with "00001", since 4-bit data follows, the code means a length ranging from 16 to 31 bytes. When the bit sequence of a code starts with "000001", since 5-bit data follows, the code means a length ranging from 32 to 63 bytes. When the bit sequence of a code starts with "0000001", since 6-bit data follows, the code means a length ranging from 64 to 127 bytes. When the bit sequence of a code starts with "0000000", since 7-bit data follows, the code means a length ranging from 128 to 255 bytes.

Note that the frequencies of occurrence of commands may be obtained using a large number of image data, shorter codes may be assigned to commands with higher frequencies of occurrence, and relatively longer codes are assigned to command with lower frequencies of occurrence as in Huffman codes, thus improving the compression ratio.

The operations of a RAW command and CACHE command and data to be stored in the cache buffer will be explained below with reference to FIG. 22. FIG. 22 is a view for explaining image data, and the method of storing this image data in the cache buffer in using the RAW and CACHE commands.

As shown in FIG. 22, 10-byte image data 00, 01, 02, 03, 04, 05, 06, 07, 08, and 06 line up from the left. The cache buffer has a size for 8 bytes, and is empty initially.

The first image data 00 can be encoded to a code 001 00000000, i.e., a RAW00 command. As a result of encoding or decoding this command, data 01 is stored at the head position of the cache buffer, and data 00 which has already been stored at that position shifts to the next position. In this manner, when data for 8 bytes up to image data 07 have been encoded or decoded, the cache buffer becomes full of data. The next image data 08 can be encoded to a code 001 00010000, i.e., a RAW08 command. As a result of encoding or decoding this command, data 08 is stored at the head position of the cache buffer, already stored data 07 to 01 shift to their next positions, and data 00 stored at the last position of the cache buffer is lost.

The next image data 06 can be encoded to a code 01 010, i.e., a CACHE2 command, since identical data is stored at position 2 of the cache buffer. As a result of encoding or decoding this command, data 06 stored at position 2 shifts to the head position, and data 08 and 07 stored before position 2 respectively shift to their next positions. Data stored after position 2 remain unchanged.

When a COPY UP or COPY LEFT command is encoded or decoded, data stored in the cache buffer remain unchanged.

The operations of COPY UP and COPY LEFT commands will be explained below with reference to FIG. 23. FIG. 23 is a view for explaining image data, and a method of encoding this image data to COPY UP and COPY LEFT commands. As shown in FIG. 23, in a pixel sequence that forms image data, 10-byte image data 01, 23, 45, 67, 89, AB, 89, AB, 89, AB line up from the left in the lowermost row, and image data 01, 23, 45, 67, 89, AB, 00, 00, 00, 00 line up from the left in a row four rows above the lowermost row. Assume that image data to be currently encoded or decoded are those in the lowermost row, and a COPY UP and COPY LEFT commands are set in advance to respectively refer to data four rows above the current position, and data 2 bytes on the left side of the current position.

When the image data has undergone a dither process using a dither matrix, since neighboring data undergo different processes, data of interest has higher correlation with data separated by the period of the dither matrix than neighboring data. For this reason, in case of an image that has undergone a dither process, the position that the COPY UP or COPY LEFT command refers to is determined to have highest correlation with the position of interest. That is, the position is determined in accordance with the period of the dither matrix used upon generating image data to be encoded.

Of the image data in the lowermost row, since first six bytes 01, 23, 45, 67, 89, and AB form the same sequence as that of first six bytes in the row four rows above the lowermost row, they can be encoded to a code 1 001 10, i.e., a COPY UP6 command. Also, since the next four bytes 89, AB, 89, and AB form the same sequence as that of four bytes starting from a position 2 bytes on the left side of the current position in the identical row, they can be encoded to a code 0001 001 00, i.e., a COPY LEFT4 command.

Figure 24:
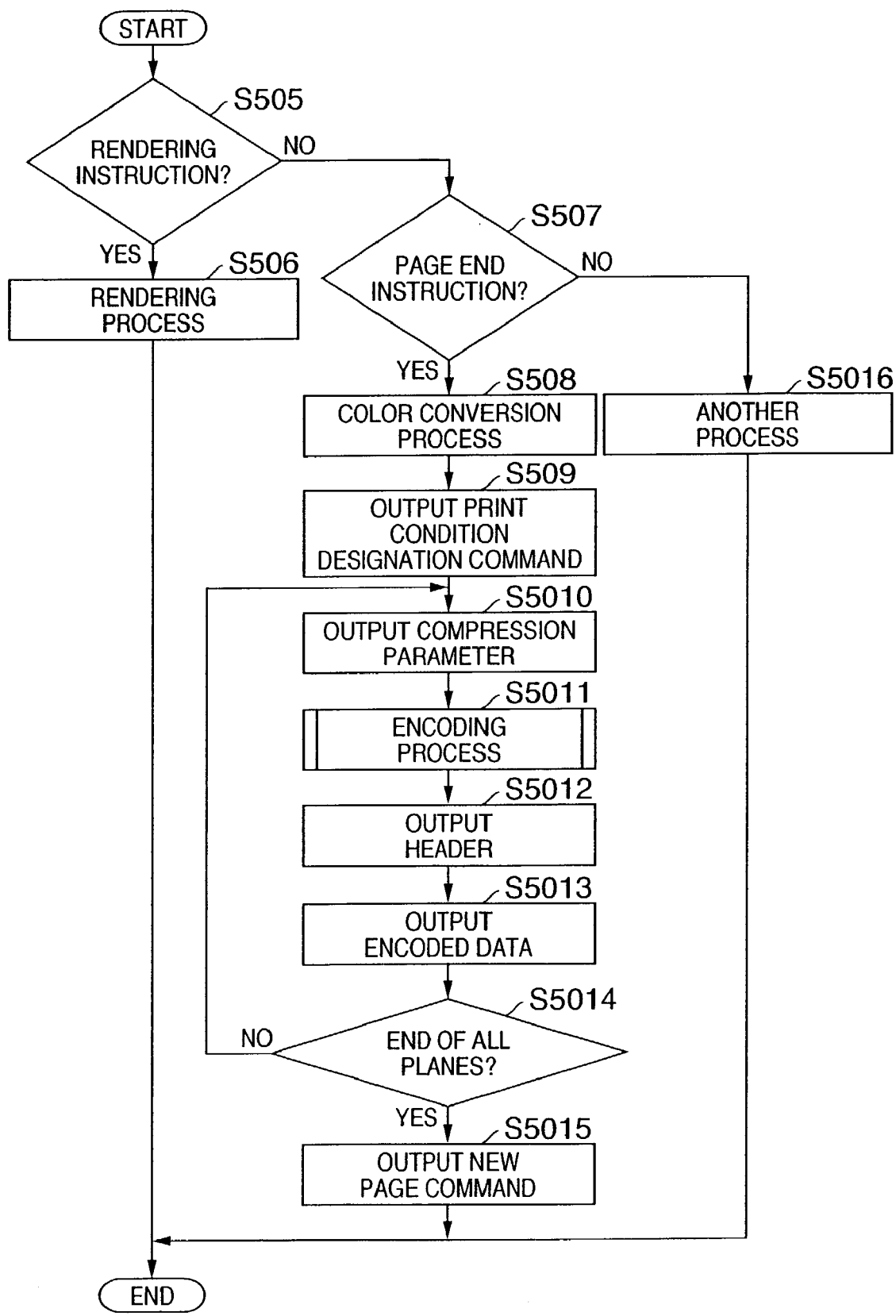
FIG. 24 is a flow chart showing a main process to be executed by the printer driver 4 in the third embodiment of the present invention.

Details of the process of the printer driver 4 in this embodiment will be described below with reference to the flow chart shown in FIG. 24. FIG. 24 is a flow chart of the main process to be executed by the printer driver 4.

Upon receiving an instruction from the OS 2, the printer driver 4 checks if the type of instruction is a rendering instruction (step S505). If the type of instruction is a rendering instruction, the flow advances to step S506 to execute a rendering process (step S506). More specifically, text data, graphic data, bitmap data, or the like, which is sent from the application 3 via the OS 2, is converted into red, green, and blue 8-bit images, which are recorded on the RAM 1702.

If the type of instruction is not a rendering instruction, the flow advances to step S507 to check if the type of instruction is a page end command (step S507). If the type of instruction is a page end command, the flow advances to step S508 to execute a color conversion process (step S508). More specifically, the red, green, and blue 8-bit images recorded on the RAM 1702 in step S506 are converted into four-color images, i.e., cyan, magenta, yellow, and black images, each of which is expressed by, e.g., 4 bits.

A command (print control command) that designates conditions required for the print process such as a paper size, paper cassette, resolution, the number of gray levels, the number of bytes per line, the number of lines per page, and the like, is output (step S509).

The processes in steps S5010 to S514 are repeated for each of colors, i.e., cyan, magenta, yellow, and black to output an image data command for each color. As practical processes in respective steps, compression parameters according to the dither matrix used in step S508, i.e., the positions that COPY UP and COPY LEFT commands used in encoding refer to, are output (step S5010). Image data is encoded in accordance with an encoding sequence to be described later (step S5011). At this time, encoding is done using the positions designated by the compression parameters output in step S5010, i.e., the positions that COPY UP and COPY LEFT commands refer to. A header that designates the size and the number of lines of the image data encoded in step S5011 is output (step S5012). The image data encoded in step S5011 is output (step S5013). It is then checked if the processes of all cyan, magenta, yellow, and black planes are complete (step S5014). If the processes of all cyan, magenta, yellow, and black planes are not complete, the flow returns to step S5010 to process the next plane. On the other hand, if the processes of all cyan, magenta, yellow, and black planes are complete, the flow advances to step S5015 to output a command that designates the end of a page (step S5015).

On the other hand, if it is determined in step S507 that the type of instruction is not a page end instruction, the flow advances to step S5016 to execute another process according to the type of instruction, e.g., a process corresponding to a page start instruction, printer performance inquiry instruction, or the like (step S5016).

Figure 25A:
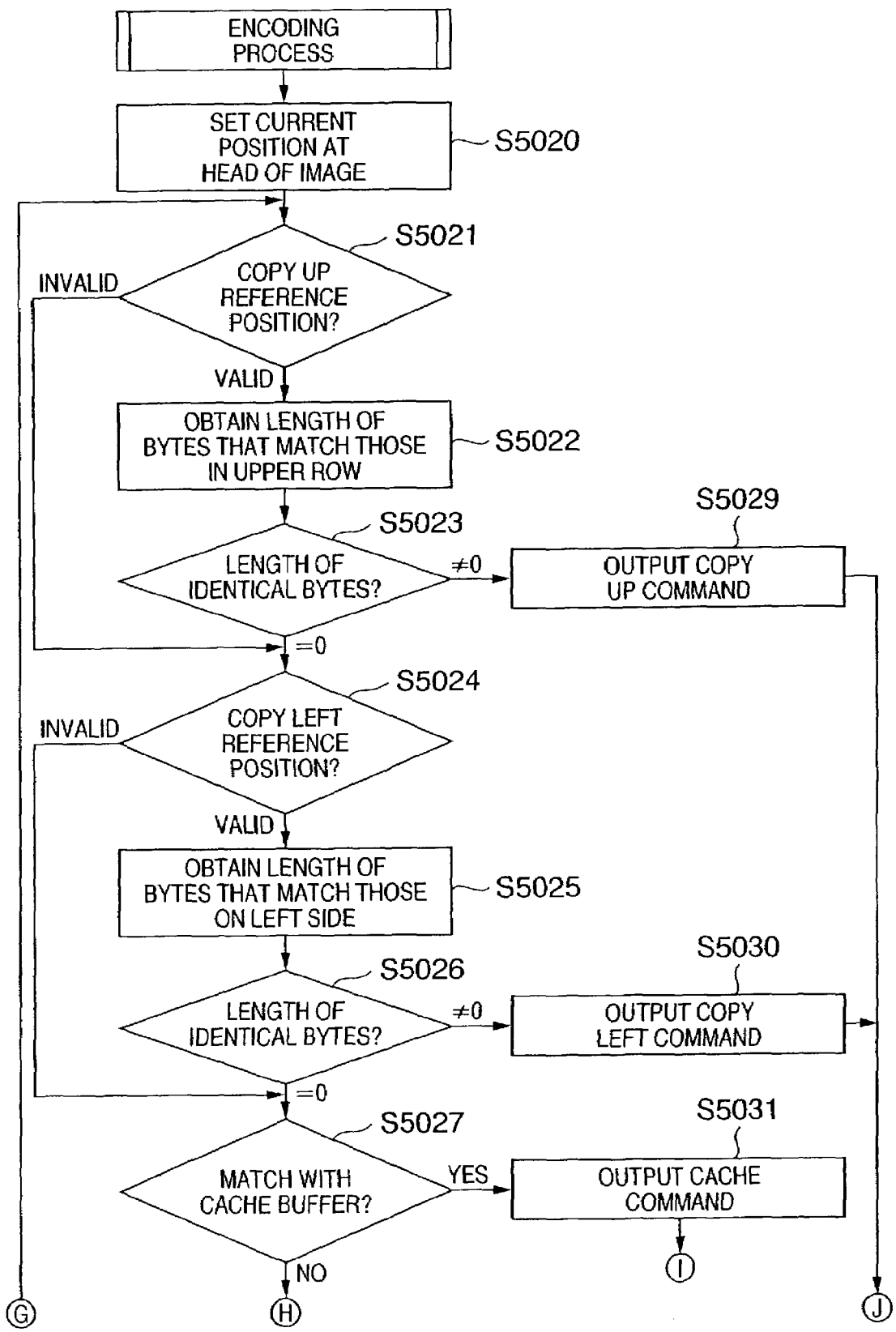
FIG. 25A is a flow chart showing details of an encoding process in step S5011.
Figure 25B:
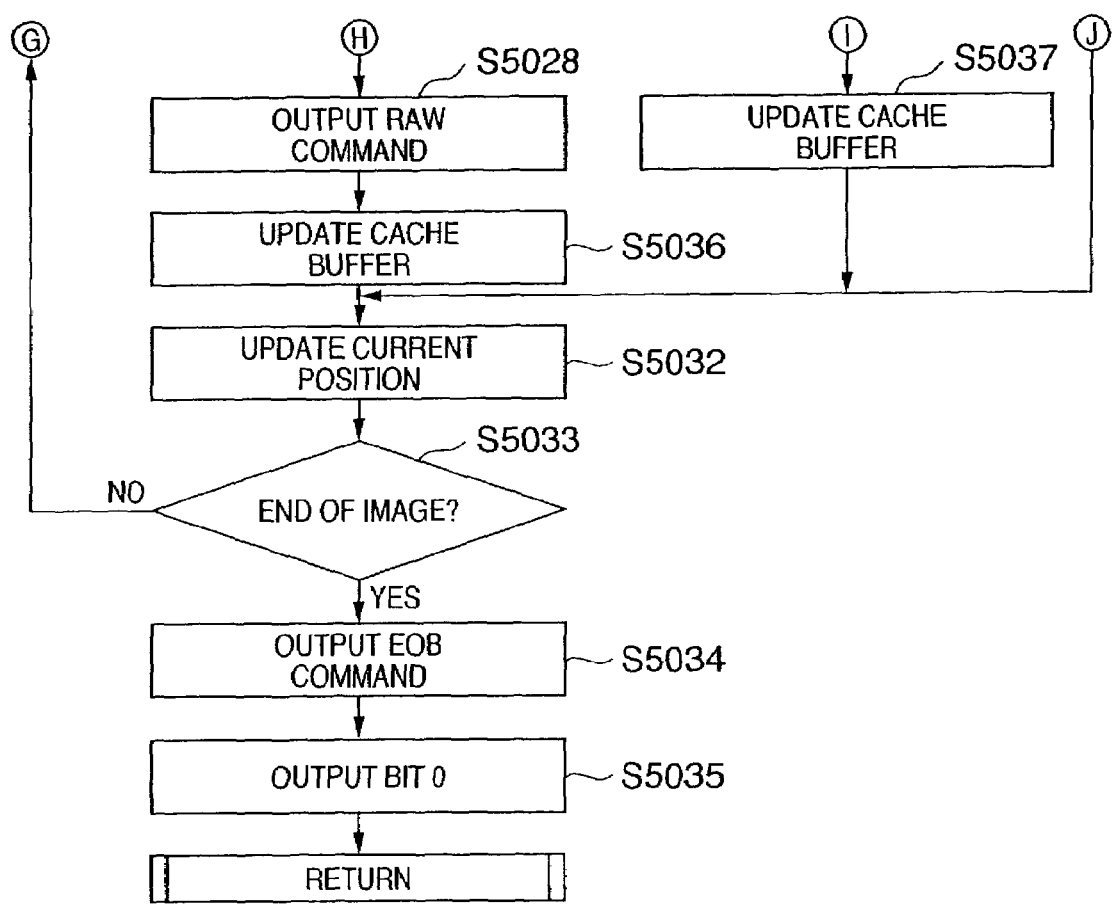
FIG. 25B is a flow chart showing details of an encoding process in step S5011.

The encoding process in step S5011 will be described below with reference to FIGS. 25A and 25B which is a flow chart showing details of that process.

The current position, i.e., the position of a pixel to be encoded, is set on the left end of an image (step S5020). It is checked if the reference position of a COPY UP command is valid (step S5021). More specifically, when the reference position of the COPY UP command is a position four rows above the current position, it is determined that the reference position of the COPY UP command is valid if the current position is four rows or more separated from the first row. If the reference position of the COPY UP command is valid, the flow advances to step S5022 to compare a byte sequence (pixel data sequence) that starts from the current position, and a byte sequence of pixel data that starts from the reference position of the COPY UP command, thus obtaining the length of a byte sequence of the same values (step S5022). In this case, if the row end is reached or the length has reached 255 bytes, the process is aborted.

It is checked if the length obtained in step S5022 is zero (step S5023). If the length is not zero, since it is determined that the data of interest can be encoded to a COPY UP command, the flow advances to step S5029 to output a COPY UP command, i.e., a code 1 and a code indicating the number of following bytes (obtained length). The flow then advances to step S5032.

On the other hand, if it is determined in step S5021 that the reference position of the COPY UP command is invalid, or if it is determined in step S5023 that the length obtained in step S5022 is zero, the flow advances to step S5024 to check if the reference position of a COPY LEFT command is valid (step S5024). More specifically, when the reference position of the COPY LEFT command is separated 2 bytes on the left side of the current position, it is determined that the reference position of the COPY LEFT command is valid if the current position is separated two bytes or more from the left end. If the reference position of the COPY LEFT command is valid, the flow advances to step S5025 to compare a byte sequence (pixel data sequence) that starts from the current position, and a byte sequence that starts from the reference position of the COPY LEFT command, thus obtaining the length of a byte sequence of the same values (step S5025). In this case as well, if the row end is reached or the length has reached 255 bytes, the process is aborted.

It is checked if the length obtained in step S5025 is zero (step S5026). If the length is not zero, since it is determined that the data of interest can be encoded to a COPY LEFT command, the flow advances to step S5029 to output a COPY LEFT command, i.e., a code 0001 and a code indicating the number of following bytes (obtained length) The flow then advances to step S5032.

On the other hand, if it is determined in step S5024 that the reference position of the COPY LEFT command is invalid or if it is determined in step S5026 that the length obtained in step S5025 is zero, the flow advances to step S5027 to search the cache buffer so as to see if a byte (pixel data) at the current position is registered in the cache buffer (step S5027). If the byte at the current position is registered in the cache buffer, since it is determined that the data can be encoded to a CACHE command, the flow advances to step S5031 to output a CACHE command, i.e., a code 01 and 3-bit data which follows that code and indicates the position of the cache buffer where a cache hit has occurred (step S5031), and the cache buffer is updated (step S5037). More specifically, a process for storing the byte at the current position at the head position of the cache buffer, and sequentially shifting data from the head position of the cache buffer to a position before the cache buffer position where a cache hit has occurred to their next positions is executed.

On the other hand, if it is determined in step S5027 that the byte at the current position is not registered in the cache buffer, the flow advances to step S5028 to output a RAW command, i.e., a code 001 and 8-bit raw data which follows that code and is equal to the byte at the current position (step S5028). More specifically, a process for storing the byte at the current position at the head position of the cache buffer, and sequentially shifting data from the head position of the cache buffer to a position before the last position to their next positions is executed.

The current position is advanced by the number of bytes processed by the COPY UP, COPY LEFT, CACHE, or RAW command (step S5032). It is then checked if all image data have been processed (step S5033). If all image data have not been processed yet, the flow returns to step S5021 to repeat the aforementioned encoding process. On the other hand, if all image data have been processed, the flow advances to step S5034 to output an EOB command, i.e., a code 0000 (step S5034). Furthermore, bits "0" are output so that the total number of bits of the output codes becomes an integer multiple of 8 (until an integer multiple of 8 is reached) (step S5035).

Figure 26:
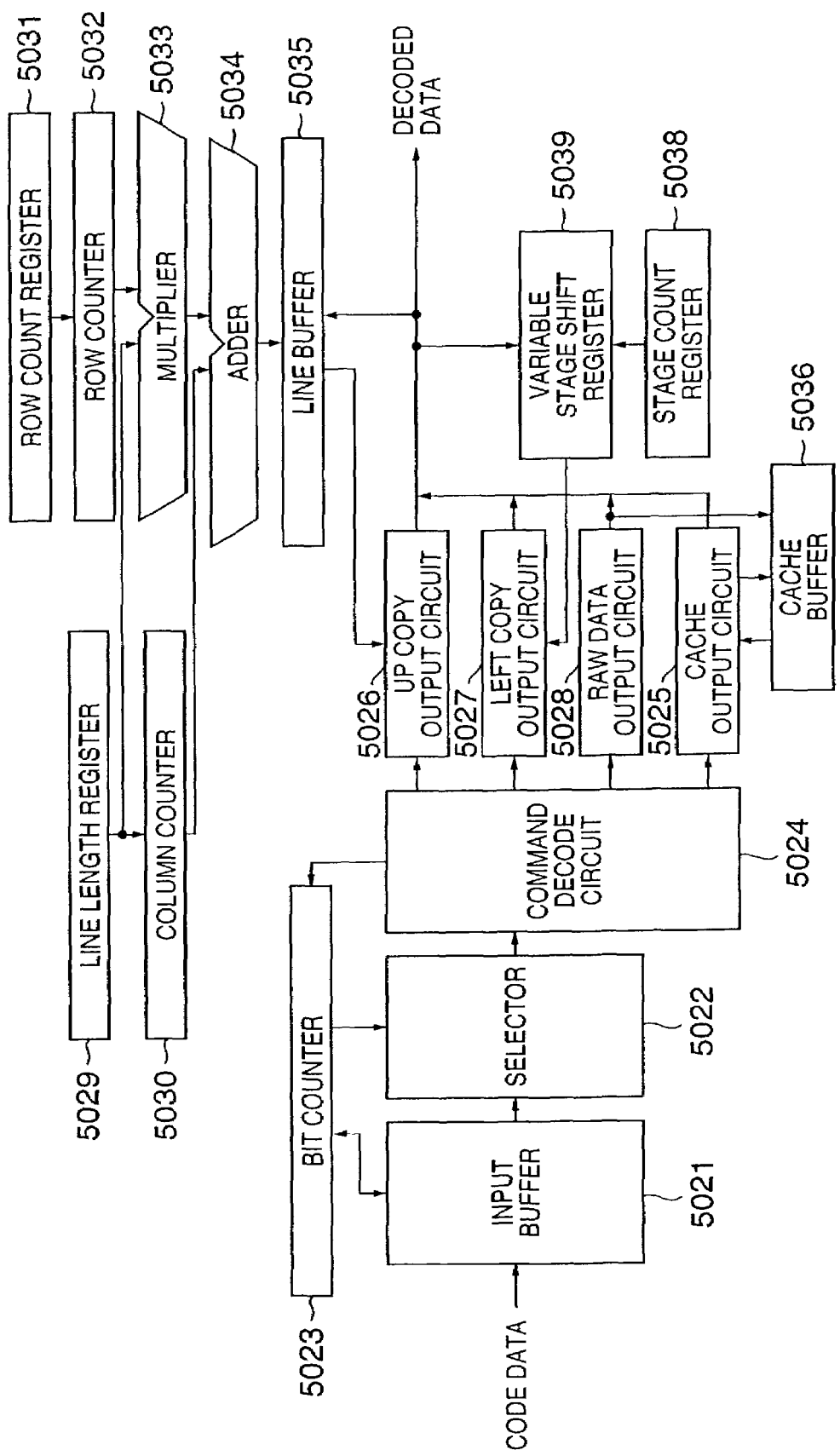
FIG. 26 is a block diagram showing the basic arrangement of a decoding circuit 513.

The decoding circuit 513 will be described below. FIG. 26 is a block diagram showing the basic arrangement of a decoding circuit 513. Referring to FIG. 26, an input buffer 5021 stores code data read out from the FIFO memory 512. The input buffer 5021 can store at least data for four bytes, and reads out and stores data from the FIFO memory 512, when the buffer has a free space and data to be read out is stored in the FIFO memory 512. The input buffer 5021 discards processed data, which becomes unnecessary, when the number of processed bits exceeds 8.

A selector 5022 includes, e.g., 18 sets of 8-input selectors, and selects code data stored in the input buffer 5021 in accordance with the number of processed bits indicated by a bit counter 5023, thus aligning the start position of a command, which is required for a command decode circuit 5024 upon processing. This process is required since there are eight start positions, i.e., the input buffer 5021 holds data for respective bytes, while a command is variable-length data for respective bits.

The bit counter 5023 stores the number of processed bits of code data stored in the input buffer 5021. The bit counter 5023 counts the number of bits of a command output from the command decode circuit 5024, and updates the stored value by the count value. The bit counter 5023 subtracts the number of discarded bits from the stored value when the input buffer 5021 discards processed data. When the command decode circuit 5024 decodes an EOB command, the bit counter 5023 receives an EOB signal from the command decode circuit 5024, and if the lower 3 bits of the bit counter are all "0"s, the counter 5023 does nothing; otherwise, it adds 8 to the stored value and clears the lower 3 bits.

The command decode circuit 5024 comprises, e.g., a read-only memory or wired logic, decodes code data, which is aligned by the selector 5022 and is stored in the input buffer 5021, and outputs various signals mentioned above or to be described later to a cache output circuit 5025, an up copy output circuit 5026, a left copy output circuit 5027, a raw data output circuit 5028, and the bit counter 5023 in accordance with the decoded command.

When the command decode circuit 5024 decodes a CACHE command, the cache output circuit 5025 receives 3-bit data that indicates the position of the cache buffer, and reads out and outputs data at that position from a cache buffer 5036. When the command decode circuit 5024 decodes a COPY UP command, the up copy output circuit 5026 repeats a process for receiving the number of bytes to be copied, reading out data from a line buffer 5035 in accordance with the received number of bytes, and outputting the readout data. When the command decode circuit 5024 decodes a COPY LEFT command, the left copy output circuit 5027 repeats a process for receiving the number of bytes to be copied, reading out data from a variable stage shift register 5039 in accordance with the received number of bytes, and outputting the readout data. When the command decode circuit 5024 decodes a RAW command, the raw data output circuit 5028 receives 8-bit data indicating raw data, and outputs the received data.

A line length register 5029 holds the number of bytes per line included in the received print control command. A column counter 5030 holds the current column address of the line buffer 5035, counts up every time data is written in the line buffer 5035, and is reset to zero when its count value has reached the number of bytes per line held by the line length register 5029 as a result of the count-up process. A row count register 5031 holds the number of lines, which is included in the received compression parameters and indicates the position where a COPY UP command refers to. A row counter 5032 holds the current row address of the line buffer 5035, and counts up every time the count value of the column counter 5030 has reached the number of bytes per line held by the line length register 5029 and is reset to zero. The row counter 5032 is reset to zero when the number of lines is output to the row count register 5031.

A multiplier 5033 calculates the product of the current row address held by the row counter 5032 and the number of bytes per line held by the line length register 5029 so as to output the start address of the current row of the line buffer 5035. An adder 5034 calculates the sum of the start address of the current row output from the multiplier 5033, and the current column address held by the column counter 5030, so as to output the current address of the line buffer 5035.

The line buffer 5035 holds decoded data for a plurality of lines, and inputs or outputs decoded data in accordance with the address output from the adder 5034. The line buffer 5035 forms a ring memory, the size of which is designated by the number of lines held by the row count register 5031.

The cache buffer 5036 stores decoded data when the cache output circuit 5025 or raw data output circuit 5028 decodes image data, and outputs data to be referred to by the cache output circuit 5025. A stage count register 5038 holds a byte offset value which indicates the position that a COPY LEFT command refers to. The variable stage shift register 5039 comprises shift registers and a selector, forms shift registers corresponding to the number of stages equal to the byte offset value held by the stage count register 5038, and outputs data obtained by delaying the output decoded data by the number of times one smaller than the value designated by the byte offset value held by the stage count register 5038.

In the above arrangement, when the command decode circuit 5024 decodes a COPY UP command, it also decodes the number of subsequent bytes that follows the command, and outputs the decoded number of bytes to the up copy output circuit 5026. Then, a decoded data group, which is located the number of lines held in the row count register 5031 above the current row in the line buffer 5035, and corresponds to the decoded number of bytes, is read out from the line buffer 5035 to the up copy output circuit 5026, which writes the readout decoded data group in turn from the address (i.e., the current position) output from the adder 5034. Also, the readout decoded data group is input to the variable stage shift register 5039 (from the head position). Data which have been already stored in the variable stage register 5039 are shifted stage by stage, and 1 byte at the position that the COPY LEFT command refers to, which corresponds to a position next to the current position, is output from the final stage of the variable stage shift register 5039. Then, the column counter 5030 counts up. In this manner, decoded data are output until a process for the designated number of bytes is complete.

When the command decode circuit 5024 decodes a COPY LEFT command, it also decodes the number of subsequent bytes that follows the command, and outputs the decoded number of bytes to the left copy output circuit 5027. Then, decoded data for this number of bytes are read out from the variable stage shift register 5039, and are input to the left copy output circuit 5027. When the left copy output circuit 5027 outputs the decoded data, the output decoded data is written at the current position (address output from the adder 5034) of the line buffer 5035, and is input to the variable stage shift register 5039. Data already stored in the variable stage register 5039 are shifted stage by stage, and 1 byte at the position that the COPY LEFT command refers to, which corresponds to a position next to the current position, is output from the final stage of the variable stage shift register 5039. Then, the column counter 5030 counts up. In this manner, decoded data are output until a process for the designated number of bytes is complete.

When the command decode circuit 5024 decodes a RAW command, it outputs subsequent 8-bit raw data that follows the command to the raw data output circuit 5028. When the raw data output circuit 5028 outputs this data, the output decoded data is written at the current position of the line buffer 5035 and is also input to the variable stage shift register 5039. Data already stored in the variable stage register 5039 are shifted stage by stage, and 1 byte at the position that the COPY LEFT command refers to, which corresponds to a position next to the current position, is output from the final stage of the variable stage shift register 5039. Then, the column counter 5030 counts up. Furthermore, the output decoded data is stored at the head position of the cache buffer 5036.

When the command decode circuit 5024 decodes a CACHE command, it outputs subsequent 3-bit data, which follows the command and indicates the position in the cache buffer, to the cache output circuit 5025. The cache output circuit 5025 reads out decoded data at the designated position from the cache buffer 5026, and outputs that decoded data. The output decoded data is written at the current position of the line buffer 5035 and is also input to the variable stage shift register 5039. Data already stored in the variable stage register 5039 are shifted stage by stage, and 1 byte at the position that the COPY LEFT command refers to, which corresponds to a position next to the current position, is output from the final stage of the variable stage shift register 5039. Then, the column counter 5030 counts up. Furthermore, the output decoded data is stored again at the head position of the cache buffer 5036.

Figure 27:
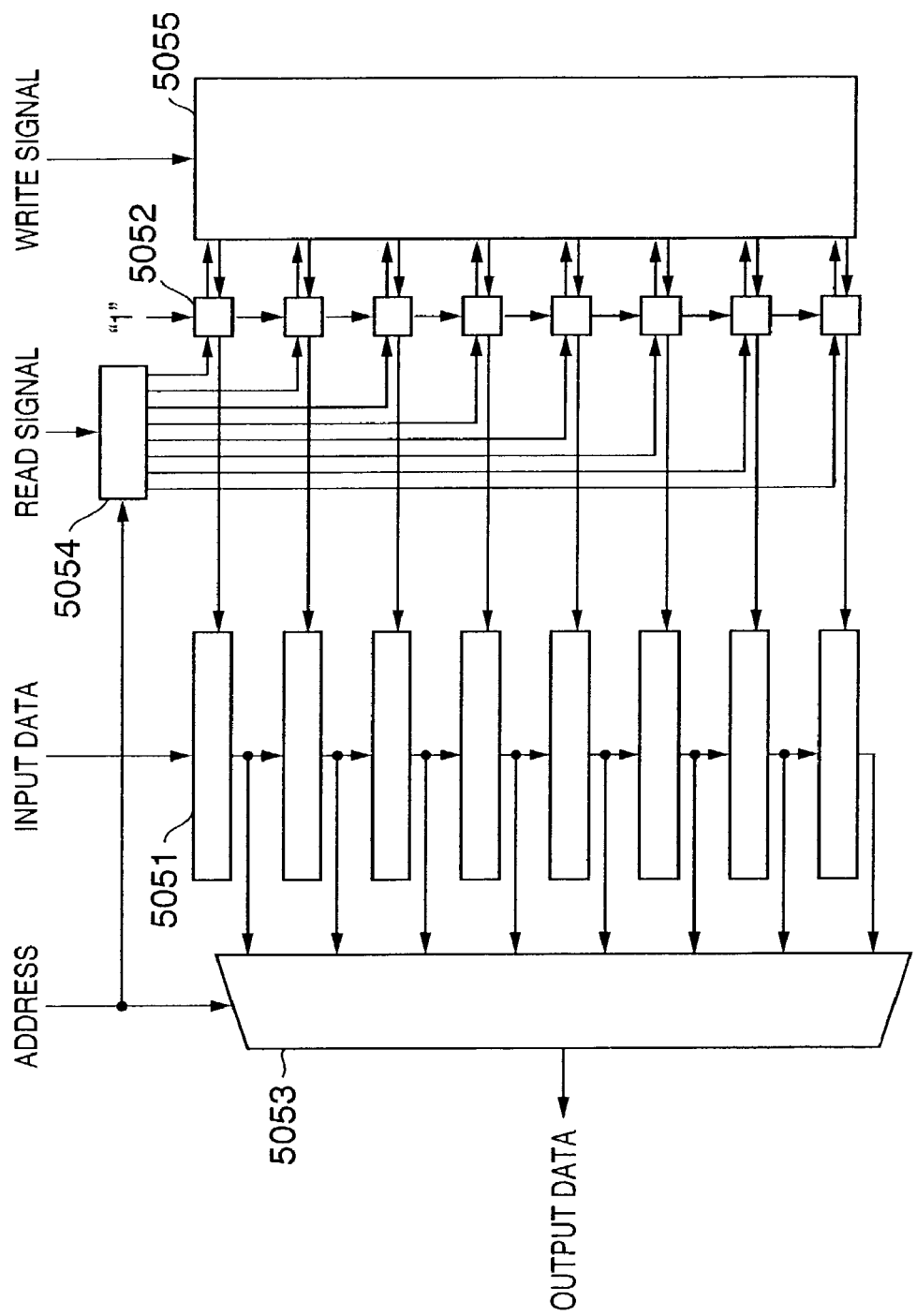
FIG. 27 is a block diagram showing the detailed arrangement of a cache buffer 5036.

The arrangement of the cache buffer 5036 will be described below with reference to FIG. 27. FIG. 27 is a block diagram showing the detailed arrangement of the cache buffer 5036.

Referring to FIG. 27, reference numeral 5051 denotes a first shift register, which comprises 8 stages of 8-bit shift registers. The first shift register 5051 can store a maximum of eight 1-byte image data output from the raw data output circuit 5028 or cache output circuit 5025. Each of the registers of the respective stages which form the first shift register 5051 stores data stored in the register of the previous stage upon receiving a shift pulse from a control circuit 5055.

Reference numeral 5052 denotes a second shift register, which comprises eight stages of 1-bit shift registers. Each of the registers of the respective stages which form the second shift register 5052 holds 1-bit information indicating if data is stored in the corresponding register of the first shift register 5051. Each of the registers of the respective stages which form the second shift register 5052 stores data stored in the register of the previous stage upon receiving a shift pulse from the control circuit 5055.

Reference numeral 5053 denotes a selector, which selects and outputs data stored in one of the registers of the respective stages that form the first shift register 5051 in accordance with the input address, i.e., the position to be referred to of the cache buffer.

Reference numeral 5054 denotes a decoder, which outputs a signal for clearing one of the registers of the respective stages that form the second shift register 5052 in accordance with the input address, i.e., the position to be referred to of the cache buffer, when a read signal that instructs to read data from the cache buffer is input.

Reference numeral 5055 denotes a control circuit, which outputs a shift pulse to the stages to be shifted of the first and second shift registers 5051 and 5052 in accordance with the information indicating which is held in the second shift register 5052 and indicates if the registers in the first shift register 5051 store data, when a write signal that instructs to write data in the cache buffer is input. When stages before the stage of interest includes a stage which does not store any data, no shift pulse is output; otherwise, it is output.

When the raw data output circuit 5028 outputs decoded data, the output decoded data is input to the first shift register 5051, and a write signal is input to the control circuit 5055. Since consecutive stages store data, the control circuit 5055 outputs a shift pulse to the first stage and stages after those which store data, the first stage of the first shift register 5051 stores the input decoded data, that of the second shift register 5052 stores a value "1" indicating that data is valid, and stages after those which store data store data of the immediately preceding stages.

When the cache output circuit 5025 receives information indicating the position of the cache buffer, the received information indicating the position of the cache buffer, i.e., the address, is input to the selector 5053 and encoder 5054, and a read signal is input to the encoder 5054. The selector 5053 selects and outputs data stored in the first shift register 5051 in accordance with the input address. The encoder 5054 outputs a clear signal to the stage from which the data is output according to the input address. As a result, the register of the stage, from which the data is output, of the second shift register 5052 is cleared.

When the cache output circuit 5025 reads the data output from the selector 5053 and outputs it as decoded data, the output decoded data is input to the first shift register 5051, and a write signal is input to the control circuit 5055. Since the stages that store data are discontinuous as the stage that has undergone the cache buffer read access of the second shift register is cleared, the control circuit 5055 outputs a shift pulse from the first stage to the stage that has undergone the cache buffer read access. Hence, the first stage of the first shift register 5051 stores the input decoded data, that of the second shift register 5052 stores a value "1" indicating that the data is valid, and the second stage to the stage that has undergone the cache buffer read access of the first and second shift registers 5051 and 5052 store data in their immediately preceding stages.

In this manner, the cache buffer 5036 is maintained to store data obtained by decoding RAW or CACHE commands in the order they are input.

As described above, the image processing apparatus of this embodiment can encode data such as image data, in which many sequences of identical data line up, at a high compression ratio, since it encodes the length of a sequence which matches a previous data sequence.

If no match with a previous data sequence is found, the apparatus searches the cache buffer. If a cache hit has occurred, the apparatus encodes the position of the cache buffer. Hence, data can be encoded to a shorter code than that obtained by encoding data itself, and any compression ratio drop can be minimized even when the frequency of occurrence of matching of data sequences is low.

When the length of the same data sequence is encoded, the cache buffer is not updated. Hence, any compression ratio drop due to the cache buffer rewritten by a long data sequence can be prevented.

Fourth Embodiment

In the third embodiment, the decoding process is implemented by hardware. However, the present invention is not limited to such specific embodiment, and the decoding process may be implemented by software. In the third embodiment, the encoding (compression) process is implemented by software. However, the present invention is not limited to such specific embodiment, and the encoding process may be implemented by dedicated hardware. In the third embodiment, a unit data size of encoding is 1 byte. However, the present invention is not limited to such specific value and, for example, one pixel or 2 bytes may be used.

The third embodiment adopts a so-called LRU method that discards data that have not been referred to for the longest period of time upon selecting data to be discarded when the cache buffer is full. However, the present invention is not limited to such specific method and, for example, a pseudo LRU method or pseudo random method may be used.

Fifth Embodiment

Since the diagram that shows the relationship between a software group used upon printing an image, and a printer is the same as that in the first embodiment shown in FIG. 1, a description thereof will be omitted.

Figure 28:
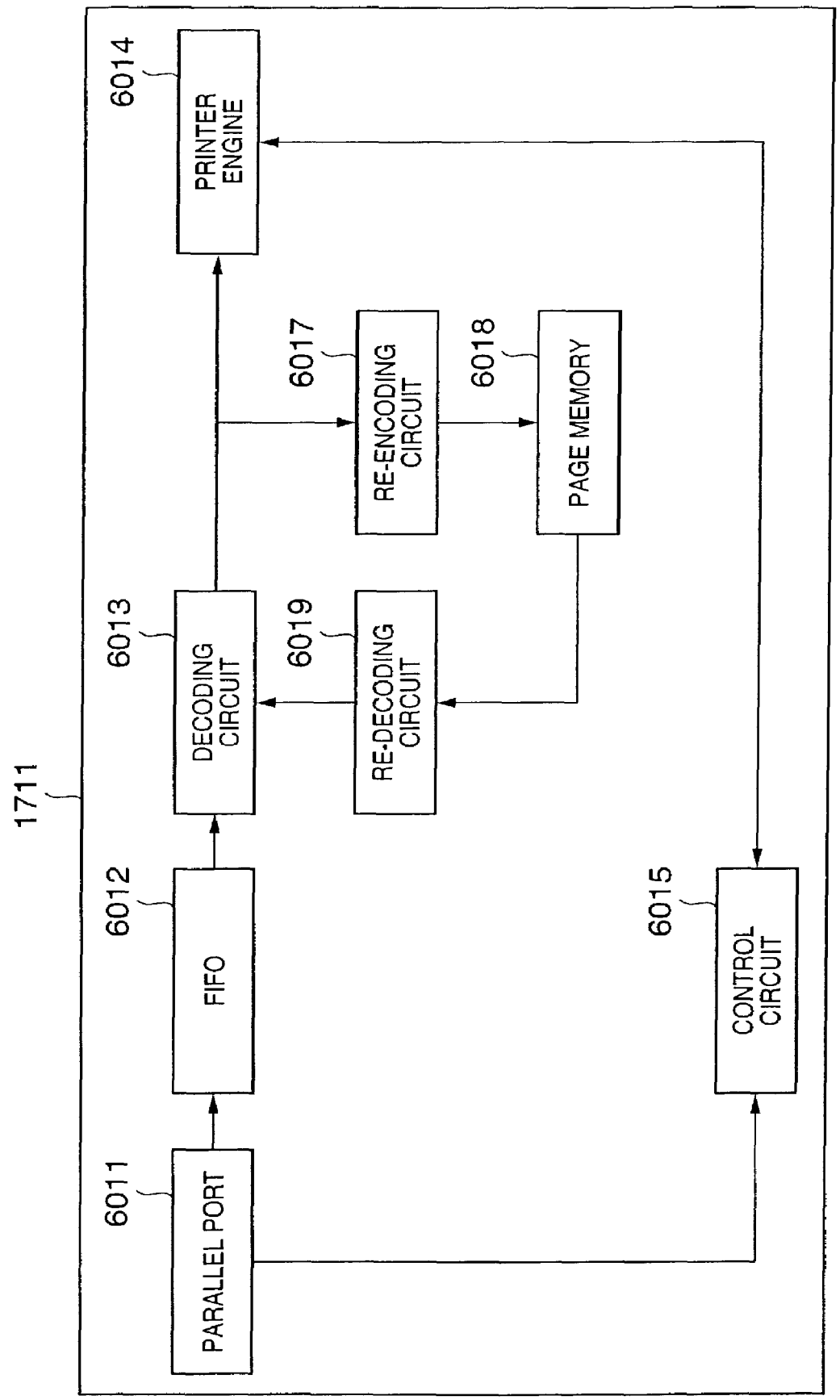
FIG. 28 is a block diagram showing the basic arrangement of a printer 1711 in the fifth embodiment of the present invention.

FIG. 28 is a block diagram showing the basic arrangement of the printer 1711 in this embodiment. In FIG. 28, reference numeral 6011 denotes a parallel port for receiving the printer command output from the port driver 5. Reference numeral 6012 denotes a FIFO (First In, First Out) memory, which stores encoded data (to be described in detail later) contained in the printer command received by the parallel port 6011, and outputs the stored data to a decoding circuit 6013 in a FIFO order. The decoding circuit 6013 decodes the encoded data stored in the FIFO memory 6012, and outputs decoded image data to a printer engine 6014 and a re-encoding circuit 6017. The printer engine 6014 is a laser beam printer engine, and prints in accordance with image data output from the decoding circuit 6013 in response to an instruction from a control circuit 6015.

Reference numeral 6015 denotes a control circuit, which comprises, e.g., a 1-chip CPU, and controls the parallel port 6011, the FIFO memory 6012, the decoding circuit 6013, the re-encoding circuit 6017, a page memory 6018, a re-decoding circuit 6019, and the printer engine 6014. Reference numeral 6017 denotes a re-encoding circuit which encodes and outputs image data output from the decoding circuit 6013. Reference numeral 6018 denotes a page memory which stores codes for at least one page, which are output from the re-encoding circuit 6017. Reference numeral 6019 denotes a re-decoding circuit, which decodes and outputs the codes which are encoded by the re-encoding circuit 6017 and are stored in the page memory 6018.

The print operation will be described below.

When the operator operates the application 3 using on his or her computer side to generate print data, and inputs a print instruction of the generated print data, the application 3 passes the print instruction to the printer driver 4 via the OS 2. The printer driver 4 converts the print instruction issued by the application 3 into image data. The printer driver 4 generates encoded data from the generated image data, and outputs it together with a print control command which designates a paper size, the line length and the number of lines of bitmap data, and the like, a compression parameter designation command that designates compression parameters, and a new page command indicating the end of a page.

The port driver 5 transmits a printer command including the set of commands generated by the printer driver 4 to the printer 1711. The control circuit 6015 receives the printer command via the parallel port 6011. If the received printer command is a print control command or compression parameter designation command, the control circuit 6015 holds it in its internal memory for the purpose of print control. If the received print command is encoded data, the control circuit 6015 stores it in the FIFO memory 6012. After that, when the control circuit 6015 detects completion of reception of the printer command which forms one page upon reception of a page end command, it instructs the printer engine 6014 to start the print process. Upon instruction of start of the print process, the printer engine 6014 requests the decoding circuit 6013 to output image data when it is ready to receive image data.

Upon receiving the image data output request from the printer engine 6014, the decoding circuit 6013 reads out the encoded data from the FIFO memory 6012 and outputs decoded image data to the printer engine 6014 in this way, the encoded data is sequentially decoded and output as image data (decoded data), and the print process for one page is complete upon output of all image data.

The re-encoding circuit 6017 encodes output image data every time the decoding circuit 6013 outputs image data. An encoding process to be executed by the re-encoding circuit 6017 is not particularly limited as long as it encodes data with reference to only data of the page of interest without referring to data of the previous page. For example, the re-encoding circuit 6017 encodes data with reference to data at only a left neighboring position, only an upper neighboring position, both the left and upper neighboring positions, or a position separated a predetermined number of bytes on the left side of the current position and a position a predetermined number of lines above the current position. The codes encoded by the re-encoding circuit 6017 are stored in the page memory 6018. Upon completion of the print process for one page, the page memory 6018 stores encoded image data of the printed page.

Upon completion of reception of a printer command that forms the second page, the print process similarly starts, and image data is sequentially output to the printer engine 6014. Also, the image data is encoded by the re-encoding circuit 6017 and is stored in the page memory 6018. The re-decoding circuit 6019 starts its operation in response to an instruction from the control circuit 6015 before the print process for the second page is launched, and reads and decodes the codes obtained by encoding the image data for the immediately preceding page. An area that stores the read codes is cleared.

The re-decoding circuit 6019 outputs decoded data in synchronism with image data output from the decoding circuit 6013. This data is used as reference data when the decoding circuit 6013 decodes a code that refers to image data of the immediately preceding page, and is discarded without being used in other cases.

The codes generated by the printer driver 4 in this embodiment are the same as those shown in FIGS. 3 and 4 in the first embodiment, and a description thereof will be omitted.

Examples of the codes shown in FIGS. 3 and 4 are shown in FIG. 5, which has already been described previously, and a description thereof will be omitted.

Figure 29:
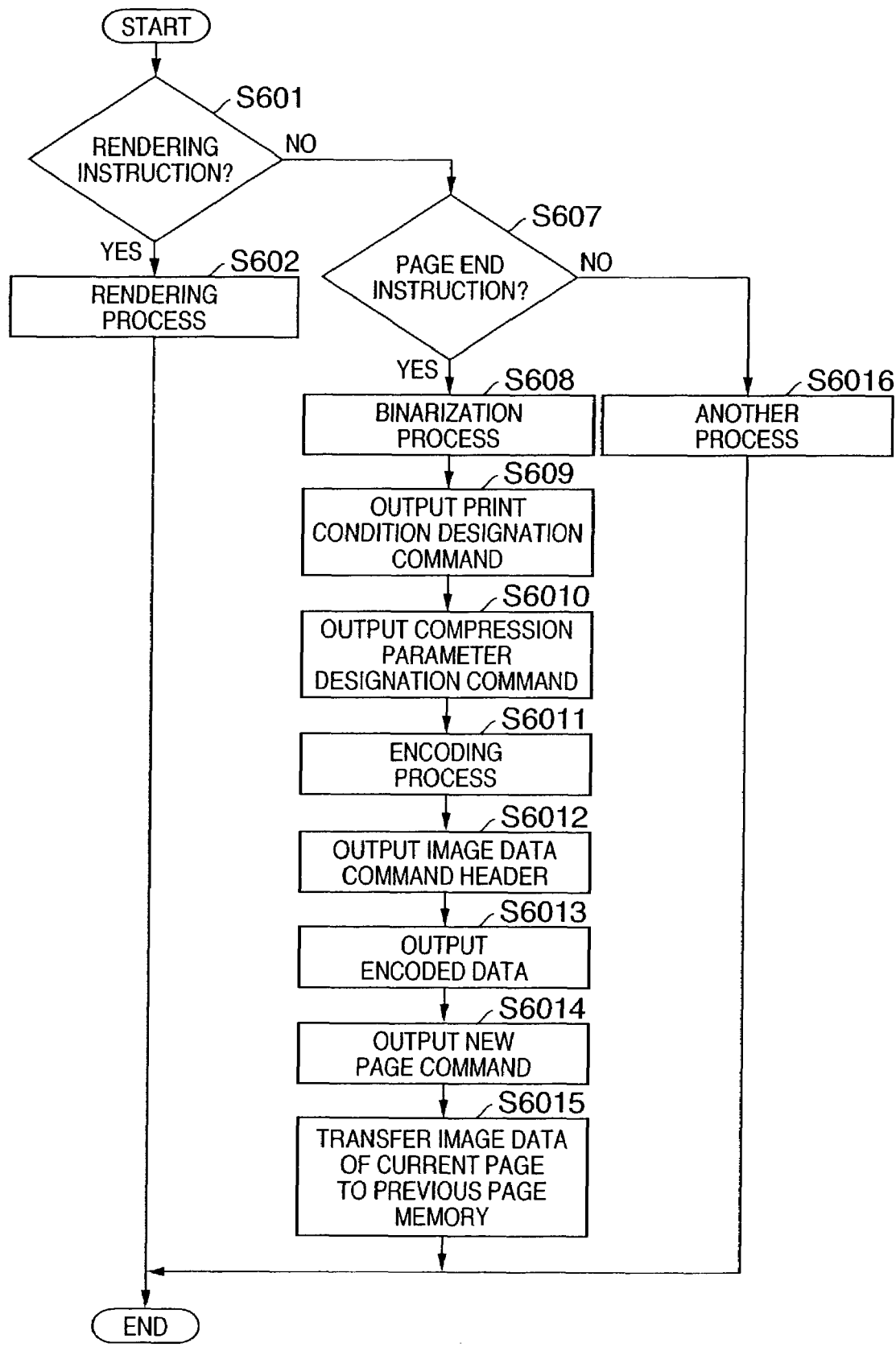
FIG. 29 is a flow chart showing the processing sequence of a printer driver 4 in the fifth embodiment of the present invention.

Details of the process of the printer driver 4 in this embodiment will be explained below with reference to the flow chart shown in FIG. 29.

When the OS 2 calls the printer driver 4, it is checked in step S601 if the type of call is a rendering instruction. If the type of call is a rendering instruction, a rendering process is executed in step S602. More specifically, text data, graphic data, bitmap data, or the like, which is designated from the application 3 via the OS 2, is converted into an 8-bit grayscale image, and the converted image is recorded, thus ending the process.

On the other hand, if it is determined in step S601 that the type of call is not a rendering instruction, it is checked in step S607 if the type of call is a page end instruction. If the type of call is a page end instruction, a binarization process is executed in step S608. More specifically, the 8-bit grayscale image recorded in step S602 is converted into a 1-bit monochrome image using a dither matrix.

In step S609, a print condition designation command, i.e., a command that designates conditions required for the print process such as a paper size, paper cassette, resolution, the number of gray levels, the number of bytes per line, the number of lines per page, and the like, is output.

In step S6010, a compression parameter designation command, which designates an up copy vertical offset value used to designate the position of a copy source, i.e., the number of lines above the current position in the up copy manipulation, and a left copy horizontal offset value used to designate the position of a copy source, i.e., the number of bytes on the left side of the current position in the left copy manipulation, which are used in encoding, is output.

Note that optimal values of the up copy vertical offset value and left copy horizontal offset value are calculated theoretically or experimentally in accordance with the dither matrix used in step S608, and the calculated values are used.

In step S6011, image data is encoded in accordance with an encoding sequence to be described later. At this time, encoding is done using the up copy vertical offset value and left copy horizontal offset value designated by the compression parameter designation command output in step S6010. In step S6012, an image data command header which designates the size and the number of lines of the image data encoded in step S6011 is output. In step S6013, the image data encoded in step S6011 is output. In step S6014, a new page command that designates the end of a page is output. In step S6015, the image data of the current page is transferred to the previous page memory, thus ending the process.

On the other hand, if it is determined in step S607 that the type of call is not a page end instruction, another process according to the type of call, e.g., a process corresponding to a page start instruction, printer performance inquiry instruction, or the like, is executed in step S6016, thus ending the process.

Figure 30A:
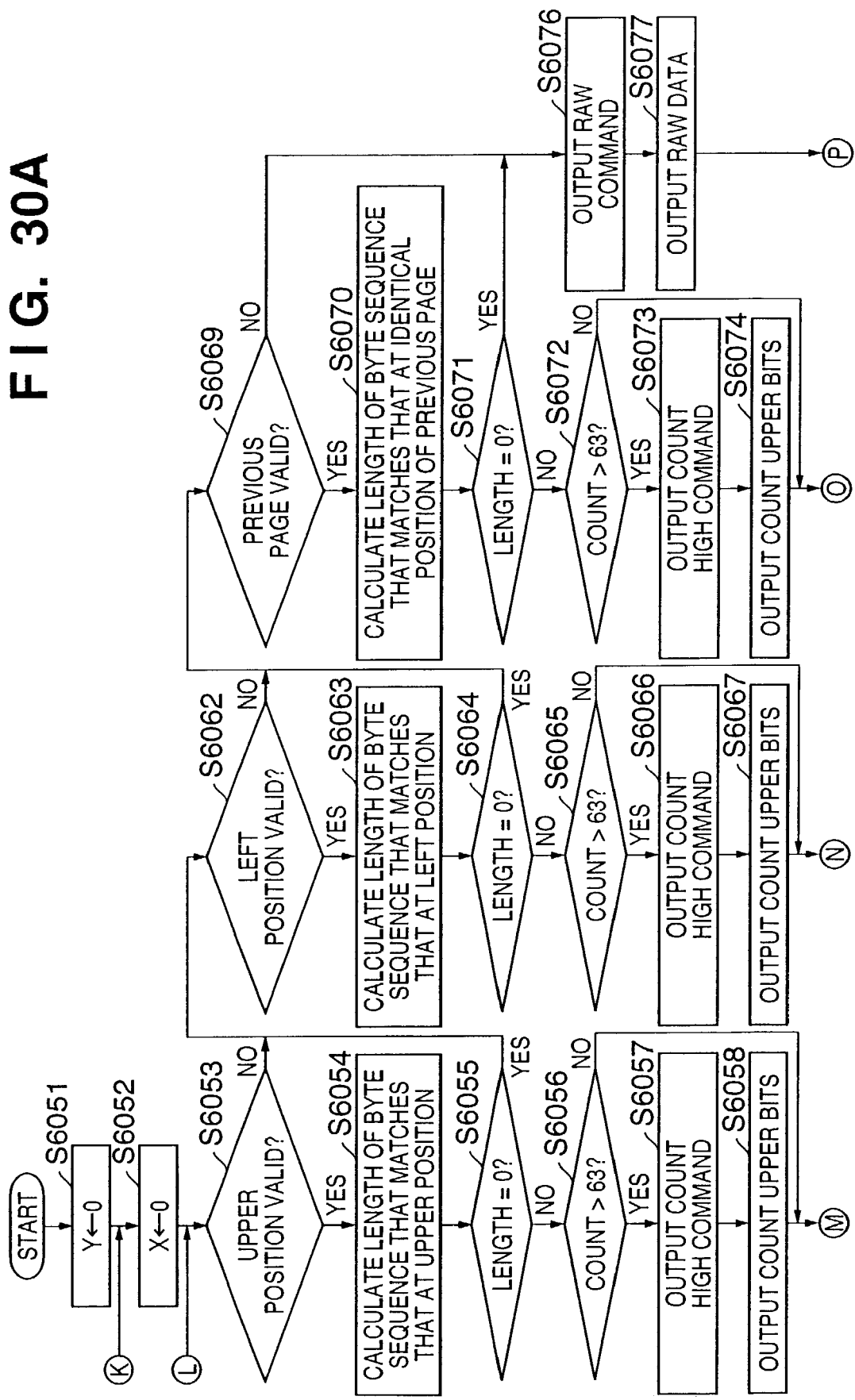
FIG. 30A is a flow chart showing details of the encoding sequence in step S6011 in FIG. 29.
Figure 30B:
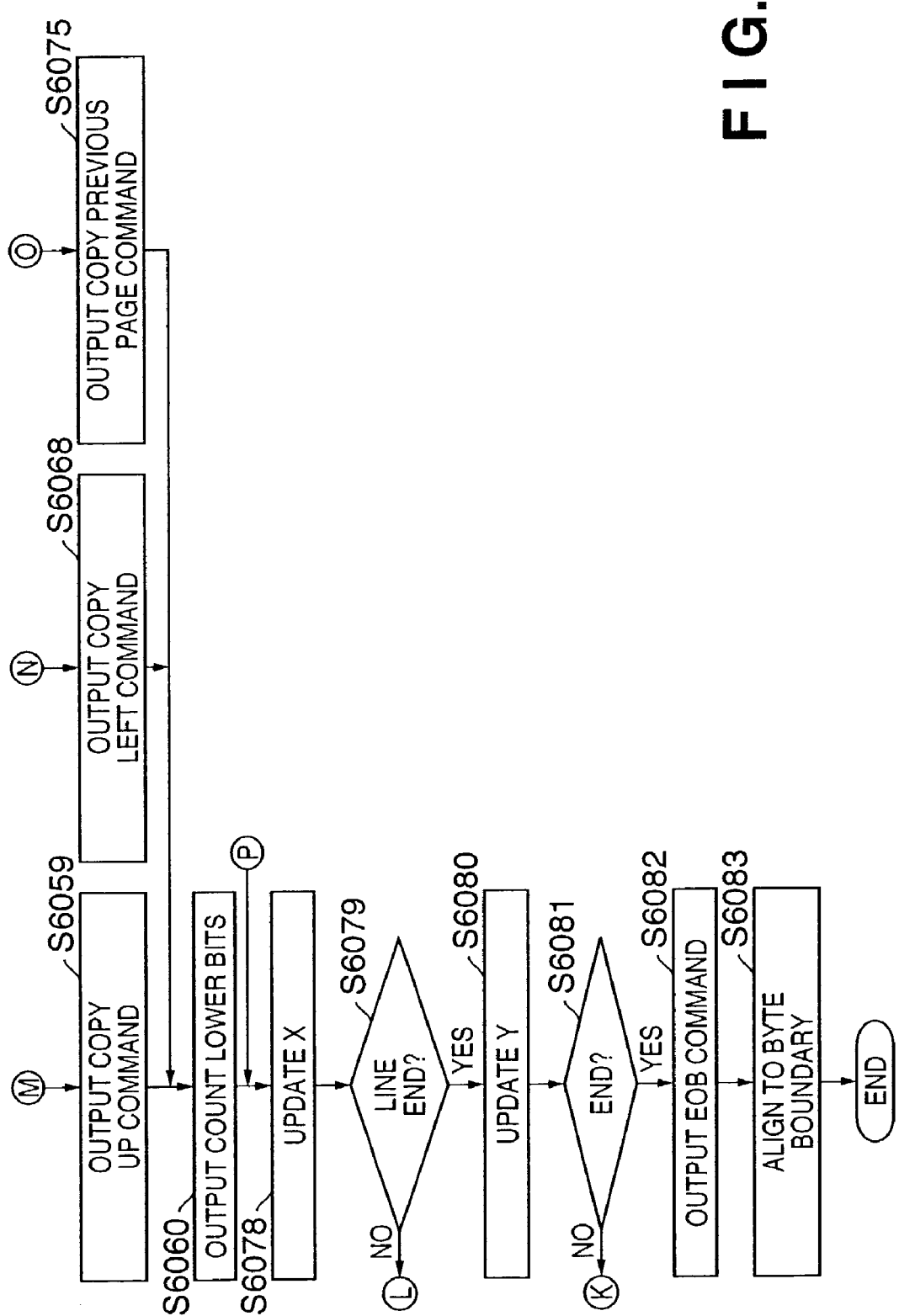
FIG. 30B is a flow chart showing details of the encoding sequence in step S6011 in FIG. 29.

Details of the encoding process in step S6011 in FIG. 29 will be described below with reference to FIG. 30A and 30B.

In step S6051, a line number Y is reset to zero. In step S6052, a byte offset X from the line head is reset to zero. It is checked in step S6053 if an upper position falls within a valid image region. More specifically, it is checked if the number of lines indicating the up copy position, which is output in step S6047 in FIG. 29, is equal to or larger than the line number Y. If the number of lines indicating the up copy position is equal to or larger than the line number Y, since the upper position falls within a valid image region, the length of identical bytes between a byte sequence which starts from the current position (X, Y) and a byte sequence which starts from the upper position (X, Y—the number of lines indicating the up copy position) is calculated in step S6054. In this case, if these two byte sequences are equal to each other up to the line end, the process in step S6054 is aborted at the line end. On the other hand, if the length exceeds 4095 bytes as a maximum value of a count code, the process in step S6054 is aborted at 4095 bytes.

It is checked in step S6055 if the length obtained in step S6054 is zero. If the length obtained in step S6054 is not zero, it is checked step S6056 if the length obtained in step S6054 is larger than 63. If the length obtained in step S6054 is larger than 63, a COUNT HIGH command is output to a buffer in step S6057. In step S6058, the upper bits of the count, i.e., the quotient obtained by dividing the length obtained in step S6054 by 64 is encoded and output to buffer, and the flow advances to step S6059. On the other hand, if it is determined in step S6056 that the length obtained in step S6054 is equal to or smaller than 63, the flow jumps to step S6059.

In step S6059, a COPY UP command is output to the buffer. In step S6060, the lower bits of the count, i.e., the remainder obtained upon dividing the length obtained in step S6054 by 64 is encoded and output to the buffer.

On the other hand, if it is determined in step S6053 that the number of lines indicating the up copy position is smaller than the line number Y, and if it is determined in step S6055 that the length is zero, it is checked in step S6062 if a left position falls within a valid image region. More specifically, it is checked if the number of bytes indicating the left copy position, which is output in step S6047 in FIG. 29, is equal to or larger than the byte offset X from the line head. If the number of bytes indicating the left copy position is equal to or larger than the byte offset X from the line head, since the left copy position falls within the valid image region, the length of identical bytes between a byte sequence what starts from the current position (X, Y) and a byte sequence that starts from the left copy position (X—the number of bytes indicating the left copy position, Y) is calculated in step S6063. In this case, if these two byte sequences are equal to each other up to the line end, the process in step S6063 is aborted at the line end. On the other hand, if the length exceeds 4095 bytes as a maximum value of a count code, the process in step S6063 is aborted at 4095 bytes.

It is checked in step S6064 if the length obtained in step S6063 is zero. If the length obtained in step S6063 is not zero, it is checked in step S6065 if the length obtained in step S6063 is larger than 63. If the length obtained in step S6063 is larger than 63, a COUNT HIGH command is output to the buffer in step S6066. In step S6067, the upper bits of the count, i.e., the quotient obtained by dividing the length obtained in step S6063 by 64, is encoded and output to the buffer, and the flow advances to step S6068. On the other hand, if it is determined in step S6065 that the length obtained in step S6063 is equal to or smaller than 63, the flow jumps to step S6068.

In step S6068, a COPY LEFT command is output to the buffer. In step S6060, the lower bits of the count, i.e., the remainder obtained upon dividing the length obtained in step S6063 by 64, is encoded and output to the buffer.

On the other hand, if it is determined in step S6062 that the number of bytes indicating the left copy position is smaller than the byte offset X from the line head, and if it is determined in step S6064 that the length is zero, it is checked in step S6069 if the previous page memory stores a valid image. More specifically, it is checked if the page number is not 1. If the page number is not 1, since the image data has been transferred to the previous page memory in step S6015 in FIG. 29, the length of identical bytes between a byte sequence that starts from the current position (X, Y) of the image data of the current page, and a byte sequence that starts from the current position (X, Y) of the image data stored in the previous page memory is calculated in step S6070. In this case, if these two byte sequences are equal to each other up to the line end, the process in step S6070 is aborted at the line end. On the other hand, if the length exceeds 4095 bytes as a maximum value of a count code, the process in step S6070 is aborted at 4095 bytes.

It is then checked in step S6071 if the length obtained in step S6070 is zero. If the length obtained in step S6070 is not zero, it is checked in step S6072 if the length obtained in step S6070 is larger than 63. If the length obtained in step S6070 is larger than 63, a COUNT HIGH command is output to the buffer in step S6073. In step S6074, the upper bits of the count, i.e., the quotient obtained by dividing the length obtained in step S6070 by 64, is encoded and output to the buffer, and the flow advances to step S6075. On the other hand, if it is determined in step S6072 that the length obtained in step S6070 is equal to or smaller than 63, the flow jumps to step S6075.

In step S6075, a COPY PREVIOUS PAGE command is output to the buffer. In step S6060, the lower bits of the count, i.e., the remainder obtained upon dividing the length obtained in step S6070 by 64, is encoded and output to the buffer.

If it is determined in step S6069 that the page number is 1 and if it is determined in step S6071 that the length is zero, a RAW command is output to the buffer in step S6076, and 1-byte data at the current position (X, Y) is then output to the buffer as raw data.

In either case, the flow advances to step S6078 to add the number of processed bytes to X. It is then checked in step S6079 if X has reached the line end, i.e., if X is equal to the number of bytes per line. If X is smaller than the number of bytes per line, the flow returns to step S6053 to repeat the aforementioned process. On the other hand, if X is equal to the number of bytes per line, 1 is added to the line number Y in step S6080, and it is then checked in step S6081 if the process for the image is complete, i.e., if Y is equal to the number of lines of the image.

If Y is smaller than the number of lines of the image, the flow returns to step S6052 to repeat the aforementioned process. On the other hand, if Y is equal to the number of lines of the image, an EOB command is output to the buffer in step S6082. In step S6083, bits "0" which are required to reach the byte boundary are output to the buffer, thus ending the process.

Details of the decoding circuit 6013 shown in FIG. 28 will be described below with reference to FIG. 31. Note that FIG. 31 is a block diagram showing details of the decoding circuit 6013 shown in FIG. 28.

Figure 31:
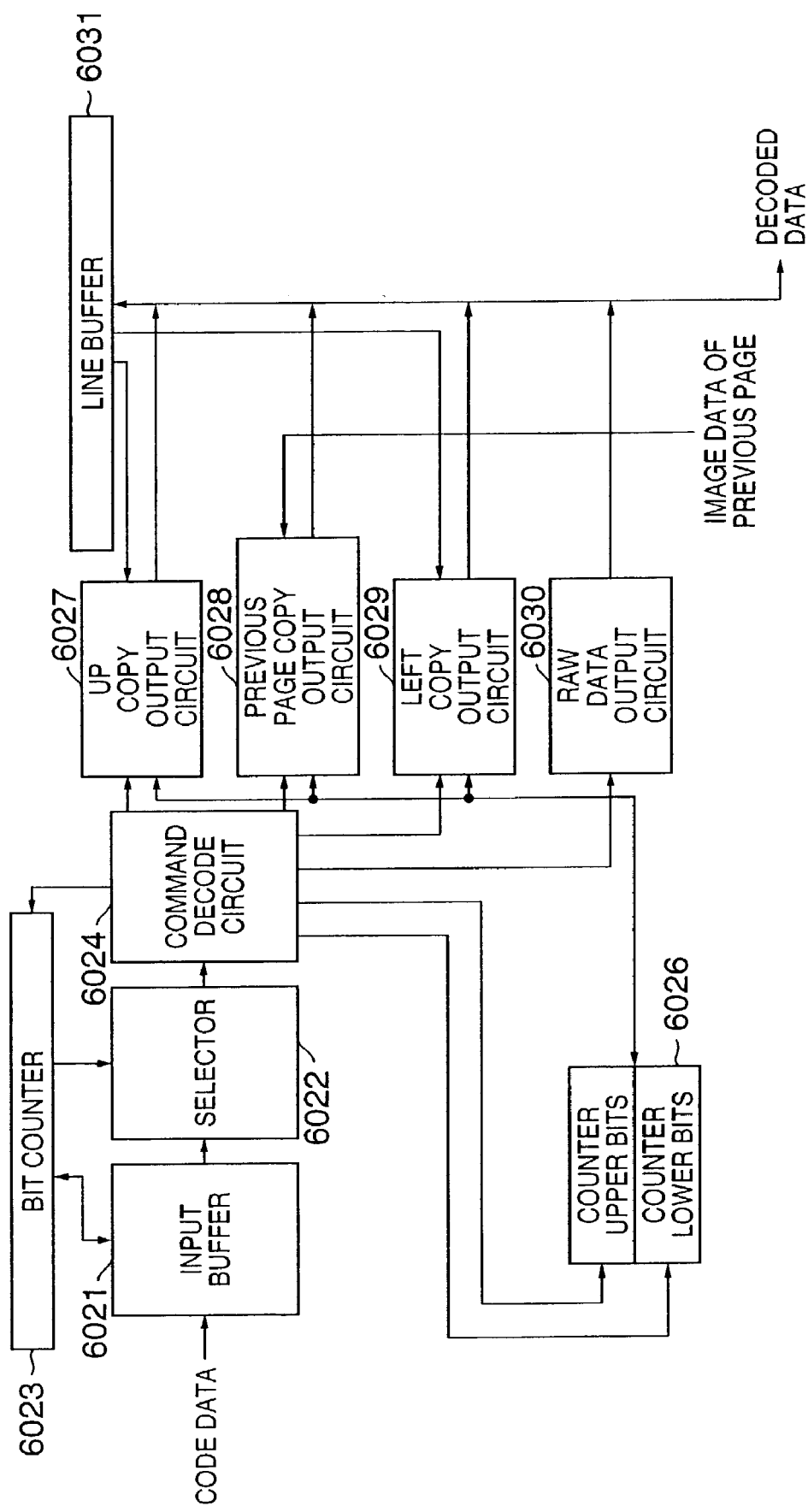
FIG. 31 is a block diagram showing details of a decoding circuit 6013 shown in FIG. 28.

Referring to FIG. 31, an input buffer 6021 stores code data read out from the FIFO memory 6012. The input buffer 6021 can store at least data for four bytes, and reads out and stores data from the FIFO memory 6012, when the buffer has a free space and data to be read out is stored in the FIFO memory 6012. The input buffer 6021 discards processed data, which becomes unnecessary, when the number of processed bits, which is held by a bit counter 6023, exceeds 8.

A selector 6022 includes, e.g., 11 sets of 8-input selectors, and selects code data stored in the input buffer 6021 in accordance with the number of processed bits indicated by the bit counter 6023, thus aligning the start position of a command, which is required for a command decode circuit 6024 upon processing. This process is required since there are eight start positions, i.e., the input buffer 6021 holds data for respective bytes, while a command is variable-length data for respective bits.

The bit counter 6023 stores the number of processed bits of code data stored in the input buffer 6021. The bit counter 6023 updates the stored value by adding the number of bits of a command output from the command decode circuit 6024. The bit counter 6023 subtracts the number of discarded bits when the input buffer discards processed data. When the command decode circuit 6024 decodes an EOB command, the bit counter 6023 receives an EOB signal from the command decode circuit 6024, and executes a byte boundary alignment process. More specifically, if the lower 3 bits of the bit counter are all "0"s, the counter 6023 does nothing; otherwise, the counter 6023 adds 8 and clears the lower 3 bits.

The command decode circuit 6024 comprises, e.g., a read-only memory or wired logic, decodes code data, which is aligned by the selector 6022 and is stored in the input buffer 6021, and outputs various signals mentioned above or to be described later to a counter 6026, an up copy output circuit 6027, a previous page copy output circuit 6028, a left copy output circuit 6029, a raw data output circuit 6030, and the bit counter 6023 in accordance with the decoded command.

The counter 6026 holds the number of processed bytes of a COPY UP, COPY LEFT, or COPY PREVIOUS PAGE command, and its contents are decremented every time 1-byte data is output. In the counter 6026, the upper 6 bits and lower 6 bits can be independently set. When the command decode circuit 6024 decodes a COUNT HIGH command, the counter 6026 stores, in the upper bits, the sum of the numbers of processed bytes, which are output from the command decode circuit 6024. When the command decode circuit 6024 decodes a COPY UP, COPY LEFT, or COPY PREVIOUS PAGE command, the counter 6026 stores, in the lower bits, the number of processed bytes output from the command decode circuit 6024.

The up copy output circuit 6027 reads and outputs data at the up copy position from a line buffer 6031 in accordance with the number of processed bytes held by the counter 6026.

The address of the line buffer 6031, which corresponds to the up copy position, is held in the internal register of the up copy output circuit 6027. As the initial value of this register, a value corresponding to the up copy position is written in advance by the control circuit 6015, and is automatically incremented every time the decoding circuit 6013 outputs 1-byte image data. As a result, when the incremented value has exceeded the last address of the line buffer 6031, it is automatically re-set to the start address of the line buffer 6031.

The previous page copy output circuit 6028 reads and outputs image data at an identical position of the previous page in accordance with the number of processed bytes held by the counter 6026.

The left copy output circuit 6029 reads and outputs data at the left copy position from the line buffer 6031 in accordance with the number of processed bytes held by the counter 6026.

The address of the line buffer 6031, which corresponds to the left copy position, is held in the internal register of the left copy output circuit 6029. As the initial value of this register, a value corresponding to the up copy position is written in advance by the control circuit 6015, and is automatically incremented every time the decoding circuit 6013 outputs 1-byte image data. As a result, when the incremented value has exceeded the last address of the line buffer 6031, it is automatically re-set to the start address of the line buffer 6031.

The raw data output circuit 6030 outputs 1-byte raw data output from the command decode circuit 6024.

The line buffer 6031 holds decoded data for a plurality of lines, which are read out in accordance with the address output from the up copy output circuit 6027 or left copy output circuit 6029, and stores the decoded data output from the up copy output circuit 6027, previous page copy output circuit 6028, the left copy output circuit 6029, or raw data output circuit 6030 at the current position.

The address of the line buffer 6031, which corresponds to the current position, is held by the internal register of the line buffer 6031. As the initial value of this register, the start address of the line buffer 6031 is written in advance by the control circuit 6015, and is automatically incremented every time the decoding circuit 6013 outputs 1-byte image data. As a result, when the incremented value has exceeded the last address of the line buffer 6031, it is automatically re-set to the start address of the line buffer 6031.

When the command decode circuit 6024 decodes a COPY UP command, it decodes a count that follows the command, stores the decoded count in the lower bits of the counter 6026, and outputs a signal to the up copy output circuit 6027. When a COUNT HIGH command does not come before the COPY UP command, the upper bits of the counter 6026 store zero; when a COUNT HIGH command comes before the COPY UP command, the upper bits store the upper count indicated by the COUNT HIGH command. Data at the up copy position is read out from the line buffer 6031, and is input to the up copy output circuit 6027. When the up copy output circuit 6027 outputs this data, the output decoded data is written at the current position of the line buffer 6031. In this manner, decoded data are output until the counter 6026 reaches zero.

When the command decode circuit 6024 decodes a COPY PREVIOUS PAGE command, it decodes a count that follows the command, stores the decoded count in the lower bits of the counter 6026, and outputs a signal to the previous page copy output circuit 6028. When a COUNT HIGH command does not come before the COPY PREVIOUS PAGE command, the upper bits of the counter 6026 store zero; when a COUNT HIGH command comes before the COPY PREVIOUS PAGE command, the upper bits store the upper count indicated by the COUNT HIGH command. Data at an identical position of the previous page is input from the re-decoding circuit 6019 to the previous page copy output circuit 6028. When the previous page copy output circuit 6028 outputs this data, the output decoded data is written at the current position of the line buffer 6031. In this manner, decoded data are output until the counter 6026 reaches zero.

When the command decode circuit 6024 decodes a COPY LEFT command, it decodes a count that follows the command, stores the decoded count in the lower bits of the counter 6026, and outputs a signal to the left copy output circuit 6029. When a COUNT HIGH command does not come before the COPY LEFT command, the upper bits of the counter 6026 store zero; when a COUNT HIGH command comes before the COPY LEFT command, the upper bits store the upper count indicated by the COUNT HIGH command. Data at the left copy position is read out from the line buffer 6031, and is input to the left copy output circuit 6029. When the left copy output circuit 6029 outputs this data, the output decoded data is written at the current position of the line buffer 6031. In this manner, decoded data are output until the counter 6026 reaches zero.

When the command decode circuit 6024 decodes a RAW command, it outputs 1-byte raw data that follows the command to the raw data output circuit 6030. When the raw data output circuit 6030 outputs this data, the output decoded data is written at the current position of the line buffer 6031.

When the command decode circuit 6024 decodes a COUNT HIGH command, it decodes a count that follows the command, and stores the decoded count in the upper bits of the counter 6026.

Sixth Embodiment

Since the diagram that shows the relationship between a software group used upon printing an image, and a printer is the same as that in the first embodiment shown in FIG. 1, a description thereof will be omitted.

Since the basic arrangement of the image processing apparatus of this embodiment is the same as that in the first embodiment shown in FIG. 17, a description thereof will be omitted.

Since the basic arrangement of the printer 1711 of this embodiment is the same as that in the third embodiment shown in FIG. 19, a description thereof will be omitted.

Since the print operation of this embodiment is the same as that in the third embodiment, a description thereof will be omitted.

Codes to be generated by the printer driver 4 of this embodiment will be described below with reference to tables shown in FIGS. 32 and 21.

FIG. 32 shows an example of an encoding table generated by the printer driver 4 in this embodiment. Each code to be explained in this embodiment has a variable length for respective bits, and is expressed by a bit sequence ranging from, e.g., 2 bits to 18 bits. Respective codes can be identified when they are checked in turn from the head, like in Huffman codes.

In this embodiment, two left reference positions and two upper reference positions are referred to upon encoding. In correspondence with the characteristics of the dither matrix used in the color reduction process, for example, positions respectively separated 1 byte and 4 bytes on the left side of the position of interest are determined as the left reference positions, and a position four lines above the position of interest and a position four lines above the position of interest and two bytes on the left side of that position are determined as the upper reference positions.

As shown in FIG. 32, when the bit sequence of a code starts with "1", it indicates a COPY UP1 command. This command is followed by a code indicating a length (to be described later), and instructs to copy a byte sequence with the length indicated by the subsequent code from a predetermined upper reference position of high priority.

When the bit sequence of a code starts with "011", it indicates a COPY UP2 command. This command is followed by a code indicating a length (to be described later), and instructs to copy a byte sequence with the length indicated by the subsequent code from a predetermined upper reference position of low priority, and to replace the upper reference position of high priority by that of low priority.

When the bit sequence of a code starts with "001", it indicates a RAW command. This command is followed by 8-bit data indicating raw data, and designates 1-byte data having a value of the subsequent 8-bit data.

When the bit sequence of a code starts with "010", it indicates a COPY LEFT1 command. This command is followed by a code indicating a length (to be described later), and instructs to copy a byte sequence with the length indicated by the subsequent code from a predetermined left reference position of high priority.

When the bit sequence of a code starts with "0001", it indicates a COPY LEFT2 command. This command is followed by a code indicating a length (to be described later), and instructs to copy a byte sequence with the length indicated by the subsequent code from a predetermined left reference position of low priority, and to replace the left reference position of high priority by that of low priority.

When the bit sequence of a code is "0000", it indicates an EOB command, which instructs the end of a code block.

When data match at a reference position of low priority, subsequent data are more likely to match at that reference position. Therefore, upon outputting a longer code used to identify the reference position of low priority, the priority of that reference position is raised to identify the reference position by a shorter code since the next output, thereby shortening a code to be output when data match at that reference position. Hence, by executing a COPY UP2 or COPY LEFT2 command, the reference position of high priority is replaced by that of low priority to shorten the length of a code to be output aftertime.

An example of an encoding table of a code which follows the COPY UP1, COPY UP2, COPY LEFT1, or COPY LEFT2 command shown in FIG. 32 and indicates the length is as shown in FIG. 21 that has been explained in the third embodiment.

An example of an encoding process will be described below with reference to FIGS. 33A and 33B. FIG. 33A shows image data to be encoded, and FIG. 33B shows encoded data. As shown in FIG. 33A, 10-byte image data (data of interest) 00, 00, 12, 34, 56, 78, 00, BC, DE, and 00 line up from the left in the lowermost row, and image data 12, 34, 56, 78, 9A, BC, DE, 00, 00, 00 (reference data) line up from the left in a row two rows above the lowermost row. At this time, assume that the left reference position of high priority is a position 1 byte on the left side of the position of interest (i.e., the left reference position of low priority is a position 4 bytes on the left side of the position of interest), and the upper reference position of high priority is a position two lines above and 2 bytes on the left side of the position of interest (i.e., the upper reference position of high priority is a position four lines above the position of interest).

Note that the first byte 00 in the lowermost row can be encoded to a bit sequence 001 00000000, i.e., a RAW command indicating raw data 00.

The next byte 00 can be encoded to a bit sequence 010 1, i.e., a COPY LEFT1 command that copies a 1-byte length from the left reference position of high priority, i.e., a position 1 byte on the left side of the current position.

The subsequent sequence of bytes 12, 34, 56, and 78 can be encoded to a bit sequence 011 001 00, i.e., a COPY UP2 command that copies a 4-byte length from the upper reference position of low priority, i.e., a position two lines above and two bytes on the left side of the current position. As a result, since the priority levels of the upper reference positions are replaced, a subsequent COPY UP1 command refers to a position two lines above and two bytes on the left side of the current position, which has been changed from low priority to high priority, and a COPY UP2 command refers to a position four lines above the current position, which has been changed from high priority to low priority.

The next byte 00 can be encoded to a bit sequence 001 00000000, i.e., a RAW command indicating raw data 00 again.

The subsequent sequence of bytes BC, DE, and 00 can be encoded to a bit sequence 1 01 1, i.e., a COPY UP1 command that copies a 3-byte length from the upper reference position of high priority, i.e., a position two lines above and two bytes on the left side of the current position.

In this manner, image data can be encoded. Since the process of the printer driver 4 in this embodiment is the same as that in the third embodiment shown in the flow chart of FIG. 24, a description thereof will be omitted.

Figure 34A:
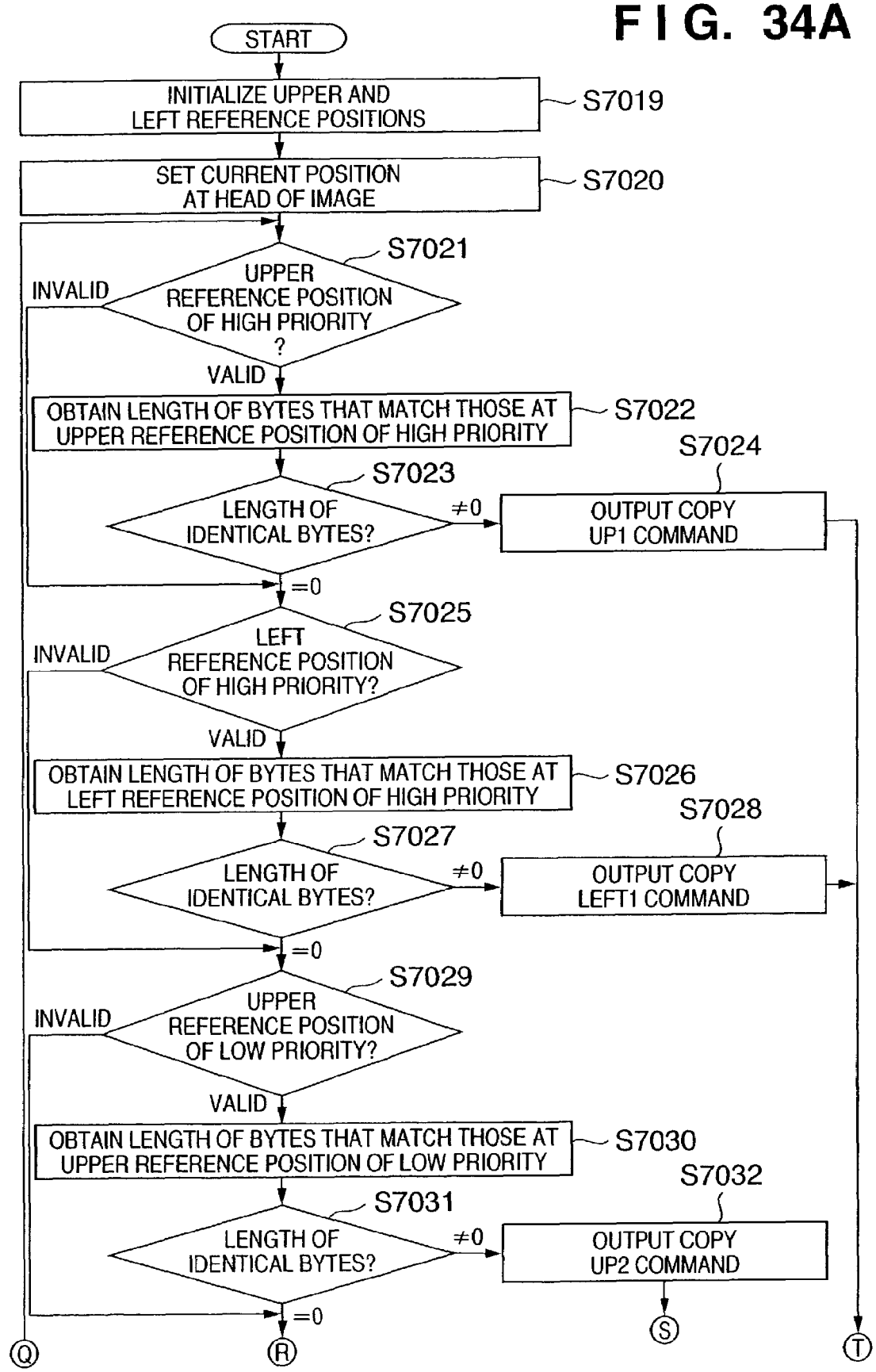
FIG. 34A is a flow chart showing an encoding process in step S5011 of the sixth embodiment.
Figure 34B:
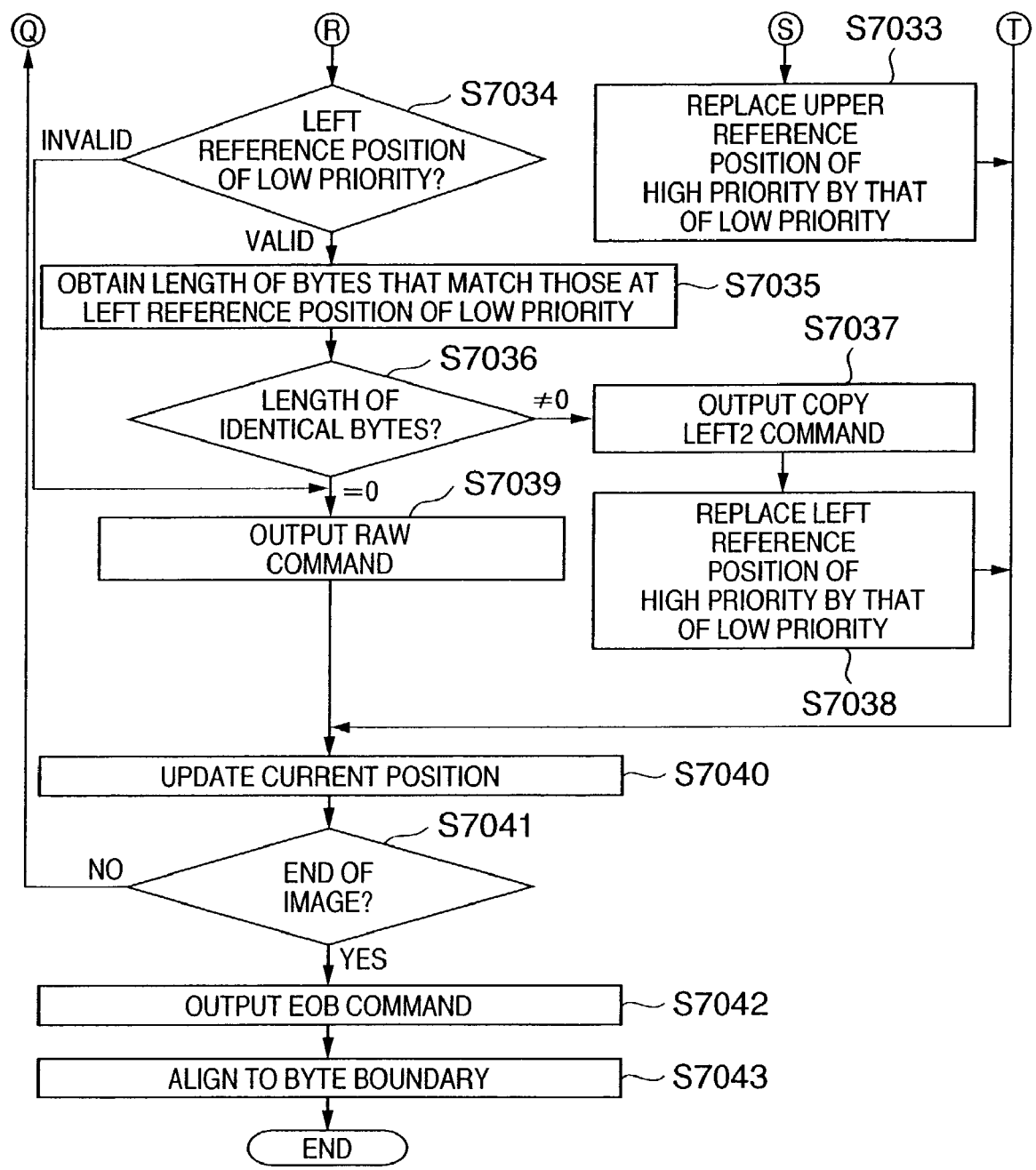
FIG. 34B is a flow chart showing an encoding process in step S5011 of the sixth embodiment.

The encoding process of this embodiment in step S5011 will be described below with reference to FIGS. 34A and 34B which are flow charts of that process. A program according to this flow chart is built in the printer driver as a subroutine of the above flow chart.

In step S7019, the upper reference position of high priority, the upper reference position of low priority, the left reference position of high priority, and the left reference position of low priority are respectively set to be predetermined initial values, i.e., in accordance with compression parameters in step S5010 above. In step S7020, the current position, i.e., the position of an image to be encoded, is set at the left end of the first row of the image.

It is checked in step S7021 if the upper reference position of high priority corresponding to the current position refers to valid image data. If the upper reference position of high priority refers to valid image data, the length of bytes which match those at the upper reference position of high priority is obtained in step S7022 by comparing a byte sequence that starts from the current position, and a byte sequence that starts from the upper reference position of high priority. At this time, if the row end is reached or the length has reached 255 bytes, the process is aborted. It is then checked in step S7023 if the length of bytes which match those at the upper reference position of high priority obtained in step S7022 is zero. If the length is not zero, since the data of interest can be encoded to a COPY UP1 command, a COPY UP1 command, i.e., a code 1 and a code indicating the number of bytes which follow (the length obtained in step S7022) are output in step S7024, and the flow then advances to step S7040.

On the other hand, if it is determined in step S7021 that the upper reference position of high priority is invalid, and if it is determined in step S7023 that the length of bytes which match those at the upper reference position of high priority obtained in step S7022 is zero, it is checked in step S7025 if the left reference position of high priority corresponding to the current position refers to valid image data. If the left reference position of high priority refers to valid image data, the length of bytes which match those at the left reference position of high priority is obtained in step S7026 by comparing a byte sequence that starts from the current position, and a byte sequence that starts from the left reference position of high priority. At this time, if the row end is reached or the length has reached 255 bytes, the process is aborted. It is then checked in step S7027 if the length of bytes which match those at the left reference position of high priority obtained in step S7026 is zero. If the length is not zero, since the data of interest can be encoded to a COPY LEFT1 command, a COPY LEFT1 command, i.e., a code 010 and a code indicating the number of bytes which follow (the length obtained in step S7026) are output in step S7028, and the flow then advances to step S7040.

On the other hand, if it is determined in step S7025 that the left reference position of high priority is invalid, and if it is determined in step S7027 that the length of bytes which match those at the left reference position of high priority obtained in step S7026 is zero, it is checked in step S7029 if the upper reference position of low priority corresponding to the current position refers to valid image data. If the upper reference position of low priority refers to valid image data, the length of bytes which match those at the upper reference position of low priority is obtained in step S7030 by comparing a byte sequence that starts from the current position, and a byte sequence that starts from the upper reference position of low priority. At this time, if the row end is reached or the length has reached 255 bytes, the process is aborted. It is then checked in step S7031 if the length of bytes which match those at the upper reference position of low priority obtained in step S7030 is zero. If the length is not zero, since the data of interest can be encoded to a COPY UP2 command, a COPY UP2 command, i.e., a code 011 and a code indicating the number of bytes which follow (the length obtained in step S7030) are output in step S7032, and the upper reference position of high priority is replaced by that of low priority in step S7033. After that, the flow advances to step S7040.

If it is determined in step S7029 that the upper reference position of low priority is invalid, and if it is determined in step S7031 that the length of bytes which match those at the upper reference position of low priority obtained in step S7030 is zero, it is checked in step S7034 if the left reference position of low priority corresponding to the current position refers to valid image data. If the left reference position of low priority refers to valid image data, the length of bytes which match those at the left reference position of low priority is obtained in step S7035 by comparing a byte sequence that starts from the current position, and a byte sequence that starts from the left reference position of low priority. At this time, if the row end is reached or the length has reached 255 bytes, the process is aborted. It is then checked in step S7036 if the length of bytes which match those at the upper reference position of low priority obtained in step S7035 is zero. If the length is not zero, since the data of interest can be encoded to a COPY LEFT2 command, a COPY LEFT2 command, i.e., a code 0001 and a code indicating the number of bytes which follow (the length obtained in step S7035) are output in step S7037, and the left reference position of high priority is replaced by that of low priority in step S7038. After that, the flow advances to step S7040.

If it is determined in step S7034 that the left reference position of low priority is invalid, and if it is determined in step S7036 that the length of bytes which match those at the left reference position of low priority obtained in step S7035 is zero, a RAW command, i.e., a code 001 and 1-byte data at the current position, which follows, are output in step S7039, and the flow advances to step S7040.

In step S7040, the current position is advanced by the number of bytes processed by the COPY UP1, COPY UP2, COPY LEFT1, COPY LEFT2, or RAW command. It is then checked in step S7041 if all image data have been processed. If all image data have not been processed yet, the flow returns to step S7021 to repeat the aforementioned encoding process. On the other hand, if all image data have been processed, an EOB command, i.e., a code 0000, is output in step S7042, and the code is aligned to the byte boundary in step S7043. More specifically, when the total number of bits of the output code is not an integer multiple of 8, bits "0" are output until the integer multiple of 8 is reached. Upon completion of the encoding process in this way, the control returns to the main routine.

Details of the decoding circuit 513 shown in FIG. 19 will be described below using FIG. 35 that shows the arrangement of that circuit of this embodiment. FIG. 35 is a block diagram showing the basic arrangement of the decoding circuit 513 shown in FIG. 19 in this embodiment.

Referring to FIG. 35, an input buffer 7021 stores code data read out from the FIFO memory 512. The input buffer 7021 can store at least data for four bytes, and reads out and stores data from the FIFO memory 512, when the buffer has a free space and data to be read out is stored in the FIFO memory 512. The input buffer 7021 discards processed data, which becomes unnecessary, when the number of processed bits, which is held in a bit counter 7023, exceeds 8.

A first selector 7022 includes, e.g., 18 sets of 8-input selectors, and selects code data stored in the input buffer 7021 in accordance with the number of processed bits indicated by the bit counter 7023, thus aligning the start position of a command, which is required for a command decode circuit 5024 upon processing. This process is required since there are eight start positions, i.e., the input buffer 7021 holds data for respective bytes, while a command is variable-length data for respective bits.

The bit counter 7023 stores the number of processed bits of code data stored in the input buffer 7021. The bit counter 7023 updates the stored value by adding the number of bits of a command output from a command decode circuit 7024. The bit counter 7023 subtracts the number of discarded bits when the input buffer discards processed data. When the command decode circuit 7024 decodes an EOB command, the bit counter 7023 receives an EOB signal from the command decode circuit 7024, and executes a byte boundary alignment process. More specifically, if the lower 3 bits of the bit counter are all "0"s, the counter 7023 does nothing; otherwise, the counter 7023 adds 8 and clears the lower 3 bits.

The command decode circuit 7024 comprises, e.g., a read-only memory or wired logic, and decodes code data, which is aligned by the first selector 7022 and is stored in the input buffer 7021. When the decoded command is an EOB command, the command decode circuit 7024 outputs signals to the bit counter 7023, an up-priority FF 7029, and a left-priority FF 7030; when the decoded command is a COPY UP1 or COPY UP2 command, the circuit 7024 outputs signals to second and third selectors 7025 and 7026; when the decoded command is a COPY LEFT1 or COPY LEFT2 command, the circuit 7024 outputs signals to fourth and fifth selectors 7027 and 7028; and when the decoded command is a RAW command, the circuit 7024 outputs a signal to a raw data output circuit 7036. When the command decode circuit 7024 decodes a COPY UP1, COPY UP2, COPY LEFT1, or COPY LEFT2 command, it also decodes and outputs the number of bytes indicated by the subsequent code; when the circuit 7024 decodes a RAW command, it also decodes and outputs 8-bit data indicated by the subsequent code.

Reference numeral 7025 denotes a second selector, which outputs a signal output from the command decode circuit 7024 upon decoding a COPY UP1 command when the up-priority FF 7029 holds zero, or outputs a signal output from the command decode circuit 7024 upon decoding a COPY UP2 command when the up-priority FF 7029 holds 1.

Reference numeral 7026 denotes a third selector, which outputs a signal output from the command decode circuit 7024 upon decoding a COPY UP2 command when the up-priority FF 7029 holds zero, or outputs a signal output from the command decode circuit 7024 upon decoding a COPY UP1 command when the up-priority FF 7029 holds 1.

Reference numeral 7027 denotes a fourth selector, which outputs a signal output from the command decode circuit 7024 upon decoding a COPY LEFT1 command when the left-priority FF 7030 holds zero, or outputs a signal output from the command decode circuit 7024 upon decoding a COPY LEFT2 command when the left-priority FF 7030 holds 1.

Reference numeral 7028 denotes a fifth selector, which outputs a signal output from the command decode circuit 7024 upon decoding a COPY LEFT2 command when the left-priority FF 7030 holds zero, or outputs a signal output from the command decode circuit 7024 upon decoding a COPY LEFT1 command when the left-priority FF 7030 holds 1.

Reference numeral 7029 denotes an up-priority FF, which holds a value indicating one to be preferentially used of first and second up copy circuits 7031 and 7032. The up-priority FF 7029 reverses the held value when the command decode circuit 7024 decodes a COPY UP2 command.

Reference numeral 7030 denotes a left-priority FF, which holds a value indicating one to be preferentially used of first and second left copy circuits 7033 and 7034. The left-priority FF 7030 reverses the held value when the command decode circuit 7024 decodes a COPY LEFT2 command.

Reference numeral 7031 denotes a first up copy circuit, which receives the number of bytes to be copied together with a signal received from the second selector 7025, and repeats a process for reading data from the line buffer 7035 and outputting the read data in accordance with the received number of bytes.

Reference numeral 7032 denotes a second up copy circuit, which receives the number of bytes to be copied together with a signal received from the third selector 7026, and repeats a process for reading data from the line buffer 7035 and outputting the read data in accordance with the received number of bytes.

Reference numeral 7033 denotes a first left copy circuit, which receives the number of bytes to be copied together with a signal received from the fourth selector 7027, and repeats a process for reading data from the line buffer 7035 and outputting the read data in accordance with the received number of bytes.

Reference numeral 7034 denotes a second left copy circuit, which receives the number of bytes to be copied together with a signal received from the fifth selector 7028, and repeats a process for reading data from the line buffer 7035 and outputting the read data in accordance with the received number of bytes.

Reference numeral 7035 denotes a line buffer which serves as a ring memory that holds decoded data for a plurality of lines, outputs data stored at an address output from the first or second up copy circuit 7031 or 7032 or the first or second left copy circuit 7033 or 7034, and stores the decoded data at an address output from a current address register 7037.

Reference numeral 7036 denotes a raw data output circuit, which receives 8-bit data which is output simultaneously when the command decode circuit 7024 decodes a RAW command, and indicates raw data, and outputs the received data.

Reference numeral 7037 denotes a current address register, which outputs an address that indicates the position of data to be currently decoded, and counts up every time decoded data is stored in the line buffer 7035.

The first and second up copy circuits 7031 and 7032, and the first and second left copy circuits 7033 and 7034 hold addresses which respectively indicate first and second up copy positions and first and second left copy positions, and count up every time the current address register 7037 counts up.

When the command decode circuit 7024 decodes a COPY UP1 command, it also decodes the subsequent count, and outputs a signal to the second and third selectors 7025 and 7026. A signal is output from one of the second and third selectors 7025 and 7026 in accordance with a value held by the up-priority FF 7029, and one of the first and second up copy circuits 7031 and 7032 operates according to that signal.

For example, when the up-priority FF 7029 holds a value "0", and a COPY UP1 command is decoded, the second selector 7025 outputs a signal to the first up copy circuit 7031, and the third selector 7026 does not output any signal. The first up copy circuit 7031 outputs the internally held address indicating the first up copy position to the line buffer 7035, reads data at the first up copy position, which is stored in the line buffer 7035, and outputs the read data as decoded data to the printer engine 514. The current address register 7037 outputs the address indicating the current position, and the line buffer 7035 stores the decoded data at that address. Then, the addresses which are respectively held in the first and second up copy circuits 7031 and 7032 and the first and second left copy circuits 7033 and 7034, and respectively indicate the first and second up positions and the first and second left copy positions, and the address which is held in the current address register 7037 and indicates the current position, are counted up. This operation is repeated in correspondence with the designated number of bytes.

When the command decode circuit 7024 decodes a COPY UP2 command, it also decodes the subsequent count, and outputs a signal to the second and third selectors 7025 and 7026. A signal is output from one of the second and third selectors 7025 and 7026 in accordance with a value held by the up-priority FF 7029, and one of the first and second up copy circuits 7031 and 7032 operates according to that signal.

For example, when the up-priority FF 7029 holds a value "0", and a COPY UP2 command is decoded, the third selector 7026 outputs a signal to the second up copy circuit 7032, and the second selector 7025 does not output any signal. The second up copy circuit 7032 operates in the same manner as the aforementioned operation of the first up copy circuit 7031. In this case, since the value held by the up-priority FF 7029 is reversed to 1, a subsequent COPY UP1 command corresponds to the second upper reference position, and a COPY UP2 command corresponds to the first upper reference position.

When the command decode circuit 7024 decodes COPY LEFT1 and COPY LEFT2 commands, operations similar to those of the COPY UP1 and COPY UP2 commands are made.

When the command decode circuit 7024 decodes a RAW command, it also decodes subsequent 8-bit data, and outputs a signal to the raw data output circuit 7036. The raw data output circuit 7036 directly outputs the received 8-bit data to the printer engine 514 as decoded data. The current address register 7037 outputs the address indicating the current position, and the line buffer 7035 stores the decoded data at that address. Then, the addresses which are respectively held in the first and second up copy circuits 7031 and 7032 and the first and second left copy circuits 7033 and 7034, and respectively indicate the first and second up copy positions and the first and second left copy positions, and the address which is held in the current address register 7037 and indicates the current position, are counted up.

When the command decode circuit 7024 decodes an EOB command, the bit counter 7023 executes the byte boundary alignment process, as described above, and the up-priority FF 7029 and left-priority FF 7030 are reset to an initial value (e.g., 0).

Note that the addresses which are respectively held in the first and second up copy circuits 7031 and 7032 and the first and second left copy circuits 7033 and 7034, and respectively indicate the first and second up copy positions and the first and second left copy positions, and the address which is held in the current address register 7037 and indicates the current position are set with initial values based on positions, which are designated in advance by the control circuit 515 using the compression parameter designation command.

Since the line buffer 7035 serves as a ring memory, if the address which is held in one of the first and second up copy circuits 7031 and 7032 and the first and second left copy circuits 7033 and 7034, and respectively indicate the first and second up copy positions and the first and second left copy positions, or the address which is held in the current address register 7037 and indicates the current position, indicates the last address of the line buffer 7035, the start address of the line buffer 7035 is stored by wrap around upon counting up the address.

As described above, when the image processing apparatus which serves as the image encoding apparatus and image decoding apparatus of this embodiment refers to a reference position where data is to be encoded to a longer code, since correspondence between reference positions and codes is replaced, data can be encoded to a shorter code when that reference position is referred to aftertime. Hence, efficient compression can be achieved irrespective of the period of data.

When the period of image data is different from that of the dither matrix, data at the position of interest may have higher correlation with a position which neighbors the position of interest and to which an arithmetic operation approximate to that applied at the position of interest is applied in the color reduction process. Since few positions correspond to such position and can be determined by examining the dither matrix in advance or by taking the statistic using various image data, a plurality of positions are selected in advance from such position and positions separated by the period of the dither matrix as reference positions, thus allowing efficient encoding irrespective of the period of image data.

The period of image data is often constant over a broad range. For this reason, when data match at a reference position of low priority, subsequent data are more likely to match at that reference position. Therefore, upon outputting a longer code used to identify the reference position of low priority, the priority of that reference position is raised to identify the reference position by a shorter code since the next output, thereby shortening a code to be output when data match at that reference position. Hence, encoding can be done more efficiently than in a case wherein the priority levels are not replaced.

In the above embodiment, the priority levels of the two reference positions are switched. Alternatively, the priority levels of three or more reference positions may be switched.

As described above, according to the present invention, upon encoding an image having periodicity especially, image data formed by arranging identical background patterns such as a wallpaper or the like, the entire image can be compressed at higher speed and at higher compression ratio.

Also, according to the present invention, the circuit scale of a decoding circuit that decodes codes obtained by encoding an image formed by arranging identical background patterns such as a wallpaper or the like can be reduced, and low-cost decoding without requiring any large-size buffer memory can be implemented.

As described in detail above, according to the present invention, when data of interest matches a previous image data sequence, a high compression ratio can be obtained using that redundancy, and even when the frequency of occurrence of matching of data sequences is low, any compression ratio drop can be minimized.

Also, as described in detail above, according to the present invention, since encoding is done with reference to an identical position of the previous page in addition to left and upper positions of the position of interest, even an image with low correlation with the left and upper reference positions can be efficiently compressed upon encoding images with high correlation with the previous page (e.g., when consecutive pages use identical background patterns).

Furthermore, according to the present invention, since image data of the previous page to be referred to is encoded and held, the image data of the previous page can be held in a memory of a smaller size than in a case wherein non-encoded image data is held.

In accordance with the foregoing, according to the present invention, an image can be efficiently encoded especially to shorter codes.

The present invention is not limited to the above embodiment and various changes and modifications can be made within the spirit and scope of the present invention. Therefore, to apprise the public of the scope of the present invention the following claims are made.

What is claimed is:

1. An image data coding apparatus for encoding an image, comprising:
   pseudo halftone processing means for applying a pseudo halftone process to the image using an n*m matrix;
   period detection means for detecting a period of patterns of the image; and
   encoding means for encoding the image that has undergone the pseudo halftone process,
   wherein said encoding means encode each pixel in the image, using a first reference pixel separated by a distance n*a (a>0) from a target pixel to be encoded and a second reference pixel separated from the target pixel by a distance n*b (b>0 a≠b) which equals an integer multiple of a period p detected by said period detection means.

2. The apparatus according to claim 1, wherein said pseudo halftone processing means apply a dither process to the image using a dither matrix.

3. The apparatus according to claim 1, wherein said period detection means comprises:
   image storage means for storing information that pertains to images not less than a predetermined size of one or more images included in one page to be printed, and said period detection means detects a largest size of neighboring images as the period using the information that pertains to the images stored in said image storage means.

4. The apparatus according to claim 3, wherein the information that pertains to the images includes coordinate positions of upper left corners, widths, and heights of the images.

5. The apparatus according to claim 1, wherein said encoding means encodes the target pixel using the second reference pixel, when a pixel value of the target pixel is not equal to a pixel value of the first reference pixel.

6. The apparatus according to claim 1, wherein the target pixel, the first reference pixel, and the second reference pixel are on the same column or the same row.

7. The apparatus according to claim 1, wherein said encoding means encodes for a plurality of pixels.

8. An image data decoding apparatus for decoding an encoded image, comprising:
   input means for inputting an image encoded by applying a pseudo halftone process using an n*m matrix; and
   decoding means for decoding the image inputted by said input means,
   wherein said decoding means decode each pixel in the image, using a first reference pixel separated by a distance n*a (a>0) from a target pixel to be decoded and a second reference pixel separated from the target pixel by a distance n*b (b>0 a≠b) which equals an integer multiple of a period p of patterns of the image.

9. An image data coding method for encoding an image, comprising:
   a pseudo halftone processing step of applying a pseudo halftone process to the image using an n*m matrix;
   a period detection step of detecting a period of patterns of the image; and
   an encoding step of encoding the image that has undergone pseudo halftone process,
   wherein said encoding step includes encoding each pixel in the image, using a first reference pixel separated by a distance n*a (a>0) from a target pixel to be encoded and a second reference pixel separated from the target pixel by a distance n*b (b>0 a≠b) which equals an integer multiple of a period p detected in said period detection step.

10. A computer readable storage medium storing a computer program, which, when executed, performs image coding method of claim 9.

11. An image data decoding method for decoding an encoded image,
   an input step of inputting an image encoded by applying a pseudo halftone process using an n*m matrix; and
   a decoding step of decoding the image inputted in said input step,
   wherein said decoding step includes decoding each pixel in the image, using a first reference pixel separated by a distance n*a (a>0) from a target pixel to be decoded and a second reference pixel separated from the target pixel by a distance n*b (b>0 a≠b) which equals an integer multiple of a period p of patterns of the image.

12. An image data coding apparatus for encoding an image, comprising:
   pseudo halftone processing means for applying a pseudo halftone process to the image using an n*m matrix;
   encoding means for encoding the image that has undergone the pseudo halftone process, using a first reference pixel separated by a distance n*a (a>0) from a target pixel to be encoded and a second reference pixel separated by a distance m*b (b>0 a≠b) from the target pixel; and
   storing control means for storing a pixel sequence including the target pixel into a memory, when a pixel value of the target pixel is not equal to a pixel value of the first reference pixel and a pixel value of the second reference pixel,
   wherein said encoding means encode the target pixel using a third pixel stored in the memory, when a pixel value of the target pixel is not equal to a pixel value of the first reference pixel and a pixel value of the second reference pixel.

13. The apparatus according to claim 12, wherein said encoding means cancels encoding of the target pixel, when a pixel value of the target pixel is not equal to a pixel value of the third reference pixel.

14. An image data decoding apparatus for decoding encoded data, comprising:
   input means for inputting an image encoded by applying a pseudo halftone process using an n*m matrix; and
   decoding means for decoding the inputted image, using a first reference pixel separated by a distance n*a (a>0) from a target pixel to be decoded and a second reference pixel separated by a distance m*b (b>0 a≠b) from the target pixel,
   wherein said decoding means decode the target pixel using a third pixel that has been already decoded by said decoding means, when a pixel value of the target pixel is not equal to a pixel value of the first reference pixel and a pixel value of the second reference pixel.

15. An image data coding method for encoding an image, comprising:
   a pseudo halftone processing step of applying a pseudo halftone process to the image using a n*m matrix;
   an encoding step of encoding the image that has undergone the pseudo halftone process, using a first reference pixel separated by a distance n*a (a>0) from a target pixel to be encoded and a second reference pixel separated by a distance m*b (b>0 a≠b) from the target pixel; and
   a storing control step of storing a pixel sequence including the target pixel into a memory, when a pixel value of the target pixel is not equal to a pixel value of the first reference pixel and a pixel value of the second reference pixel,
   wherein said encoding step includes encoding the target pixel using a third pixel stored in the memory, when a pixel value of the target pixel is not equal to a pixel value of the first reference pixel and a pixel value of the second reference pixel.

16. A computer readable storage medium storing a computer program, which, when executed, performs image coding method of claim 15.

17. An image data decoding method for decoding encoded data,
   an input step of inputting an image encoded by applying a pseudo halftone process using an n*m matrix; and
   a decoding step of decoding the inputted image, using a first reference pixel separated by a distance n*a (a>0) from a target pixel to be decoded and a second reference pixel separated by a distance m*b (b>0 a≠b) from the target pixel,
   wherein said decoding step includes decoding the target pixel using a third pixel that has been already decoded in said decoding step, when a pixel value of the target pixel is not equal to a pixel value of the first reference pixel and a pixel value of the second reference pixel.

18. An image data coding apparatus for encoding an image, comprising:
   pseudo halftone processing means for applying a pseudo halftone process to the image using an n*m matrix;
   check means for checking, in a preset order, a first reference pixel separated by a distance n*a (a>0) from a target pixel to be encoded and a second reference pixel separated by a distance m*b (b>0 a≠b) from the target pixel; and
   encoding means for encoding the image that has undergone the pseudo halftone process, using the first or second reference pixel,
   wherein the preset order is preset on the basis of which reference pixel is used for encoding a pixel prior to the target pixel.

19. An image data decoding method for encoding an image, comprising:
   a pseudo halftone processing step of applying a pseudo halftone process to the image using an n*m matrix;
   a check step of checking, in a preset order, a first reference pixel separated by a distance n*a (a>0) from a target pixel to be encoded and a second reference pixel separated by a distance m*b (b>0 a≠b) from the target pixel; and
   an encoding step of encoding the image that has undergone the pseudo halftone process, using the first or second reference pixel,
   wherein the preset order is preset on the basis of which reference pixel is used for encoding a pixel prior to the target pixel.

20. A computer readable storage medium storing a computer program, which, when executed, performs image decoding method of claim 19.

* * * * *

UNITED STATES PATENT AND TRADEMARK OFFICE
CERTIFICATE OF CORRECTION

PATENT NO. : 7,245,396 B2
APPLICATION NO. : 10/310812
DATED : July 17, 2007
INVENTOR(S) : Yoichi Sakamoto It is certified that error appears in the above-identified patent and that said Letters Patent is hereby corrected as shown below:

ON TITLE PAGE AT ITEM (30) FOREIGN APPLICATION PRIORITY DATA

"2001/373269" should read --2001-373269--;
"2001/374340" should read --2001-374340--;
"2002/038132" should read --2002-038132--; and
"2002/046434" should read --2002-046434--.

COLUMN 2

Line 42, "ratio-by" should read --ratio by--.

COLUMN 7

Line 1, "the,object" should read --the object--.

COLUMN 12

Line 55, "indicated" should read --indicates--.

COLUMN 13

Line 5, "starts" should read --start--; and
Line 7, "starts" should read --start--.

COLUMN 23

Line 57, "are" should read --is--.

COLUMN 24

Line 34, "sift" should read --shift--.

COLUMN 34

Line 16, "includes" should read --include--.

UNITED STATES PATENT AND TRADEMARK OFFICE
CERTIFICATE OF CORRECTION

PATENT NO. : 7,245,396 B2
APPLICATION NO. : 10/310812
DATED : July 17, 2007
INVENTOR(S) : Yoichi Sakamoto It is certified that error appears in the above-identified patent and that said Letters Patent is hereby corrected as shown below:

COLUMN 36

Line 29, "6014 in" should read --6014. In--.

COLUMN 38

Line 17, "checked" should read --checked in--.

COLUMN 43

Line 34, "aftertime." should read --afterwards.--.

COLUMN 44

Line 30, "Instep" should read --In step--.

COLUMN 51

Line 37, Claim 9 "gone" should read --gone the--.

COLUMN 53

Line 18, Claim 18 "decoding" should read --coding--.

Signed and Sealed this

Twentieth Day of January, 2009

JON W. DUDAS
*Director of the United States Patent and Trademark Office*